(12) United States Patent
Tan

(10) Patent No.: US 11,442,624 B2
(45) Date of Patent: *Sep. 13, 2022

(54) DIGITAL CERTIFICATION SYSTEM

(71) Applicant: Anthony Tan, Las Vegas, NV (US)

(72) Inventor: Anthony Tan, Las Vegas, NV (US)

(*) Notice: Subject to any disclaimer, the term of this patent is extended or adjusted under 35 U.S.C. 154(b) by 286 days.

This patent is subject to a terminal disclaimer.

(21) Appl. No.: 16/798,355

(22) Filed: Feb. 22, 2020

(65) Prior Publication Data

US 2020/0192575 A1    Jun. 18, 2020

Related U.S. Application Data

(63) Continuation of application No. 15/486,301, filed on Apr. 13, 2017, now Pat. No. 10,592,108, which is a continuation-in-part of application No. 15/385,868, filed on Dec. 21, 2016, now Pat. No. 9,723,090, which is a continuation-in-part of application No.

(Continued)

(51) Int. Cl.
| | | |
|---|---|---|
| *G06F 21/10* | (2013.01) | |
| *G06F 21/33* | (2013.01) | |
| *G06F 21/62* | (2013.01) | |
| *H04L 9/32* | (2006.01) | |
| *H04L 9/40* | (2022.01) | |
| *G06F 3/06* | (2006.01) | |

(52) U.S. Cl.
CPC ............ *G06F 3/0604* (2013.01); *G06F 3/067* (2013.01); *G06F 3/0622* (2013.01); *G06F 3/0631* (2013.01); *G06F 3/0644* (2013.01); *G06F 3/0659* (2013.01); *G06F 21/10* (2013.01); *G06F 21/335* (2013.01); *G06F 21/6218* (2013.01); *H04L 63/083* (2013.01); *H04L 63/0823* (2013.01); *H04L 63/0853* (2013.01); *H04L 63/108* (2013.01); *G06F 2221/2137* (2013.01); *H04L 9/3213* (2013.01); *H04L 63/0428* (2013.01); *H04L 2209/603* (2013.01)

(58) Field of Classification Search
CPC .... G06F 21/10; G06F 21/335; G06F 21/6218; G06F 2221/2137; G06F 21/33; G06F 21/62; H04L 63/0823; H04L 63/083; H04L 63/0853; H04L 63/108; H04L 9/3213; H04L 63/0428; H04L 9/32; H04L 9/40

See application file for complete search history.

(56) References Cited

U.S. PATENT DOCUMENTS

| | | | |
|---|---|---|---|
| 6,563,506 B1 * | 5/2003 | Wang .................. | G06F 13/1689 345/503 |
| 7,126,924 B2 * | 10/2006 | Suzuki .................. | H04W 76/38 455/343.1 |

(Continued)

*Primary Examiner* — Jayesh M Jhaveri
(74) *Attorney, Agent, or Firm* — Lightbulb IP, LLC

(57) ABSTRACT

A digital certification system (or "analyzer") provides protection for digital content stored on servers, file sharing systems, hard drives and USB enabled external drives or other digital repositories. The analyzer prevents unauthorized access from both owners/administrators and recipients of digital content being shared through a web based or file sharing type service. The analyzer protects the owner of the shared digital content from unauthorized access, while allowing multiple protection instances to be applied to multiple digital content shares within a digital file hosting and sharing environment. Timers are provided to limit access to digital content at the discretion of the owner of the digital content.

20 Claims, 28 Drawing Sheets

Related U.S. Application Data

15/208,012, filed on Jul. 12, 2016, now Pat. No. 9,565,184, which is a continuation-in-part of application No. 14/501,447, filed on Sep. 30, 2014, now Pat. No. 9,419,965.

(56) References Cited

U.S. PATENT DOCUMENTS

| | | | | |
|---|---|---|---|---|
| 8,264,984 B2* | 9/2012 | Nakano | ............... | H04L 63/08 370/254 |
| 9,742,737 B2* | 8/2017 | Steiner | ............... | H04W 64/003 |
| 2002/0184303 A1* | 12/2002 | Uner | ............... | H04L 67/02 709/203 |
| 2004/0059909 A1* | 3/2004 | Le Pennec | ............... | H04L 63/12 713/153 |
| 2005/0044240 A1* | 2/2005 | DePree | ............... | H04L 69/28 709/227 |
| 2011/0209196 A1* | 8/2011 | Kennedy | ............... | H04L 63/101 726/1 |
| 2013/0174223 A1* | 7/2013 | Dykeman | ............... | G06F 21/10 726/4 |
| 2014/0359272 A1* | 12/2014 | Hiltunen | ............... | H04W 12/50 713/150 |

* cited by examiner

DIGITAL CERTIFICATION SYSTEM

CROSS-REFERENCE TO RELATED APPLICATION

This application is a continuation of U.S. patent application Ser. No. 15/486,301, filed, Apr. 13, 2017, which is a continuation-in-part of U.S. patent application Ser. No. 15/385,868, filed Dec. 21, 2016, now U.S. Pat. No. 9,723,090, which is a continuation-in-part of U.S. patent application Ser. No. 15/208,012, filed Jul. 12, 2016, now U.S. Pat. No. 9,565,184, which is a continuation-in-part of U.S. patent application Ser. No. 14/501,447, filed Sep. 30, 2014, now U.S. Pat. No. 9,419,965.

BACKGROUND OF THE INVENTION

Field of the Invention

This invention relates to identity authentication and verification as it pertains to securing and accessing content in a digital environment.

Related Art

The devices, features, and functions described herein are intended to address shortcomings that currently exist within the digital security and password protection marketplace. There are currently a variety of ways for users to secure and protect their digital content and authenticate or validate their ownership and/or control of their content with the use of passwords.

Other digital identification and password protection systems known in the prior art exist that provide varying layers of protection. Such prior art systems employ a variety of methods to protect and/or secure content within a digital realm. These protection methodologies are often referred to as "password protection", and require a user to create a password or code that enables them to access their digital content (such as email or other online secure access entity). These passwords are designed to protect content that is in the immediate control of the content owner or host.

From the discussion that follows, it will become apparent that the present invention addresses the deficiencies associated with the prior art while providing additional advantages and benefits not contemplated or possible with prior art constructions.

SUMMARY OF THE INVENTION

A digital certification system (or "analyzer") is described herein. The analyzer is used to provide certification and positive identification of digital identities within computing systems. As will be detailed further below, the system provides an alternative to traditional digital identity certification systems, while enhancing the overall security of digital content being stored, shared and/or accessible within a digital environment. The analyzer disclosed herein can be utilized as a stand-alone system to protect digital content, or can be deployed as a module to existing systems to enhance privacy and security of content stored within a digital environment.

Unlike existing art systems, the analyzer can be utilized to protect and secure digital content down to the file level. Specifically, digital content such as files, folders, directories, sub-directories, hard drives and other storage mechanisms can be protected with a high degree of granularity, while offering separate protection and locking mechanisms for each individual area of storage. As an example, an owner could utilize the analyzer to protect their hard drive, and separately protect individual folders, files or directories. Much like locking individual doors in a home, the analyzer applies multiple layers of protection to digital content storage systems.

In one preferred embodiment, the system is utilized in conjunction with a file sharing system, such as publicly available systems such as Dropbox, SugarSync, etc. The analyzer addresses additional specific needs, including but not limited to, providing a system to analyze, certify and authenticate the identity of a recipient of digital content shared or otherwise transferred between parties within a digital realm. Current systems address the need for protecting the digital content owner while content is stored within a digital environment, but neglect to address the protection of digital content in an environment where the content passes from one user to another, or is otherwise "shared" within the digital realm.

Further, existing systems engage a single layer of protection (such as a username and a password) to protect digital content. The analyzer described herein utilizes a multi-layered approach to protecting content stored, shared and/or accessible within a digital environment.

The analyzer provides multiple layers of protection for digital content residing in a host storage location, as well as digital content that has otherwise been transmitted to, or shared with a recipient in a different location. As an example, a file owner may enact the analyzer to protect their digital content being stored in a personal computer, but may also share their digital content with a friend and utilize the analyzer to apply multiple layers of protection on the shared file. This provides a significantly higher level of asset privacy and protection while sharing digital content online or otherwise in a digital environment.

The analyzer is a software based system and, in one or more embodiments, is stored on a tangible medium, such as a magnetic, optical, flash or other media type drive or storage repository. The analyzer may be installed on one or more devices (such as a laptop, smartphone, tablet or other smart device), or be hosted within a secondary system, such as a file sharing system. One such file sharing system (StoAmigo) utilizes the analyzer to protect digital content stored and shared by owners of the system from unauthorized access. This file sharing system (StoAmigo) is utilized throughout this submission to illustrate the preferred embodiments of the analyzer.

While this submission shares many examples utilizing the StoAmigo file sharing system, the analyzer may be used in other file sharing systems including (but not limited to) Dropbox, SugarSync and other "cloud storage" type systems. The analyzer can be incorporated into any system wherein digital content is stored on a hard drive, USB drive, server, network, tablet, smart-type device, PC, cell phone or any other repository where digital content can be stored and accessed.

The analyzer can be utilized as a component to an existing system such as an email system, FTP (File Transfer Protocol) server or other system where digital content is stored and accessible within a digital environment.

The analyzer may also be deployed by a bank or other financial institution as a privacy and security component for their existing network. Specifically, the analyzer can be utilized to protect content shared by the bank or financial institution such as electronically transferred bank statements. Additional scenarios exist for protecting digital content while shared through the Internet or other digital environment that are applicable to the analyzer, but are not mentioned in this submission.

The analyzer can be used as a method to authenticate and certify ownership or rights of access within a file sharing system, or can be used to protect digital content when shared (or transferred between) parties in a digital environment.

In one preferred embodiment, the analyzer may be used to grant access to digital content on a timed basis. Specifically, once the secured access session begins, a session timer may be activated. This session timer will limit the access to the content to a time specified by the administrator or the digital content owner. In one embodiment, the session timer may be set by the digital content owner to limit the time a file or folder may be accessed during a file share. This would be particularly useful in an environment where a person (or persons) was participating in a timed event online such as a test. The session timer would expire upon completion, limiting access to the secured content.

The analyzer can secure and protect content in a digital environment, allowing access based on a series of authentication steps taken by either the owner of the digital content being protected, or by the recipient of the digital content being shared in a digital realm. These "secure sessions" enable the owner of the digital content being protected to control access to digital content that is being hosted locally on a device such as a computer or laptop, or can protect digital content in a cloud environment such as a web based server or cloud-type storage facility.

Other systems, methods, features and advantages of the TESS system will be or will become apparent to one with skill in the art upon examination of the following figures and detailed descriptions. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
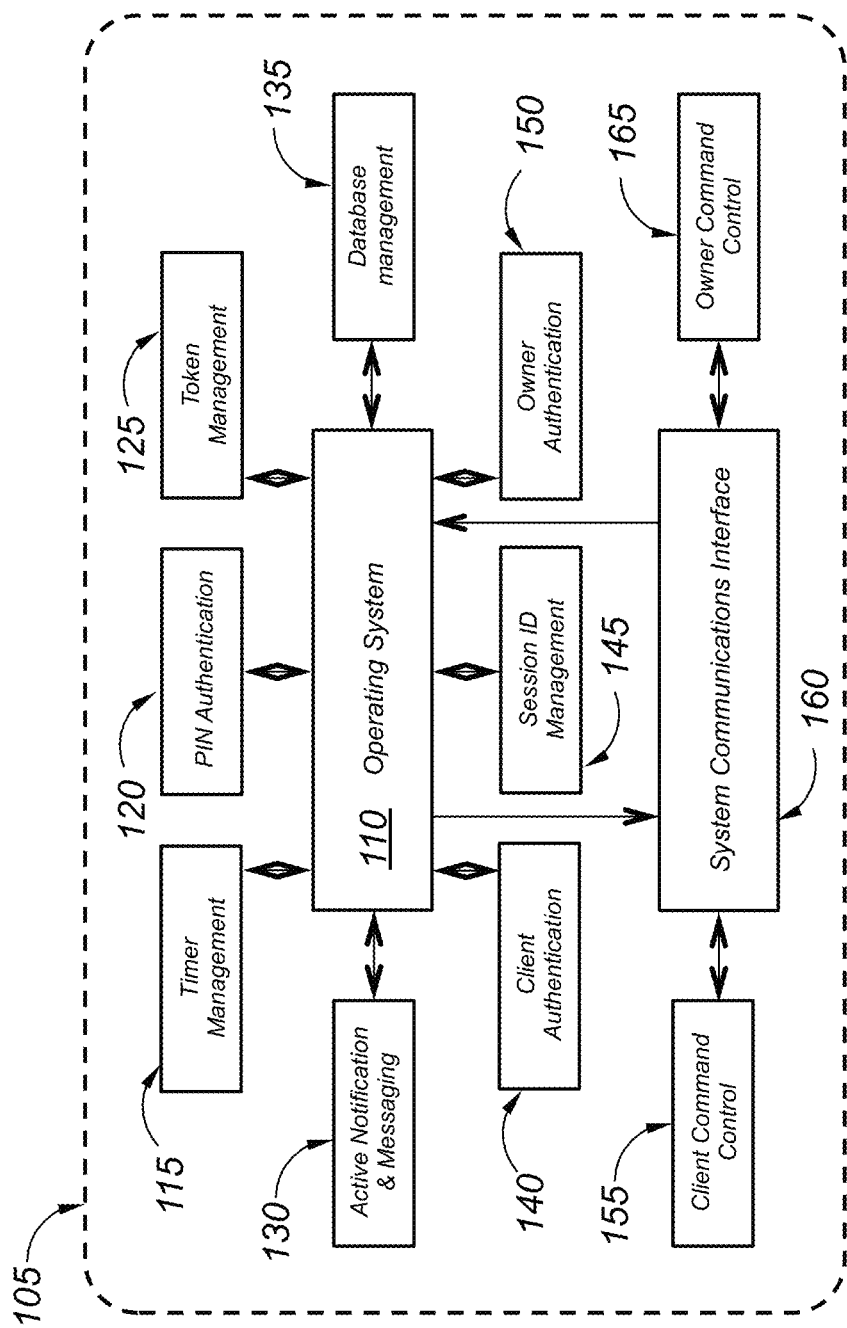
FIG. 1 is a block diagram of the framework and key components of the analyzer.

In the following description, numerous specific details are set forth in order to provide a more thorough description of the present invention. It will be apparent to one skilled in the art that the present invention may be practiced without these specific details. In other instances, well-known features have not been described in detail so as not to obscure the invention.

The analyzer allows owners and administrators of digital content to protect their content within a digital environment such as a hard drive, USB drive, server, cloud network or other environment where digital content is stored, transferred and/or shared. The analyzer utilizes a series of passphrases and codes that certify, validate, and authorize a session to occur for access to the digital content being protected. Digital content (such as files, folder, directories, hard drives, USB drives, servers, etc.) can be secured using this system, preventing unauthorized access while the content is stored in a digital environment, or while it is otherwise being shared with one or more recipients.

The analyzer provides a session timer that can be engaged by the system administrator or the digital content owner, allowing the access time to the digital content to be restricted to a specific period of time. The session timer can be managed in increments of one minute (60 seconds) and can be extended for any duration required by the content owner or administrator, and as many times as desired. Specifically (as an example) the session timer can be set to extend a secured access session for 5 minutes. Once the 5 minutes have expired, the session timer can be extended again. This process can be repeated. The session timer can be enabled or disabled at any time by the system administrator or the digital content owner. In addition to the ability to extend secure sessions, the session timer is capable of limiting the number of sessions to access digital content.

The session timer can be set to limit or control access time associated with anyone accessing the digital content. Specifically, the owner of the digital content can choose to apply the timer to their own access, or to the access of a recipient that the content has been assigned to, transferred to, or otherwise shared with using a file sharing or file transfer type system. The session timer can serve as a safety device for the owner of the content, preventing access after a predefined amount of time (set by the owner) or after a period of inactivity.

The analyzer provides a token timer that can be configured by the administrator or the owner of digital content to set the expiration time and/or date of a token being sent from the system to certify access authorization. The token timer can be managed in one minute intervals and is intended to allow the administrator to restrict the amount of time a certification token is authorized for use. This prevents the token from being mismanaged or utilized in an unauthorized fashion.

The analyzer provides a share timer that allows the administrator or the owner of digital content to set an expiration time and/or date for content shared through the analyzer. This share timer can be configured independently of the token and session timers, and can be used to apply additional security layers to digital content that is either shared through, or accessed through the analyzer.

The session timer and the token timer can be applied to the owner/administrator account, or applied to the recipient of shared digital content, at the discretion of the owner/administrator. The share timer can only be applied to recipients of shared digital content.

The analyzer can be applied to, or incorporated into any system that provides storage for digital content such as a hard drive, USB drive, server or other entity where digital content can be stored. The analyzer can be configured to protect the entire device or drive, or can be configured to protect only specified files, folders or directories. Additionally, more than one instance of the analyzer can be assigned to a single device. This (as an example) would allow a digital content owner to allow multiple recipients to access different sections (or folders as an example) within the same device or drive. Each application of the analyzer will separately control and protect each area of digital content it is assigned to. Each application of the analyzer will have an independent timer (share, token and session) and independent access permission and password configurations.

It is important to note that while other aspects of operation and functionality exist within the system, they have been purposely omitted to provide focus and clarity for the primary functional elements.

The primary components of the analyzer will now be discussed with reference to FIG. 1. FIG. 1 is a block diagram representing the analyzer 105 and its framework and key components. As can be seen in FIG. 1, the analyzer 105 contains an operating system 110. The operating system 110 provides an environment where the analyzer 105 can execute its instructions/operation. The analyzer 105 also contains a timer manager 115, a PIN authentication module 120 and a token manager 125. These three elements work in conjunction with the operating system 110 to manage the secured access sessions provided within the analyzer 105. The timer manager 115 controls the access timeframes defined by the digital content owner/administrator for the share timer, secure session timer and the token timer. The token manager 125 governs the creation and management of tokens used to gain access to secured content and initiate secured sessions. The token manager 125 works in conjunction with the operating system 110 and the timer manager 115 to control the timeframe(s) wherein a token is considered valid and active (as described in detail in discussions on the "token timer" found later in this submission).

The database management 135 provides information pertaining to the storage location of digital content as well as the existing access rights set by the owner or administrator of the digital content. The active notification and messaging module 130 provides communication functions between the analyzer 105 and the external users (not shown) engaging the system. Client authentication 140, session ID management 145 and Owner Authentication 150 are provided to allow external users (not shown) to gain access to the analyzer. The client authentication 140 serves as the authentication module that manages access to the system from a client port. The owner authentication 150 serves as the authentication module that manages access to the system from an owner or administration port. These modules are significantly different because the client authentication module 140 is used solely to engage a recipient of a share or of a file transfer, where the owner authentication module 150 is used to engage the content owner and/or administrator managing the content being protected by the analyzer 105.

The session ID management 145 manages the connection between the client authentication module 140 and the database management 135 where the content storage control is hosted. Each session has a different ID to ensure that the digital content being accessed or shared matches the recipient the content was shared with. If the client authentication 140 does not match with the session ID management 145, the connection to the database management 135 will not be established, and the digital content being shared will not be accessible. This authentication provides an additional layer of security for digital content being stored and shared through the system.

The analyzer also provides a system communications interface module 160 that controls input commands and routing from users engaging the system. The client command control 155 works in conjunction with the client authentication module 140 through the system communications interface 160. The owner command control module 165 works in conjunction with the owner authentication module 150 through the system communications interface 160. The communications interface 160 may comprise or control one or more wired or wireless network interfaces or other communication devices.

The component modules provided in FIG. 1 work together to form the framework of the analyzer 105. By separating the client command control 155 and client authentication 140 from the owner command control 165 and owner authentication 150 the analyzer 105 provides added levels of security and protection for digital content protected by the system.

The analyzer provides the capability to create a "session" for accessing the digital content. The session is the timeframe that the content will be accessible through the system, by the person(s) authorized within the analyzer to access the digital content. The access sessions are controlled by the owner of the digital content, and can be passed to the recipient of the digital content. As an example, the owner of digital content (e.g. a folder) may choose to share that folder with a client/recipient. The owner of the folder can set a session access timer to limit the amount of time the folder is accessible to the client/recipient. Further, the owner may choose to change this timer at any time, even after the initial setting and activation of the timer has begun. The owner of the digital content (folder) may also choose to allow the client/recipient of the shared folder to extend their access to the folder by allowing the client/recipient to extend the session. The client/recipient extension of a session is discussed later in this submission.

The session protocol for the analyzer is structured to allow users of the system to create an identity within the framework, allowing a primary (tier 1) type access to the shell of the system. Within this framework, parties can share electronic data in a secure environment. In addition to the primary access established during the identity creation process, a secondary (tier 2) access is provided to enhance the security and privacy of data further. The secondary (tier 2) access utilizes the PIN created during the identity creation process, coupled with a token system that delivers a single-usage type digital passcode for system access. In addition to the token, the system utilizes session identification (ID) to verify that the token request is valid and matches the PIN generation location. The session ID is sent to the analyzer along with the PIN to ensure the session ID matches the session created when the primary (tier 1) access was validated. This additional step ensures positive identification and certification prior to enabling access to digital content protected by the analyzer.

Figure 2A:
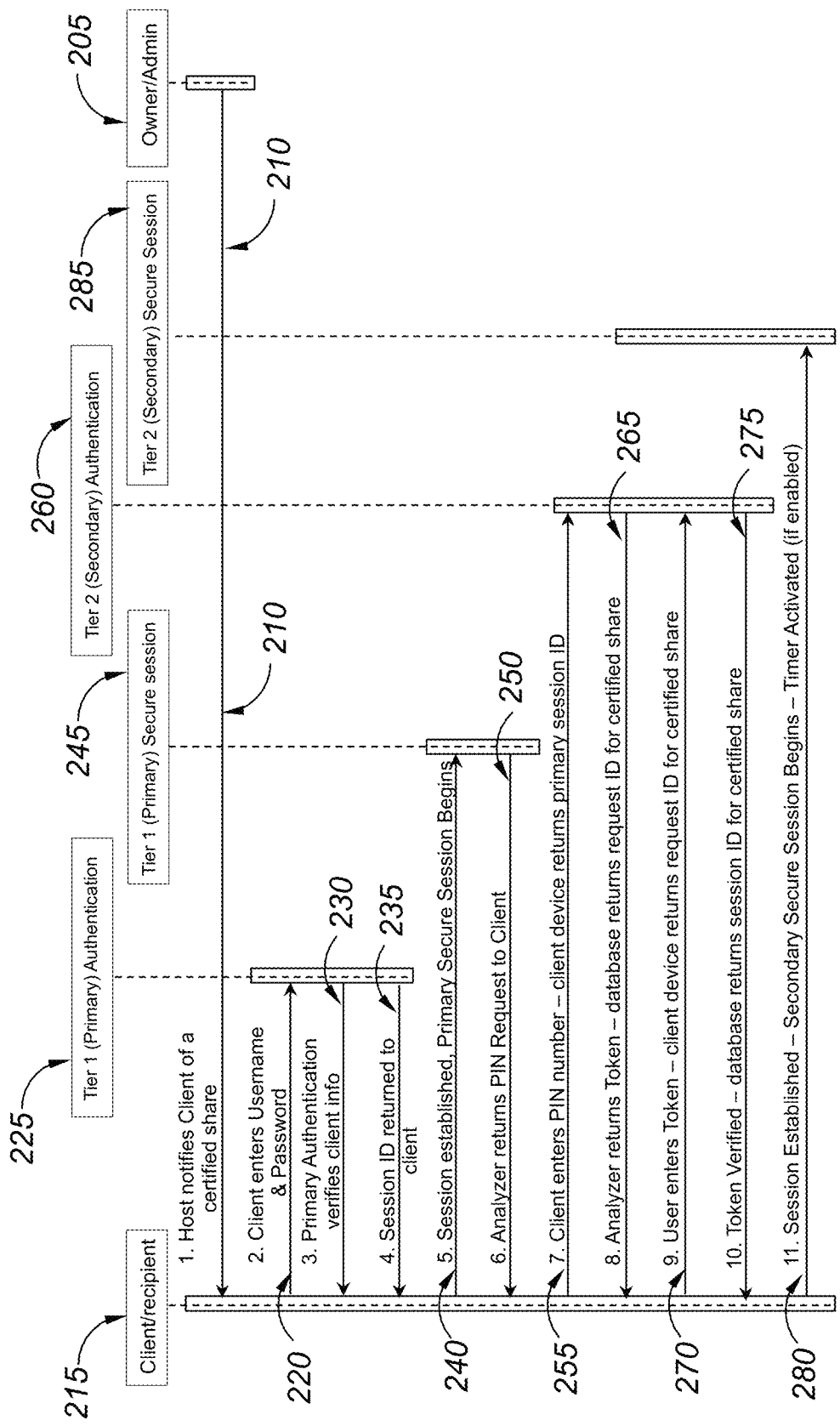
FIG. 2A is a diagram of the session protocol for authenticating a recipient of shared digital content.

The session protocol for the analyzer will now be discussed with reference to FIG. 2A. The process depicted in FIG. 2A shows a general usage scenario wherein one person wishes to share digital content with another person. The scenario depicted in FIG. 2A assumes both the owner/administrator and client/recipient have created primary user identities within the analyzer. It is not required for a client/recipient to be a registered user to receive the notification that digital content is being shared, but it will be required for them to access the digital content. An explanation of system utilization where the client/recipient 215 is not a registered user of the system is provided later in this submission.

Referring to FIG. 2A, the process begins when the owner/administrator 205 shares digital content with the client/recipient 215. The share notification 210 can come in the form of an email, an SMS generated by the analyzer, a text message or other commonly known form of providing a notification or message within a digital environment.

As the client/recipient 215 activates the link provided in the notification 210, the primary authentication process begins. The analyzer will prompt the client/recipient 215 to enter a username and password 220. As the username and password 220 are entered into the analyzer, the primary authentication module 225 will validate the username and password 230 as being registered within the system and return a session ID 235 to the client/recipient 215. Upon receiving the session ID 235 from the primary authentication module 225, the primary session 240 is established between the client/recipient 215 and the secure session module 245. This step begins the primary secure session 245. The analyzer secure session module 245 now returns a PIN request 250 to the client/recipient 215. The purpose of this PIN request is to allow the client/recipient 215 to proceed into the secondary (tier 2) secure session 285. If the client/recipient 215 chooses to deny the request for PIN, they will remain in their primary secure session, but not be able to access the digital content provided in the certified share notification 210 shared by the owner/administrator 205.

As the client/recipient 215 enters their PIN, the client device returns the PIN and the primary session ID 255 to the secondary authentication module 260. This step is vital to the process because the primary session ID 255 being returned during PIN authentication must match the primary session ID provided to the client/recipient 215 during the tier 1 (primary) authentication step 235.

The tier 2 (secondary) authentication 260 module now returns a token 265 and a request ID for the certified share session to begin. The request ID notifies the client/recipient 215 of the location of the digital content provided in the owner/administrator 205 certified share notification 210 during the initial share process. The location of the digital content is a key element in allowing the client/recipient to access the shared digital content.

The client/recipient 215 enters the token 270 information provided by the analyzer 265. As the client/recipient token information 270 is being returned to the analyzer, the client/recipient device is also sending a request for a secure session ID, so that a secure session can begin. Here again, the request ID 270 for the certified share must match the request ID 265 provided to the client/recipient 215 and client/recipient device.

The tier 2 secondary authentication 260 module verifies the token 275 and returns a session ID for the certified share. At this point, the tier 2 (secondary) secure session 285 is active and a session timer begins. The client/recipient 215 now has access to the digital content shared by the host 205. The session 280 is established and the secondary secure session begins 285.

If the share timer is enabled on this share, the share timer will become active 280 as the share is accessed by the client/recipient 215. The share will end when the timer expires. If the session timer is enabled, it will also begin as the share is accessed by the client/recipient 215. The share will terminate when the share timer or the session timer expires (assuming they are enabled). The timer with the earliest expiration time and date will govern the expiration of the share. The share timer and the session timer are explained in detail later in this submission.

The analyzer can be incorporated into existing architecture to secure and protect components of an overall larger computer based system. Specifically, while other protection methodologies protect at the system level, the analyzer can protect down to the file level. The architecture of the analyzer allows for multiple protection instances to appear within the same digital infrastructure. This allows for the protection of files, folders, directories, sub-directories, individual USB or external drive ports, and the sub-folders, directories and files of these USB enabled devices.

As described above, the analyzer has a primary and secondary authentication tier to enable multiple layers of protection for digital content being stored and/or shared within a digital environment. The analyzer may be configured to allow management, sharing, storing, copying, renaming and other digital content based management functions after the primary (Tier 1) authentication has taken place. As an example, the analyzer may be deployed and configured on a publically available file sharing system such as Dropbox or StoAmigo to enable a digital content owner to manage their own stored digital content immediately upon the initiation of a Tier 1 primary authentication session. The analyzer may be further configured to prevent shared digital content from being accessed by a recipient party, without the recipient party executing the Tier 2 (secondary) authentication steps. The functions taking place within Tier 1 (primary) and Tier 2 (secondary) authentication may be configured by the entity deploying the analyzer.

In the example of a publically available file sharing system as mentioned above, it would be common to allow the owner of digital content to access and manage their own content with Tier 1 (primary) authentication, but require stricter access and authentication on shared digital content by implementing a Tier 2 (secondary) authentication to gain access.

As stated previously, the analyzer can be utilized to protect systems (such as network servers, sharing servers, and storage servers) and devices (such as external hard drives, laptops, tablets, USB hard drive sticks and other devices with data storage capability). In addition to these functions, the analyzer provides protection of digital content down to the file, folder, sub-directory and directory levels. It is important to note that the analyzer can be accessed remotely from any smart-type device (smartphone, tablet, PC, laptop, etc.) so it is not necessary that the user be collocated with the system hosting the analyzer to access it.

In a typical environment wherein sharing and management of digital content takes place, the analyzer can be utilized to protect access to digital content. As previously stated, the analyzer is a software algorithm and can be installed as a component of a file sharing system or other environment wherein digital content is stored, shared, moved, copied, created, saved and otherwise managed. The analyzer can be installed on a magnetic-type drive, hard drive, solid state drive or other storage entity capable of facilitating the storage of digital content.

Figure 2B:
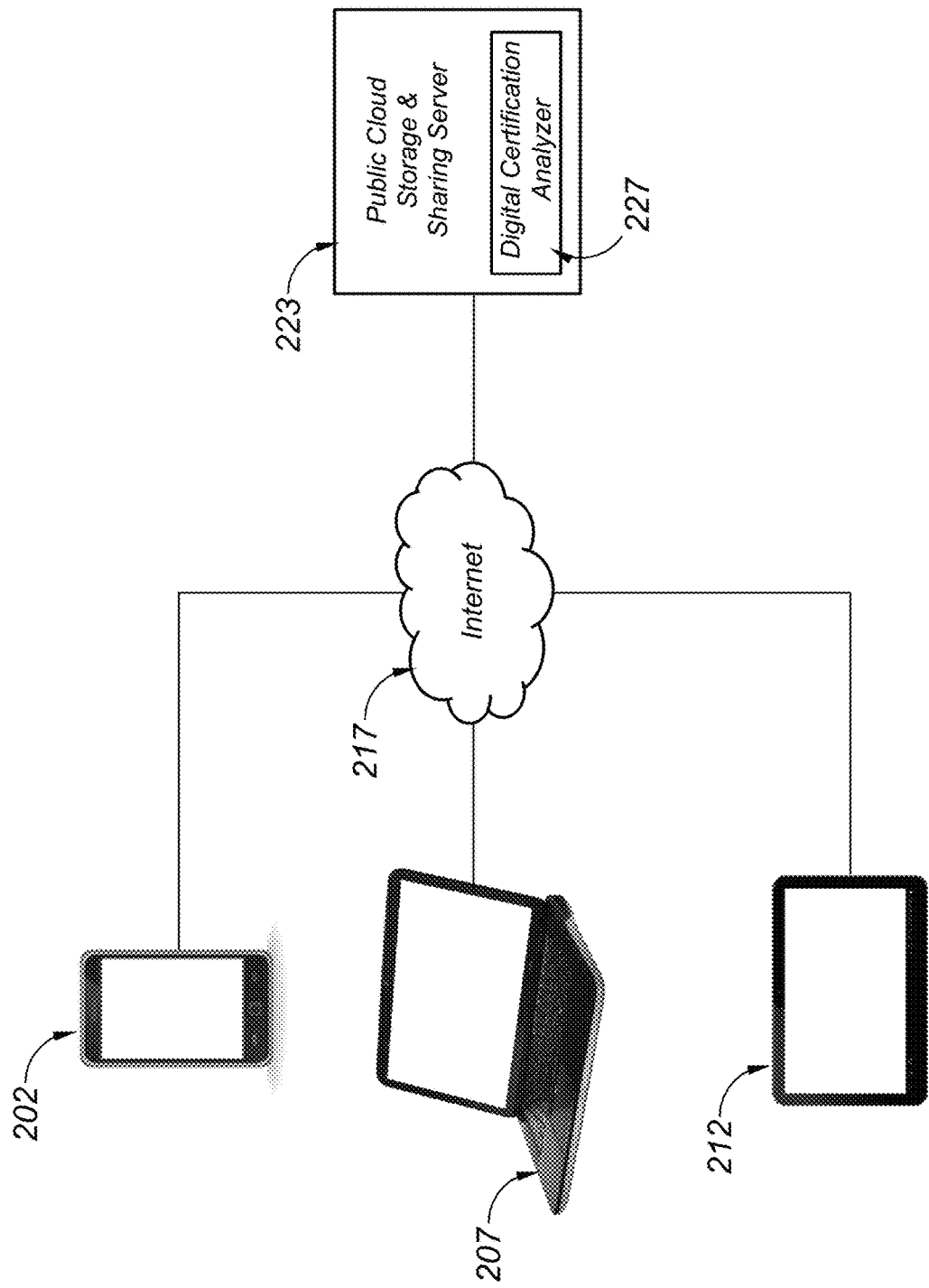
FIG. 2B is a diagram illustrating the architecture of the analyzer in use within a public cloud storage and sharing server.

A typical implementation of the analyzer will now be discussed with reference to FIG. 2B. FIG. 2B represents a typical environment wherein multiple devices and/or users are connected to a public cloud storage and sharing server through the internet. The user devices can be any smart-type device capable of interacting with the internet, and a generally known file storage and sharing system. Device types can be (but are not limited to) smartphones 202, laptop computers 207 and tablet 212 devices. Each device is connected to the internet 217 to establish connection with the public cloud storage and sharing server 223, such as via one or more communication links. One or more wired or wireless communication devices may establish and conduct such connection. The analyzer 227 has been installed on the public cloud storage and sharing server 223 to enable enhanced data protection and management.

As an example of the analyzer functionality, the smartphone 202 wishes to access their personal digital content on the public cloud storage and sharing server 223. The process to access begins by the smartphone 202 authenticating access rights by entering their respective username and password into the public cloud storage and sharing server 223. This information is sent from the public cloud storage and sharing server 223 to the analyzer 227 for verification. Once verified, the smartphone 202 may gain Tier 1 (primary) access to the digital content being stored within the public cloud storage and sharing server 223. It is important to note that the public cloud storage and sharing server 223 may set parameters as to what digital content may be accessed during Tier 1 (primary) access sessions. As an example, a Tier 1 (primary) access may grant the smartphone 202 access only to digital content that was uploaded and/or otherwise stored on the public cloud storage and sharing server 223 by the smartphone 202. Specifically, the analyzer may restrict access to other digital content, such as shared digital content that has been deemed restricted by the public cloud storage and sharing server 223.

In this example, the Tier 1 access granted may give the smartphone 202 the capability of uploading, downloading, renaming, copying and sharing of digital content that the smartphone 202 specifically uploaded to the public cloud storage and sharing server 223, but restrict other activities and access to digital content that has been shared, or deemed more proprietary by the system configuration of the public cloud storage and sharing server 223.

Continuing to refer to FIG. 2B, the smartphone 202 (as stated above) is currently engaged with the public cloud storage and sharing server 223 with Tier 1 access, as governed by the analyzer 227. The smartphone 202 now wishes to access more restricted content within the public cloud storage and sharing server 223. Here again, the restrictions placed on the content will be determined by the service provider, in this case, the public cloud storage and sharing server 223. As the smartphone 202 seeks to engage the restricted content, the analyzer 227 will notify the public cloud storage and sharing server 223 of the access attempt, prompting the analyzer 227 to send a request through the public cloud storage and sharing server 223 to the smartphone 202 for a PIN. As stated previously, the PIN is created during the registration process wherein the owner/user of the smartphone 202 creates an account with the public cloud storage and sharing server 223 that is utilizing the analyzer 227.

The owner/user of the smartphone 202 will enter the PIN, which is transmitted to the public cloud storage and sharing server 223, and the analyzer 227. The analyzer 227 will authenticate or deny the PIN as authentic, based on the information stored within the database of the analyzer. The database information (not pictured) contains details on digital content access rights, locations, permissions and other vital information governing access to protected digital content. Assuming the analyzer 227 approves the PIN that was submitted through the smartphone 202, the analyzer 227 will return a token to the smartphone 202. The token will be delivered in a manner that was determined and programmed into the analyzer 227 at the time of account creation (but may be changed at any time by the user) within the public cloud storage and sharing server 223, just as the PIN as explained above.

Once the smartphone 202 user receives the token, it may be entered into the appropriate field on the smartphone 202 user interface (not pictured) and returned to the public cloud storage and sharing server 223 and the analyzer 227. The analyzer will verify that the token matches the PIN requesting access, and access to the restricted digital content will be granted. Here again, it is important to note that the restrictions, access and permissions are determined by the public cloud storage and sharing server 223 and governed by the analyzer 227. The host system (in this case the public cloud storage and sharing server 223) may set and manage restrictions and access permissions within the analyzer 227 to achieve the desired level of security, privacy and protection of digital content.

In another example utilizing FIG. 2B, we assume that the owner/user of the smartphone 202 wishes to share digital content with the owner of the laptop 207 from the public cloud storage and sharing server 223. The owner/user of smartphone 202 wishes to protect the digital content being shared, to ensure that the recipient (laptop 207) authenticates their ownership and access rights prior to gaining access to the digital content being shared. The owner of smartphone 202 will select the digital content they wish to share with the recipient laptop 207, and select Tier 2 protection for the share. Once the Tier 2 protection is requested, the analyzer 227 will request authentication from the smartphone 202 to ensure that the person executing the command has the proper credentials to do so. Once the smartphone user 202 returns their credential validation (typically a PIN), the analyzer 227 will apply the Tier 2 protection algorithm to the digital content being shared from the smartphone 202 to the laptop 207 through the public cloud storage and sharing server 223. The smartphone 202 will now execute the share utilizing the typical sharing configuration settings contained within the public cloud storage and sharing server 223.

Once the laptop receives the share 207, they will be required to enter their Tier 1 access information, typically a username and a password. Once the Tier 1 access has been granted, the laptop 207 user will be asked to enter their specific PIN. Again, this PIN was created when the initial registration for service with the public cloud storage and sharing server 223 was initiated and the user account (representing laptop 207) was created. Once the PIN has been entered by the user of laptop 207, it will be sent through the public cloud storage and sharing server 223 to the analyzer 227.

The analyzer 227 will validate the PIN utilizing the database (not pictured) wherein permissions, access rights, digital content locations and other vital information pertaining to the digital content is stored. Once the validation of the PIN has been completed, the analyzer 227 will send a token to the laptop 207. The token will allow the laptop 207 access to the secured digital content being protected by the analyzer. Once the token has been entered, secured access is granted by the analyzer 227.

In another functional implementation of the analyzer (continuing to use FIG. 2B) the laptop computer 207 wishes to share digital content with the owner of the tablet 212. The digital content has been deemed by the laptop computer 207 as confidential, requiring Tier 2 authorization be granted by the analyzer to ensure the identity of the tablet (user) 212.

Utilizing the analyzer, the owner of the laptop 207 may initiate a share through the public cloud storage and sharing server 223, with the user of the tablet 212, that requires additional (Tier 2) authorization. As the laptop 207 initiates the share with the tablet 212, the laptop 207 will notify the analyzer that the shared digital content is proprietary and requires additional authentication of access rights (through the analyzer 227) to access the shared digital content.

As the recipient tablet 212 receives the share notification, they will initiate access. If the recipient tablet (owner) 212 is currently logged into the public cloud storage and sharing server 223 (via the analyzer 227), the recipient tablet 212 will be prompted to enter their PIN as an initial step in validating their access permissions to the shared digital content. If the recipient tablet 212 is not currently logged into the public cloud storage and sharing server 223 (via the analyzer 227) they will first be required to enter their Tier 1 access as described above in the first example.

Once the recipient tablet 212 enters their PIN, the analyzer 227 will analyze and validate the PIN via the database (not pictured) and reply through the public cloud storage and sharing server 223 to the recipient tablet 212 with a token. The recipient tablet 212 will be prompted by the analyzer 227 to enter the token in the appropriate field, which will then be returned to the analyzer 227. Utilizing the database (not pictured) within the analyzer, the token returned by the recipient tablet 212 will be compared to the digital content request, the digital content permissions and access rights, and the digital content physical location to determine if the token received is valid. Assuming the token is validated, the analyzer 227 will instruct the public cloud storage and sharing server 223 to grant access to the recipient tablet 212 for the shared digital content. It is important to note that access granted will be governed by the permission and access settings within the analyzer 227, as set by the laptop 207 initiating the share. These permissions may be programmed and configured by the host public cloud storage and sharing server 223 at the time of implementation of the analyzer 227 software.

As discussed previously, the analyzer provides the capability of protecting digital content within a digital realm, such as a file sharing system or other server in which digital content may be stored, accessed and/or shared between one or more recipients. The analyzer may be utilized by an individual user to protect their personal digital content stored in the cloud (as an example), or may be utilized to analyze and authenticate the identity of a recipient of shared digital content.

In a typical application of the analyzer, it may be installed on a file sharing server wherein digital content is stored, accessed and/or shared. These file sharing servers are typically located in the "cloud", where security issues are of grave concern since users and businesses typically do not have any control of the server, or whom may have access to it. In the following example, the analyzer is installed in a public cloud storage and sharing server, and accessed remotely through the use of a smartphone. The communication and command interaction of the analyzer as deployed within a public cloud storage and sharing server will now be discussed with reference to FIG. 3A.

Figure 3A:
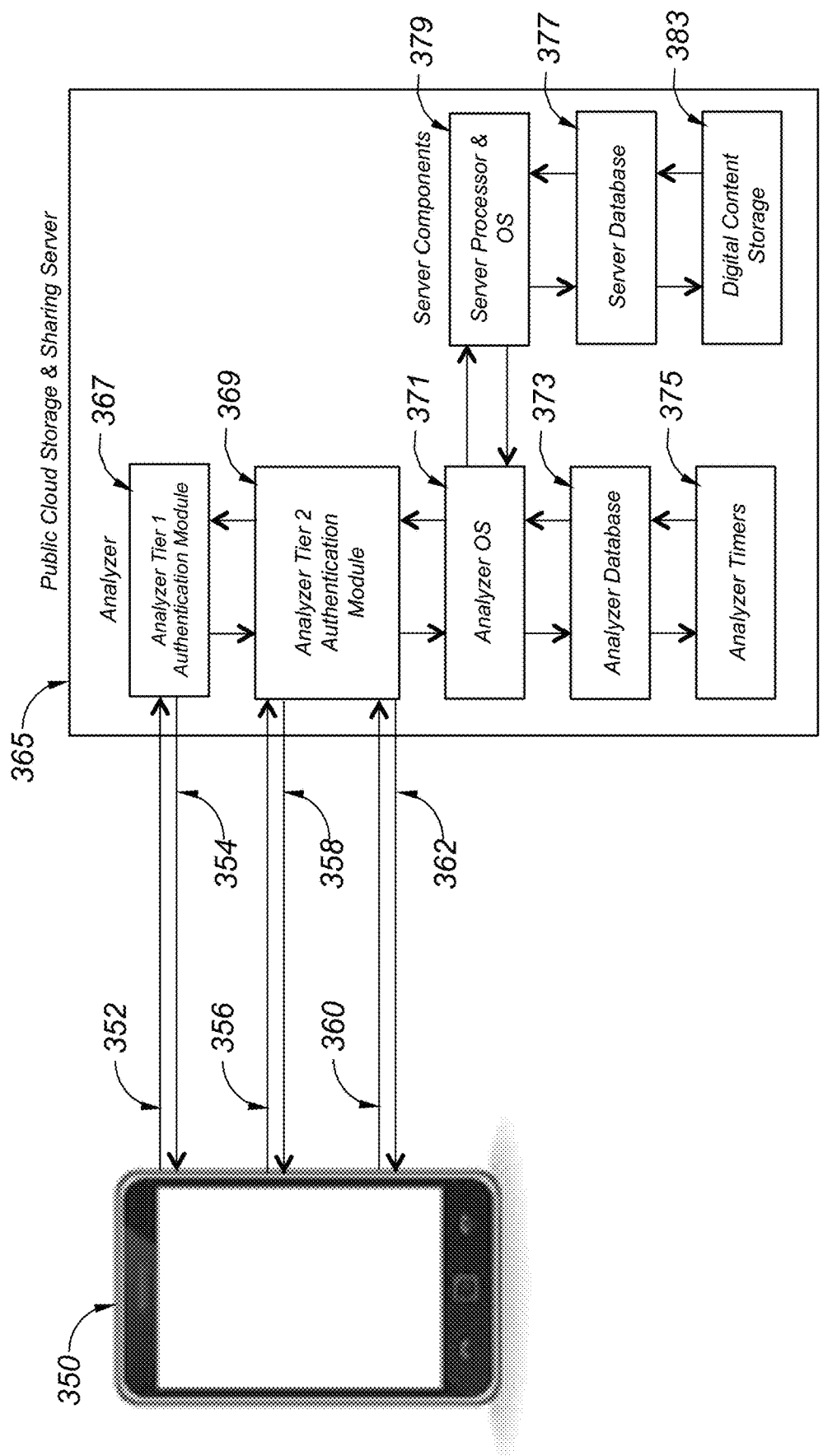
FIG. 3A is a diagram illustrating the storage device locking configurations.

FIG. 3A shows the communication and command interaction of a typical smartphone 350 seeking to connect to digital content stored within a public cloud storage and sharing server 365. While the smartphone 350 is used in the following example, any device capable of engaging the public cloud storage and sharing server (such as a PC, tablet, laptop or other computing device) may be used.

The initial communication takes place wherein the smartphone 350 accesses the public cloud storage and sharing server 365 by entering their login 352 information. The login information typically consists of a username and a password, and is passed to the public cloud storage and sharing server 365 to the analyzer Tier 1 authentication module 367. The analyzer Tier 1 authentication module 367 communicates with the analyzer operating system 371, and with the server processor and operating system 379 to obtain information from the server database 377, validating the account information entered by the smartphone 350. Once the server database 377 validates the account is present on the server and that the login information entered 352 is valid, the analyzer Tier 1 authentication module 367 will return a confirmation and a Tier 1 session ID 354 to the smartphone 350. This will begin the Tier 1 session, allowing the smartphone 350 to access to their personal digital content stored in the public cloud storage and sharing server 365 (digital content storage 383). It is important to note that the digital content storage 383 houses all digital content referred to in this example. In some cases, digital content may be accessible via Tier 1 (367) authentication, where as other digital content may require Tier 2 (369) access. The permission (Tier 1 or Tier 2) is placed on the digital content individually, and not on the container (digital content storage 383). The analyzer timers 375 will be initiated as the Tier 1 session ID 354 and authentication is returned to the smartphone 350. The timers are configured and set by the administrator of the public cloud storage and sharing server 365, and may be enabled/disabled as required. For the purpose of this example, we assume the timers are enabled and will allow the smartphone 350 to engage with the public cloud storage and sharing server 365 until a period of extended inactivity or smartphone 350 logout occurs. The timer configuration information is stored in the analyzer database module 373 and configured by the public cloud storage and sharing server 365 administrator(s).

Now that the Tier 1 session is active, the smartphone (user) 350 may request Tier 2 activation, enabling the smartphone (user) 350 access to more secure content. Here again, it is important to note that the content deemed to be more secure is controlled by the public cloud storage and sharing server 365. For this example, we will assume that the smartphone (user) 350 wishes to access personal digital content stored within the digital content storage 383 that they themselves (smartphone 350) deemed proprietary, and have required Tier 2 access for anyone (including themselves) trying to access the digital content.

As the smartphone (user) 350 initiates access to the digital content held in the digital content storage 383, protected under Tier 2 authorization, the analyzer operating system 371 working in conjunction with the server processor and operating system 379 will notify the smartphone (user) 350 that the digital content (stored in the digital content storage 383) is protected, and additional authorization is needed. The smartphone (user) 350 will enter their PIN 356 which will be sent to the analyzer Tier 2 authentication module, along with the Tier 1 session ID that was assigned by the analyzer Tier 1 authentication module during primary (Tier 1) access.

Assuming the PIN and Tier 1 session ID are validated by the analyzer Tier 2 authentication module 369, the analyzer Tier 2 authentication module 369 will return a token 358 to the smartphone 350 as a confirmation of authentication. The smartphone (user) 350 will then be prompted to enter the token received from the analyzer Tier 2 authentication module 369 into the associated field (not shown).

The smartphone 350 will return the token 360, along with the Tier 1 session ID (previously assigned) as a validation that the smartphone 350 is authorized to access the restricted digital content stored within the digital content storage 383. The Tier 1 session ID is returned along with the token to validate the location of the device requesting access to the digital content. This step adds an additional layer of security to the digital content by ensuring that the device that established the Tier 1 session is the same device that will be granted Tier 2 authentication.

Assuming the token returned 360 to the analyzer Tier 2 authentication module is valid, and matches the Tier 1 session ID that is also returned 360 at the same time, the analyzer will provide a confirmation and a Tier 2 session ID 362. The smartphone 350 has now established Tier 2 secured access to the digital content stored within the digital content storage 383. The analyzer timer 375 will start, enabling the public cloud storage and sharing server 365 the ability to govern the amount of time the Tier 2 access will be valid. The analyzer timers 375 may be controlled and set by the administrators of the public cloud storage and sharing server 365, or the permissions to set and control the analyzer timers 375 may be granted to the digital content owner, in this case the smartphone (user) 350. Allowing the user (smartphone 350) to control the analyzer timer(s) 375 enables the user (smartphone 350) to initiate a share with one or more recipients, wherein the access to the digital content may be managed by the user (smartphone 350). One such case may be an instance where digital content (such as a college exam) is to be made available to one or more student recipients for a specified period of time. Once that time has elapsed, access to the digital content would expire.

Figure 3B:
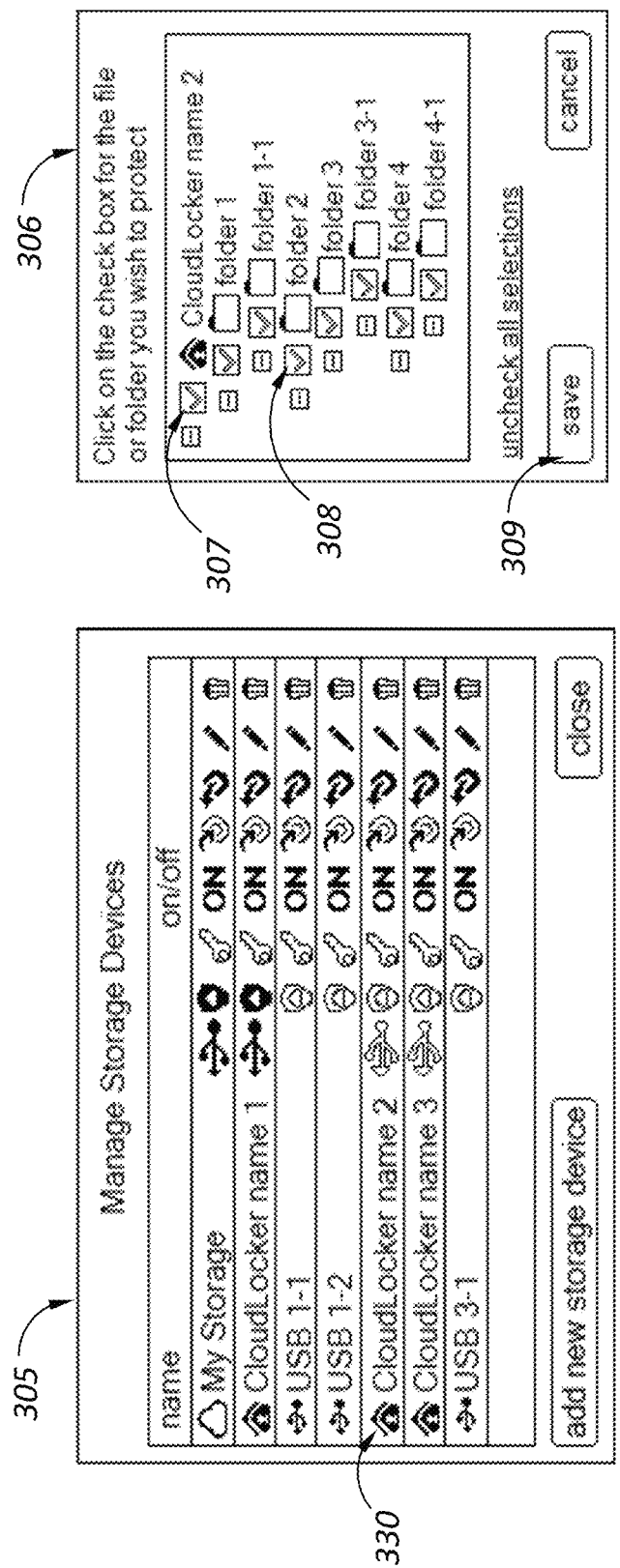
FIG. 3B is a diagram illustrating communication and command interaction.

Please note that the screen shots utilized in FIG. 3B show the analyzer used in conjunction with a cloud storage service (StoAmigo). While other configurations of the analyzer exist, the cloud storage representations were used for the ease of explanation.

Details of the protection methods and locking configurations of the analyzer will now be discussed with reference to FIG. 3B. FIG. 3B, reference 305 is a screen shot of the analyzer while being utilized as a component of the StoAmigo cloud storage/sharing platform. The StoAmigo platform is utilizing the analyzer to protect and secure both web-based storage (hosted in the cloud) and local storage (hosted off-cloud or on-premise).

For this example, the owner/administrator of the analyzer is applying protection to "CloudLocker name 2" 330. The owner/administrator will select "CloudLocker name 2" 330 which will open a window 306 providing details of the directory structure of "CloudLocker name 2" 330. As can be seen, check boxes 307/308 are provided next to each folder within each directory that exists in "CloudLocker name 2" 330. The owner/administrator can choose to protect the entire device with the analyzer by selecting the check box 307, or can choose to select any other directory, sub-directory, file or folder by selecting the check box (308 as an example) that appears next to digital content to be protected. Once the selection(s) are complete, the owner/administrator can save 309 their selections. Once the selections have been saved, the analyzer is active on the selected directory(s), file(s), folder(s), subfolder(s), subdirectory(s) or device(s), and can be enabled/disabled at the choosing of the owner/administrator. While the analyzer can protect an unlimited number of devices in a variety of locations simultaneously, the list of devices provided in reference 305 was limited to provide clarity. Each device managed through the analyzer can be accessed and controlled through the process detailed above.

Figure 4:
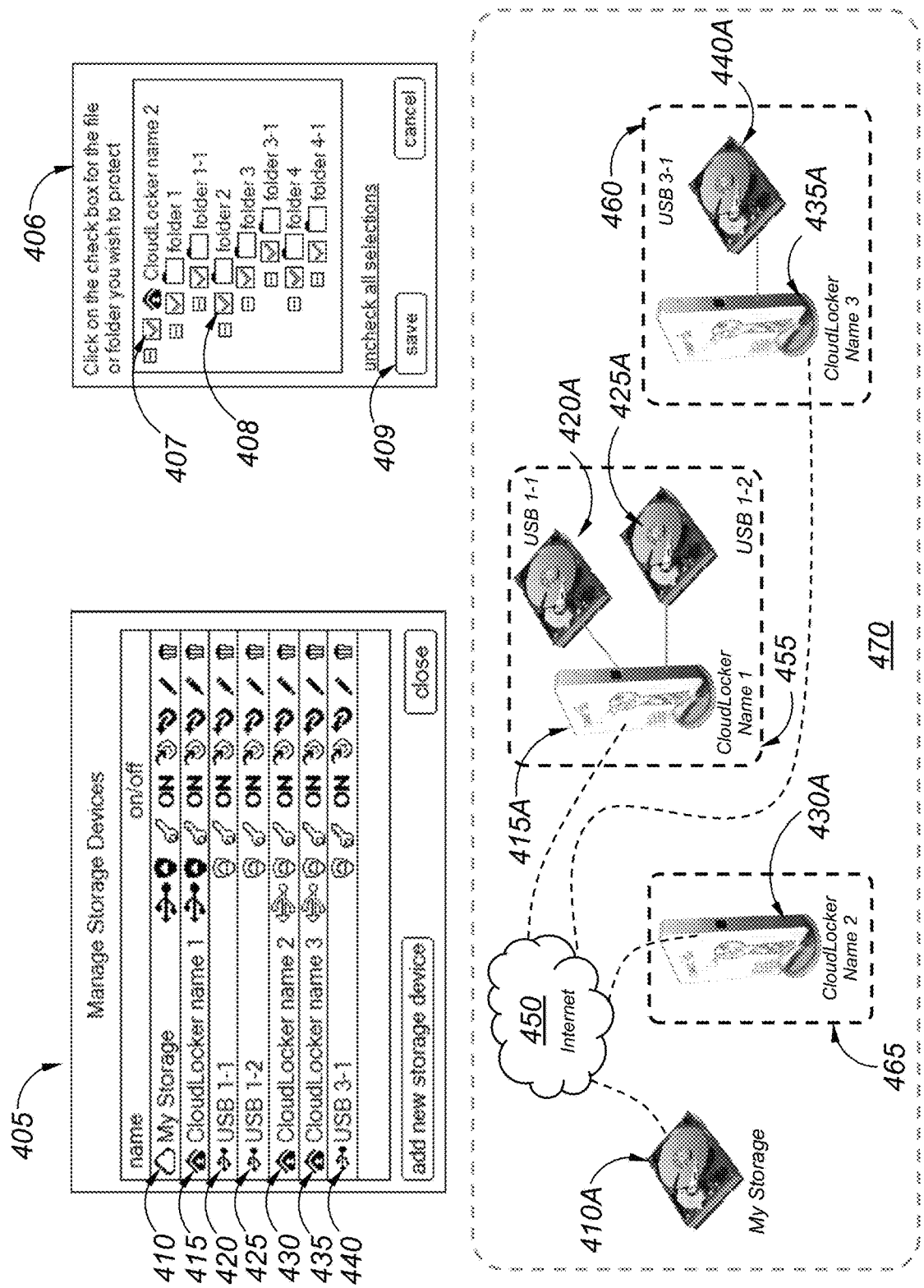
FIG. 4 is a diagram illustrating the analyzer controlling access to multiple devices.

The devices managed by the analyzer can exist in any geographic location where an Internet connection is available. FIG. 4 illustrates a typical configuration where the analyzer is used to control access to multiple devices in different locations, managed through a single owner or administrator.

Referring to FIG. 4, reference 405 is a screen shot from the StoAmigo file storage and sharing system. In the screen shot 405, the devices connected for the specific owner or administrator can be seen. These devices are "My Storage" 410, "CloudLocker name 1" 415; "USB 1-1" 420; "USB 1-2" 425, "CloudLocker name 2" 430, "CloudLocker name 3" 435, and "USB 3-1" 440.

Reference 470 of FIG. 4 shows the geographic locations of the devices being controlled from the analyzer control screen (FIG. 4, reference 405). It is important to note that these devices may or may not be collocated with each other, or with the analyzer. Since the devices being controlled are accessible through the Internet (world wide web) they can be accessed from anywhere an Internet connection exists, from an Internet capable device such as (but not limited to) a personal computer, smartphone, tablet or other smart-type device.

Each device shown in reference 470 is also shown in screen shot 405. Each device shown in reference 470 is illustrated in a specific geographic location and appended with the letter "A" to easily associate them with the references found in screen shot 405. As an example, reference

410 My Storage in screen shot 405 controls reference 410A My Storage shown in figure reference 470. Again, each physical device illustrated in reference 470 is connected to the analyzer through the Internet, and managed through screen shot reference 405.

Each physical device shown in reference 470 (My Storage 410A, CloudLocker Name 2 430A, CloudLocker Name 1 415A, USB 1-1 420A, USB 1-2 425A, CloudLocker Name 3 435A and USB 3-1 440A) are all managed and controlled from screen shot reference 405 utilizing the associated device names shown in the screen shot. Additionally, geographic locations (Home 465, Office A 455 and Office B 460) are provided to demonstrate the capability of the analyzer to manage devices at multiple locations simultaneously.

Each device, their respective directories, sub-directories, files, folders and USB connected devices can be individually protected and accessed utilizing the analyzer.

Referring to FIG. 4 and utilizing the example we shared previously, we will assume the owner/administrator of the analyzer wishes to apply some protection to "CloudLocker name 2" 430A. (bottom of FIG. 4, reference 470, home 465). Utilizing the screen 405 shown, the owner or administrator will select "CloudLocker name 2" 430 which will open a window 406 providing details of the directory structure of "CloudLocker name 2" 430. As can be seen in screen shot 406, check boxes 407/408 are provided next to each folder within each directory that exists in "CloudLocker name 2" 430. The owner or administrator can choose to protect the entire device with the analyzer by selecting the check box 407, or can choose to select any other directory or sub-directory, file or folder by selecting the check box 408 that appears next to the directory file or folder name. While each check box shown in 406 can be selected, the example was limited to check boxes 407 (entire device) and 408 (any file or folder) for ease of explanation.

Once the selections have been completed, the owner/administrator can save 409 their selections. Once the selections have been saved, the analyzer is active on the selected directory, file, folder, subfolder, subdirectory or device, and can be enabled/disabled at the choosing of the administrator.

As previously stated, the analyzer allows the digital content owner to protect their files, folders, directories, USB enabled storage devices and other digital content storage facilities. In addition to the protection of the storage itself, the analyzer provides protection for digital content when transferred or shared with recipients. The analyzer can "lock" content during a share session, requiring the recipient to certify their identity and authorization to access the digital content, prior to being granted access.

The analyzer protects digital content being shared between two or more users (e.g. one content owner and one content recipient) by requiring a series of certification steps to be performed by the recipient as dictated by the digital content owner (or system administrator). As we discuss FIG. 5, we will assume there is one digital content owner and one recipient to ease understanding of the process and provide clarity to the uniqueness of the system and its implementation. We will now discuss the certification process of the recipient of a share (shared digital content) through the analyzer.

Figure 5:
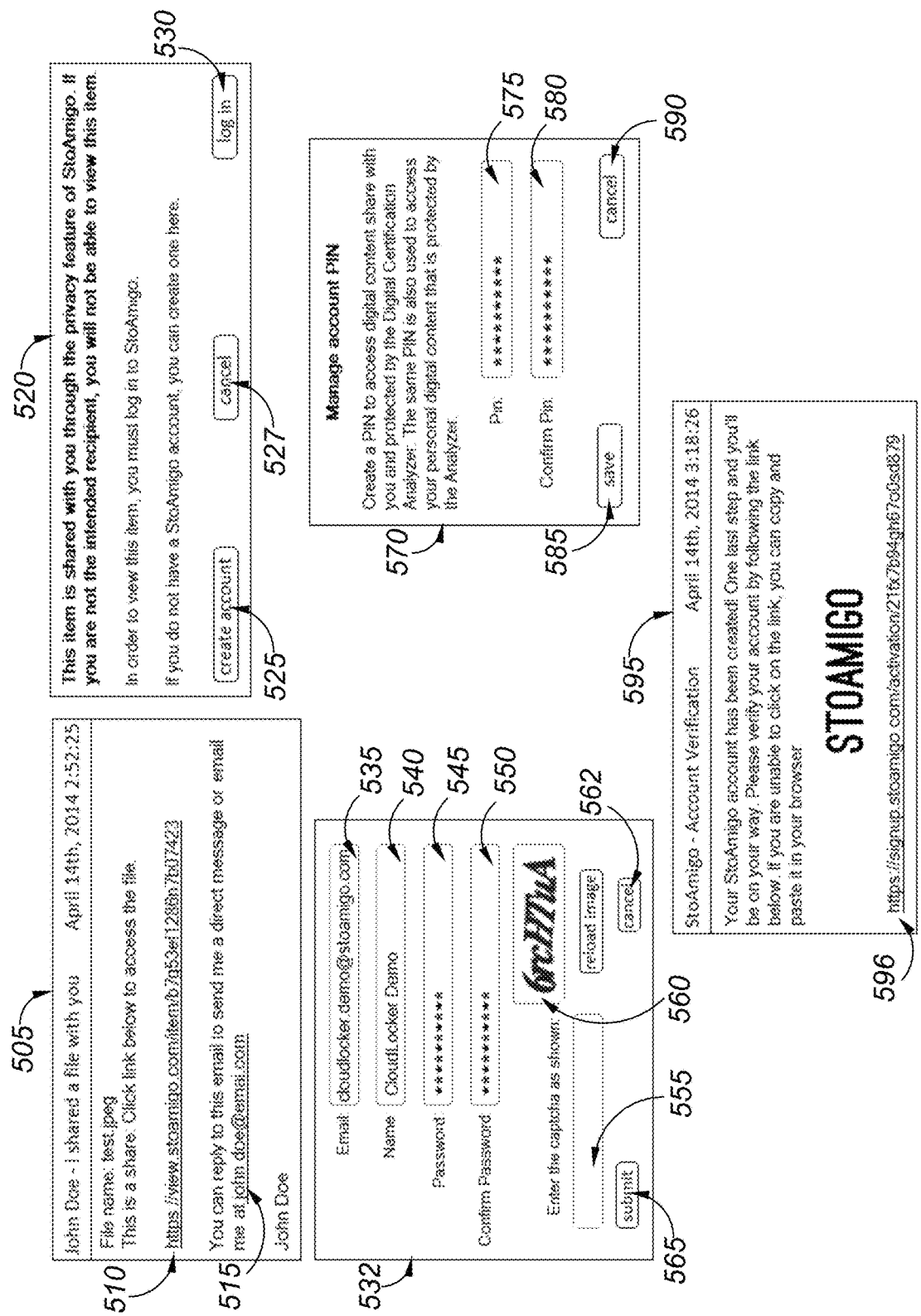
FIG. 5 is a diagram illustrating account creation within the analyzer.

FIG. 5 is a series of screen shots taken from StoAmigo's file sharing system that is utilizing the analyzer. In the following example with reference to FIG. 5, we will assume the recipient of the shared digital content is not registered with the analyzer, and is therefore unknown to the system.

Referring to FIG. 5, the process begins by the recipient of shared digital content receiving a share notification 505. While the share notification 505 is in email form in this example, it can also be sent in other common communication methods including SMS, text messaging, digital chat (such as skype) and other communication methods. The recipient of shared digital content receives the notification 505, alerting them that digital content has been shared with them. If the recipient chooses to view the content, they can open the link 510 provided in the notification 505. They can also choose to reply to the message by notifying the sender utilizing the info provided 515.

As the recipient accesses the link 510, a new window 520 opens, prompting them to either create an account 525 or to login to the system 530 assuming they have an account. For the purpose of this explanation, we will assume the recipient does not have an account, and therefore must proceed to create an account 525.

Once the recipient selects "create account" 525, a new window 532 opens. The recipient will then be prompted to enter their email address 535, their name 540, a password 545 and a confirmation of the password entered 550. It is important to note that the email address 535 entered must match the email address that received the notification 505, or the recipient will not be able to gain access to the shared digital content.

Once the above information has been entered by the recipient, they will be asked to verify a captcha 560 (to ensure they are not another digital entity trying to gain access to the system) and be asked to enter the captcha info 560 into the appropriate space 555. Once this step is completed, the recipient can select submit 565.

Assuming the analyzer accepts the information as entered above, a new window 570 will appear, prompting the recipient of the shared digital content to create a PIN 575 and confirm the PIN 580. The PIN is a Personal Identification Number that will provide a method for additional verification of the recipient of the shared digital content. The PIN can be alphanumeric, and must contain more than 6 characters for security purposes. Once the PIN has been entered, the recipient can save 585 their information or cancel 590 out of the system. A cancellation 590 will stop the process from completing.

Once the recipient of the shared digital content has selected save 585, a final email 595 will be sent to the email account 535 that the recipient used to create their account, notifying the recipient that their account information has been entered and an account has been created. The recipient of the shared digital content will need to take a final step confirming their identity by selecting the link 596 that appears at the bottom of the email 595. Again, if the email account 535 does not match the email account that received the share notification 505, the digital content will not be accessible.

Once the recipient of the shared digital content completes the authentication and sign up process by accessing the validation link 596, the sign up process is complete. The recipient of the shared digital content must now follow the steps outlined in FIG. 6 below to access the shared digital content.

Figure 6:
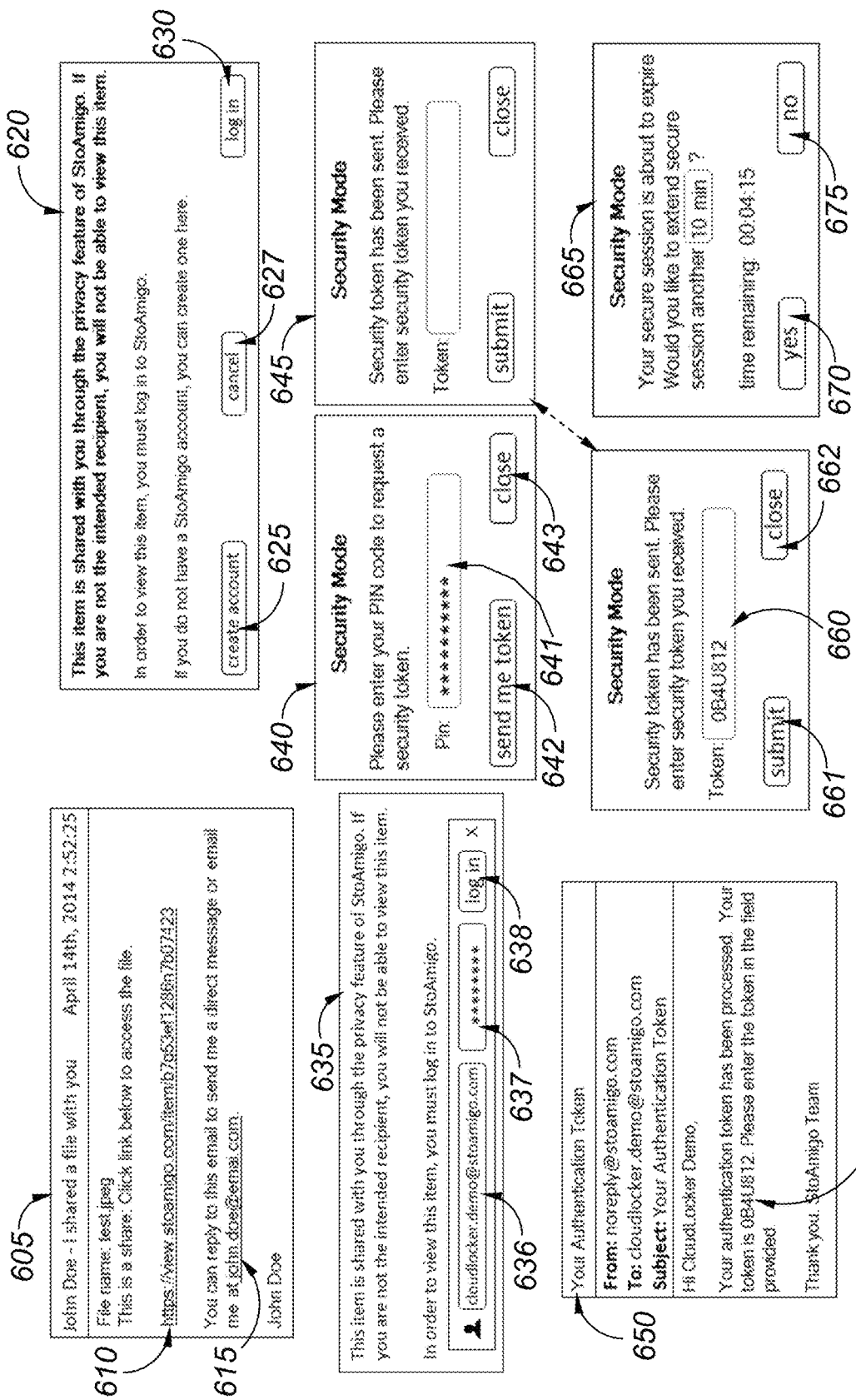
FIG. 6 is a diagram illustrating the process to access a secured share.

FIG. 6 steps through the process of accessing digital content that has been secured using the analyzer. The process detailed in the following (with reference to FIG. 6) assumes that the recipient of the shared digital content is a registered user of the analyzer, and has gone through the process outlined in FIG. 5 mentioned previously. The process detailed in FIG. 6 assumes an owner or administrator of the analyzer wishes to share digital content with a recipient. The process will begin with the recipient receiving the notification of the shared digital content.

Referring to FIG. 6, reference 605 is a screen shot of an email notification received by the intended recipient of shared digital content. This serves as a notification to the recipient of the email that a digital content share has been initiated. The shared content is referenced by a link 610 within the notification 605, as is the email address 615 of the owner/administrator that provided the shared digital content link 610. The recipient will start the process of accessing the shared digital content by accessing the link 610 provided.

Once the recipient has accessed the link 610, a window 620 opens, allowing the recipient to create an account 625 or to log into their existing account 630. As stated previously, since we created an account with reference to FIG. 5, we will now assume the recipient has created their account. With the account created, the recipient will select to log into 630 the system.

By selecting log in 630, the recipient is presented with another window 635. In this window 635, the recipient can enter their email 636 and their password 637 to allow them to log in 638. Once the recipient has logged into the system 638, a window 640 will appear asking them to input their Personal Identification Number 641 PIN. Once their PIN 641 has been entered, the recipient will select "send me token" 642. The recipient could chose to close 643 the security mode 640 pop-up, which would terminate the secure session access.

Assuming the recipient selects "send me token" 642, a new security mode window 645 will appear to notify the recipient that the token has been sent. While the security token can be sent to the recipient in a number of various ways (including but not limited to SMS, text, Chat, email and other common methods), this example assumes an email is the method chosen by the recipient to receive their token.

The recipient receives an email 650 which was sent to the email address specified by the recipient in their sign-up process that was completed earlier with reference to FIG. 5. The token 655 is provided in the email 650 and can now be entered into the security mode window 645 in the appropriate area 660. Once the token 655 has been entered into the appropriate area 660, the recipient can select submit 661 to complete the process. The recipient at this point can also choose to close 662 the security mode 645 window, terminating the access process.

Once the token 655 has been entered into the appropriate area 660 and the recipient has submitted the token 661, an optional timer 665 may begin. The timer will be in the background during the secure access session and will pop-up shortly before the secure access session is to be terminated. Should the owner of the shared digital content choose to allow the recipient to extend their secure session, an optional button 670 will be made available to the recipient to extend their secure access session. This example 665 shows the secure session timer can be extended 10 additional minutes. This is set and controlled by the owner of the shared digital content. The recipient of the shared digital content (in this example) can select yes 670 to add 10 more minutes of secured access to the shared digital content, or can select no 675, allowing the session to terminate as initially set by the owner of the shared digital content.

Access to digital content protected by the analyzer is controlled in secured sessions. Each session has a timer that can be enabled and/or disabled by the content owner/administrator for local access, and a session timer that can be enabled and/or disabled by the content owner for remote recipient access. The local secured session access timer controls the amount of time a secured session for access will take place during content owner/administrator access. This timer allows the content owner/administrator to turn on a secured session for their own personal use, and to allow that session to expire at a predetermined time, eliminating the need to manually terminate the session.

It is not necessary to apply the timer to enable a secured session. The timer can be disabled, allowing a secured access session to occur with no expiration time assigned.

The secured session timer for remote recipient access governs the amount of time a secured session is available and active for a recipient of shared digital content. The digital content owner (at their choosing) can allow the recipient of shared digital content to extend their secure session by selecting the extension option for the session from an available pop-up window, or can choose to simply limit the amount of time a secured session can be accessed by a recipient of shared digital content, eliminating access when the timer expires. Further, the digital content owner can choose to allow the recipient of shared digital content to reestablish access to the shared digital content by re-certifying their identity through the analyzer, or can simply limit the secured session access to a single activation. This configuration would disallow further access to the shared digital content unless otherwise allowed by the owner of the shared digital content.

The owner of the shared digital content has complete control over the access to digital content, and can change access restrictions and rights at any time. They can alter restrictions before, during, or after a secured access session has begun, or choose to simply remove any and all restrictions, allowing the digital content to be shared in a non-secured environment, effectively bypassing the analyzer.

Please note that the secured access session can only be initiated through the analyzer if the user (either owner/administrator or client/recipient) has created an account (as shown in FIG. 5) and logged into that account with their default email and password. A secure access session cannot be initiated from a user that is not registered with the system.

A local secured session can be initiated by the owner/administrator by selecting a secured storage location within the protected area of the analyzer and gaining access to it. The local secure session can be optionally managed by the secure session timer (discussed in detail later in this submission), allowing the owner/administrator to set termination time for the secure session. Once the secure session has terminated, the content will again be locked down by the analyzer, requiring the owner/administrator to re-authenticate their access rights to gain additional access to the digital content.

Figure 7A:
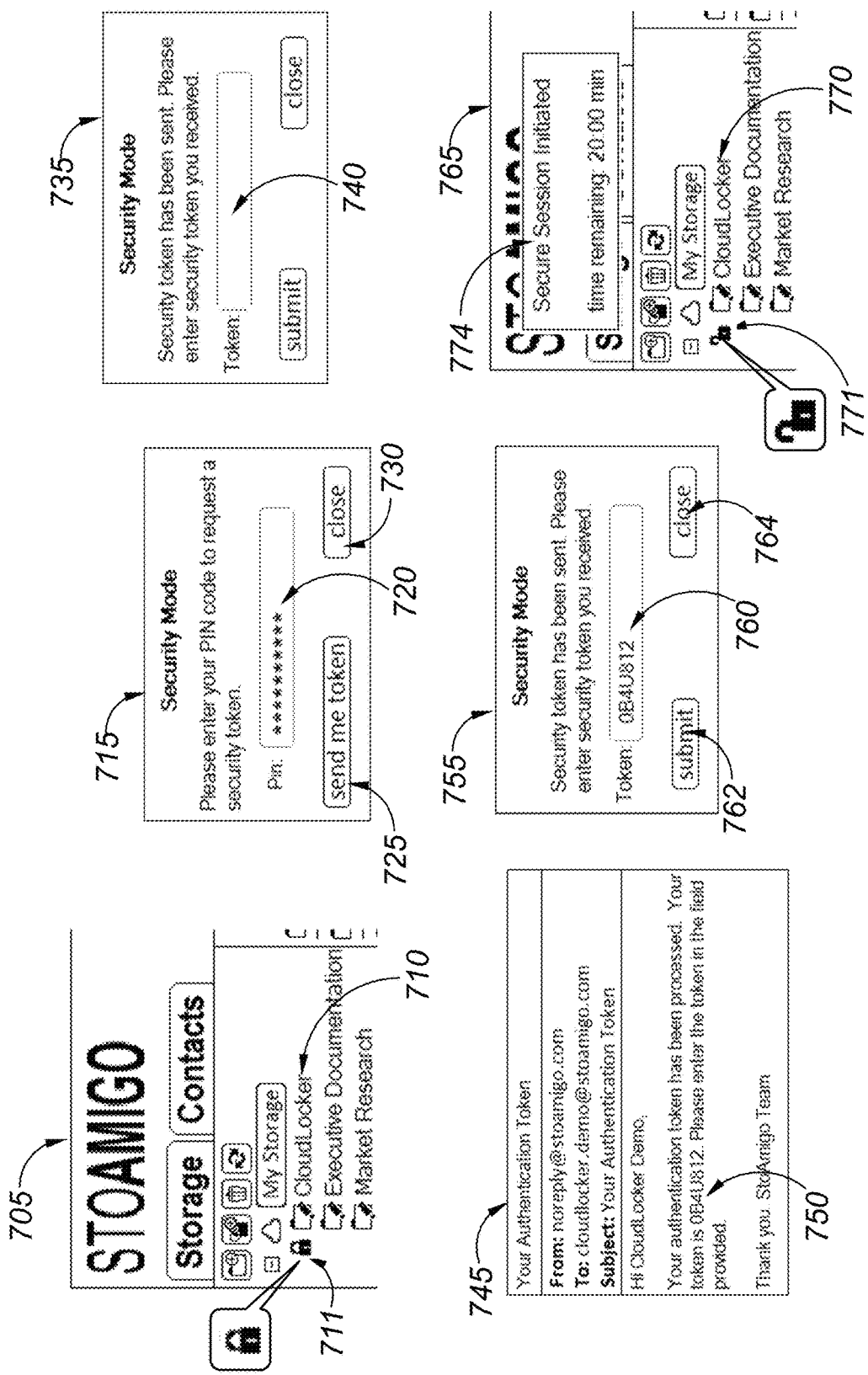
FIG. 7A is a diagram illustrating the process of initiating a secure session.

The initiation of a local secured session will now be discussed with reference to FIG. 7A. As can be seen in FIG. 7A, 705, we've previously applied the analyzer to the folder "CloudLocker" 710. The lock icon 711 next to the folder CloudLocker 710 serves as a visual indication that the digital content is locked and authentication will be required to gain access.

As the owner/administrator selects the CloudLocker 710 folder, a new window 715 appears, requesting the owner/administrator enter their PIN code. Each registered user (owner/administrator or client/recipient) will only have a single PIN, created during their registration process.

The owner/administrator enters their PIN in the space provided 720 and selects "send me token" 725. If the owner/administrator chooses to terminate the process at this point, they can select close 730, which will close the window 715 and return them to the main menu screen 705. Once the PIN has been entered 720 and the token request 725 has been made, a new window 735 opens, indicating that the security token has been sent, and that it may be entered into the space provided 740. The owner/administrator will receive the token by a method chosen previously (not shown in this submission). It is noted that a PIN may be received/transmitted via a different communication link relative to the token.

For example, an email 745 may be used to communicate the token. As the owner/administrator opens their email 745, they will see the token 750 provided. The token 750 can now be entered into the security mode 755 window in the space provided 760. The owner/administrator may now select submit 762 and the security mode window 755 will close. The owner/administrator will be returned to the main menu screen 765. As can be seen, the main menu screen 765 shows the CloudLocker 770 folder is now unlocked. The lock icon 771 shows the lock as being unlocked. The local secure session may now begin. The contents of the CloudLocker 770 folder are now unlocked and can be accessed by the owner/administrator.

If the secure session timer is enabled, the local secure session (described above) will be governed by the time limitations set forth in the secure session timer. A message 774 will appear on the menu screen 765 as an indication that the secure session has begun. The message 774 will indicate the secure session time remaining before the secure session will expire. The time remaining is programmed in the secure session timer settings discussed later in this submission.

The timers provided by the analyzer work in conjunction with the host device software and hardware (typically a file sharing server or other digital content storing and sharing facility) to ensure the tokens, sessions and sharing is protected and controlled by the analyzer. The following FIG. 7B will discuss the relationship between the host server and the timer modules functioning within the analyzer.

Figure 7B:
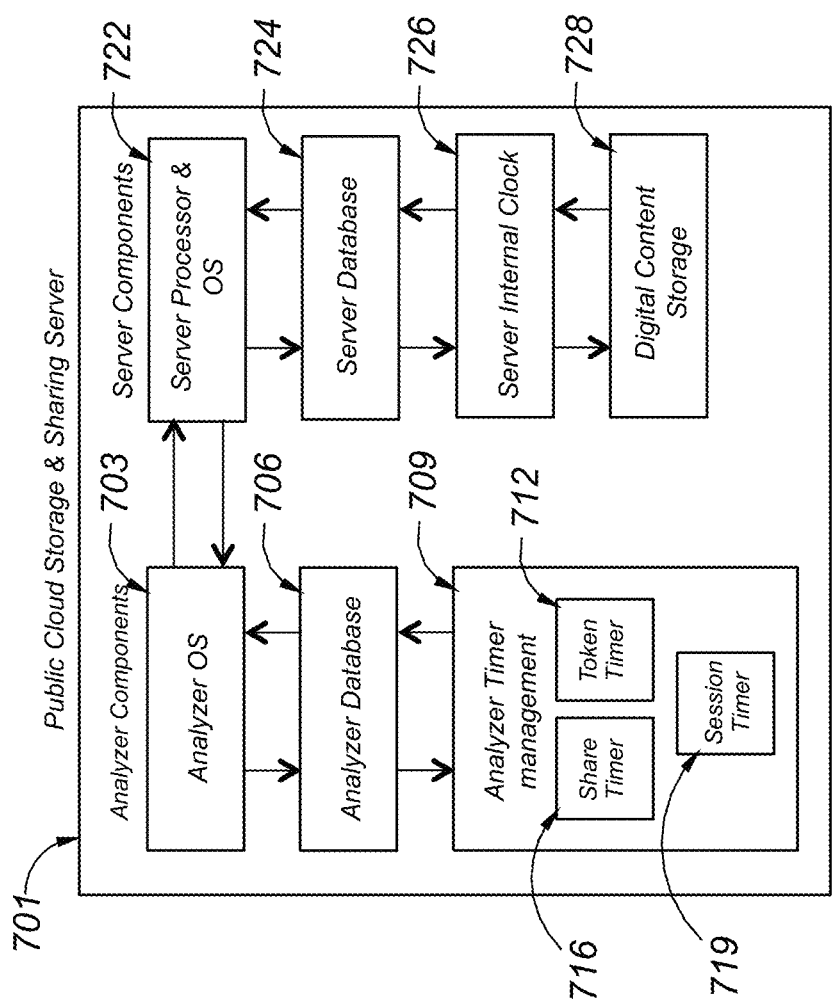
FIG. 7B is a diagram illustrating the share, session and token timers.

Please note that the components shown in FIG. 7B have been minimized to ease understanding. Only components within the analyzer and host server that directly relate to timer management have been included. FIG. 7B also assumes the analyzer has been installed on the host server. Please refer to FIG. 7B now.

As can be seen in FIG. 7B, reference 701 is a public cloud storage and sharing server, wherein the analyzer has been installed. Since this discussion will be referencing the analyzer timer management 709 modules (share timer 716, token timer 712 and session timer 719) other components of both the server and the analyzer have been removed. The primary server components that work in conjunction with the analyzer timer management 709 and its subset modules are the server processor and operating system 722, the server database 724, the server internal clock 726 and the digital content storage 728.

Upon initial installation of the analyzer, the analyzer operating system 703 will communicate directly with the server processor and operating system 722 to engage the server internal clock 726 for the purpose of synchronizing with the internal server clock of the public cloud storage and sharing server 701. The analyzer timer management 709 will continue to communicate with the public cloud storage and sharing server 701 internal clock 726 to ensure synchronization.

Functionally, the timers (share timer 716, token timer 712 and session timer 719) work entirely independently and in full synchronization with the server internal clock 726, and are managed by the analyzer timer management 709. Each time a user initiates a command through the analyzer wherein a timer is activated, the details of the timer actuation, digital content engagement and other details about the command sequence are stored in the analyzer database 706. This enables the analyzer to manage an unlimited number of shares, digital content access sessions and other functional and operational aspects pertaining to the engagement of the digital content stored 728 within the public cloud storage and sharing server 701.

As stated previously, timers are provided to govern (a) the length of time a secure session will last, (b) the length of time digital content shares will be available and (c) the length of time a token will remain valid for authentication purposes. The local (owner administrator) secure session timer will now be discussed with reference to FIG. 8A.

Figure 8A:
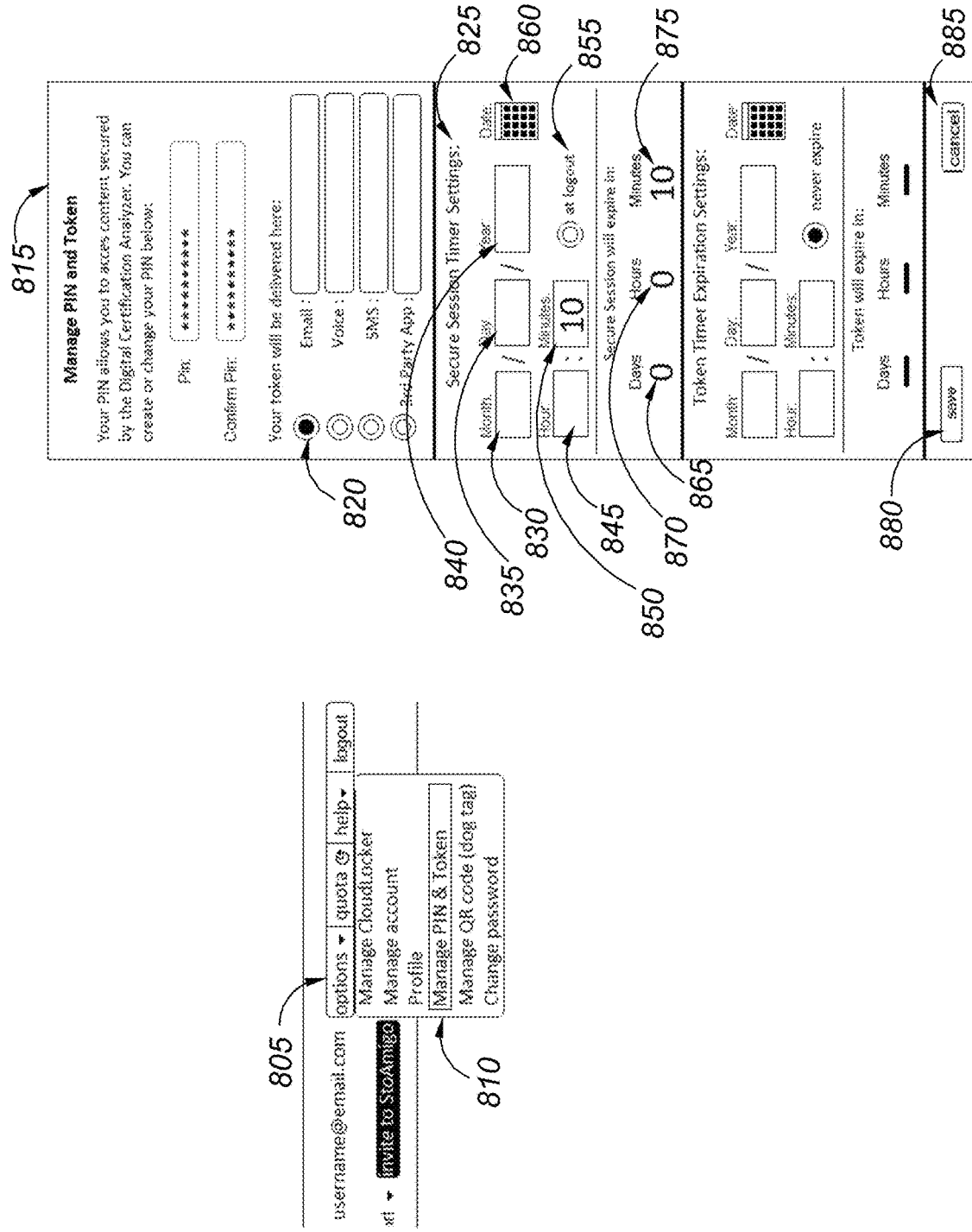
FIG. 8A is a diagram illustrating details and functionality of the local (owner/administrator) secure session timer.

As can be seen in FIG. 8A, the local secure session settings are managed through an interface screen 815 that provides a variety of functions to enable the owner/administrator to customize the analyzer to meet their specific needs. The owner/administrator can access the settings of secure session timer in the analyzer from the options 805 menu. By selecting Manage PIN & Token 810, the owner/administrator will open a window 815 that provides the detailed settings for the analyzer. While the Manage PIN & Token interface menu 815 provides a number of various functions and settings, we will focus on those that apply specifically to this submission. As can be seen in FIG. 8A, reference 815, the owner/administrator has the option to select where their token will be delivered. For this example, the setting chosen is the email 820. It is important to note that the email address utilized for token delivery must match the email address utilized during the registration process of the analyzer or the authentication will fail. This is to ensure that only the owner/administrator can receive a token for access to their account. While not shown, similar validations are provided for the other contact methods (voice, SMS and $3^{rd}$ party apps).

The secure session timer settings 825 can be configured to provide the exact date and time for a secure session to expire. This provides the maximum amount of versatility when engaging the timer. The owner/administrator can select the month 830, day 835 and year 840 of the expiration of the secure session, as well as the hour 845 and minutes 850. It is not necessary to populate a date unless the owner/administrator chooses to. The secure session timer will automatically populate the date fields if the hour 845 and minutes 850 exceed the end of the calendar day. The analyzer provides a clock that records the time and date automatically, and will update the secure session timer settings accordingly. The secure session timer ensures that digital content accessed during the secure session is re-locked or otherwise re-secured upon completion of the session. By setting a timer, the owner/administrator can preset the termination of a secure session to ensure that the digital content will be re-locked or re-secured, even if they forget to log out of the system. The owner/administrator can choose to allow the secure session to continue until they logout 855, exiting the system. This setting will disable the previously mentioned secure session timer settings.

To ease the selection process of the expiration date of the secure session timer, a calendar mode 860 is available so the administrator or digital content owner can select the appropriate date from a calendar (not shown). Once the date has been selected from the calendar mode 860, the date information will show in the appropriate month 830, day 835 and year 840 locations. The secure session timer will begin automatically when the save 880 button is activated. The days 865, hours 870 and minutes 875 until the secure session timer expires will be displayed accordingly. If the administrator or digital content owner wishes to abandon all settings and return to the previous menu (not shown) they can do so by selecting cancel 885.

In addition to the secure session timer, the analyzer provides a token timer that enables the owner/administrator to set an expiration time and date for the token utilized to gain access to the protected digital content. While each token generated by the analyzer can only be used once, the timer enables the owner/administrator to put tighter constraints on the token, enhancing the overall security of the system.

Each secure session that occurs within the analyzer is initiated through the use of a PIN and token method. Specifically, when a user (either the digital content owner or the recipient of a share) wished to gain access to secured digital content, they will be required to enter their PIN (Personal Identification Number). The system (assuming the PIN information is validated) responds by returning a token to the person initiating the access to secured content.

The token is managed by a timer within the analyzer to control the length of time a token remains active. Once a token has expired, it cannot be reactivated and new token will be required. The analyzer tracks and records the token usage to maintain the integrity of the digital content being accessed and/or shared through the system. The token timer utilized to enable a local secured session will now be discussed with reference to FIG. 8B.

Figure 8B:
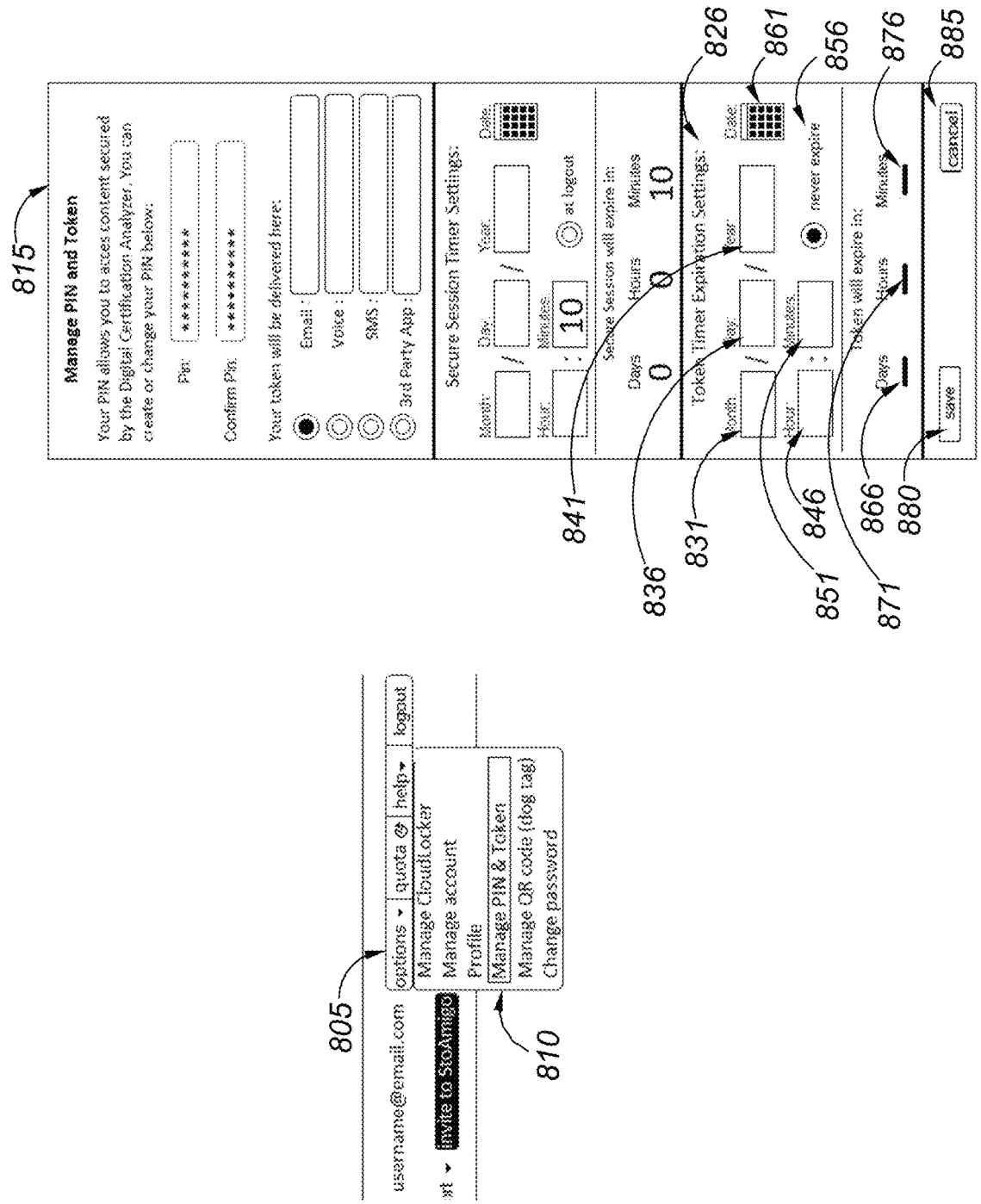
FIG. 8B is a diagram illustrating the details and functionality of the local (owner/administrator) token timer.

As can be seen in FIG. 8B, the token timer settings are managed through an interface screen (815) that provides a variety of functions to enable the owner/administrator to customize the analyzer to meet their specific needs. The owner/administrator can access the settings of token timer in the analyzer from the options 805 menu. By selecting Manage PIN & Token 810, the owner/administrator will open a window 815 that provides the detailed settings for the analyzer. As can be seen in FIG. 8B, the token timer settings 826 can be configured to provide the exact date and time for a token to expire. The owner/administrator can select the month 831, day 836 and year 841 of the expiration of the token, as well as the hour 846 and minutes 851. It is not necessary to populate a date unless the owner/administrator chooses to. The token timer will automatically populate the date fields if the hour 846 and minutes 851 exceed the end of the calendar day. The analyzer provides a clock that records the time and date automatically, and will update the token timer settings accordingly.

To ease the selection process of the expiration date of the token timer, a calendar mode 861 is available so the administrator or digital content owner can select the appropriate date from a calendar (not shown). Once the date has been selected from the calendar mode 861, the date information will show in the appropriate month 831, day 836 and year 841 locations. The token timer will begin automatically when the save 880 button is activated. The days 866, hours 871 and minutes 876 until the token timer expires will be displayed accordingly. If the administrator or digital content owner wishes to abandon all settings and return to the previous menu (not shown) they can do so by selecting cancel 885.

The owner/administrator can choose to disable the token timer by selecting the never expire 856 setting. This setting will disable the previously mentioned token timer settings, and set the token to never expire. Again, each token is valid for a single use only within the analyzer. So even if the owner/administrator chooses to disable the token timer (never expire 856), the token will still only work for a single use.

As stated previously, the token timer, share timer and secure session timer can also be applied to digital content that is shared from a system that is utilizing the analyzer. The system examples contained herein have utilized the StoAmigo file storage and sharing system as an example of how the analyzer can be implemented into a file sharing system to protect and secure digital content. The following examples will illustrate the controls and settings provided by the analyzer to protect digital content that is being shared. It is important to note that some file sharing systems (like StoAmigo) do not always allow a recipient of shared digital content to take ownership of it. Specifically, these systems (like StoAmigo) can be configured to allow recipients a "view only" access to digital content. The analyzer is well suited to protect shared digital content that is provided to a recipient in either a "view only" or a "downloadable" format.

The analyzer provides a share timer, a secure session timer and a token timer that govern access to a client/recipient of shared digital content. Specifically, the owner/administrator sharing the digital content can choose to set a timeframe for the share to remain in effect, choose a timeframe for the secure session period to last, and choose a time for the token utilized by the recipient to expire. These timers work to protect the digital content being shared, ensuring that the owner/administrator can maintain total control of their digital content.

In cases where a share timer and a secure session timer overlap, the timer that expires the earliest (first) will govern the expiration time of the shared digital content. The owner/administrator may (optionally) allow a recipient of shared digital content the option to extend their secure session timer to allow them additional time to access the content. In one example of this extension function, a teacher may be sharing a timed test with a group of students. The teacher may optionally allow a student that has historically struggled with the material to extend his or her session for a short period, while not granting that same extension to another student who has otherwise excelled in the class and would not have need for the extra time. This functionality is intended to allow flexibility in the secure session by allowing the client/recipient additional time to utilize the shared digital content. The share timer settings will now be discussed with reference to FIG. 9A.

Figure 9A:
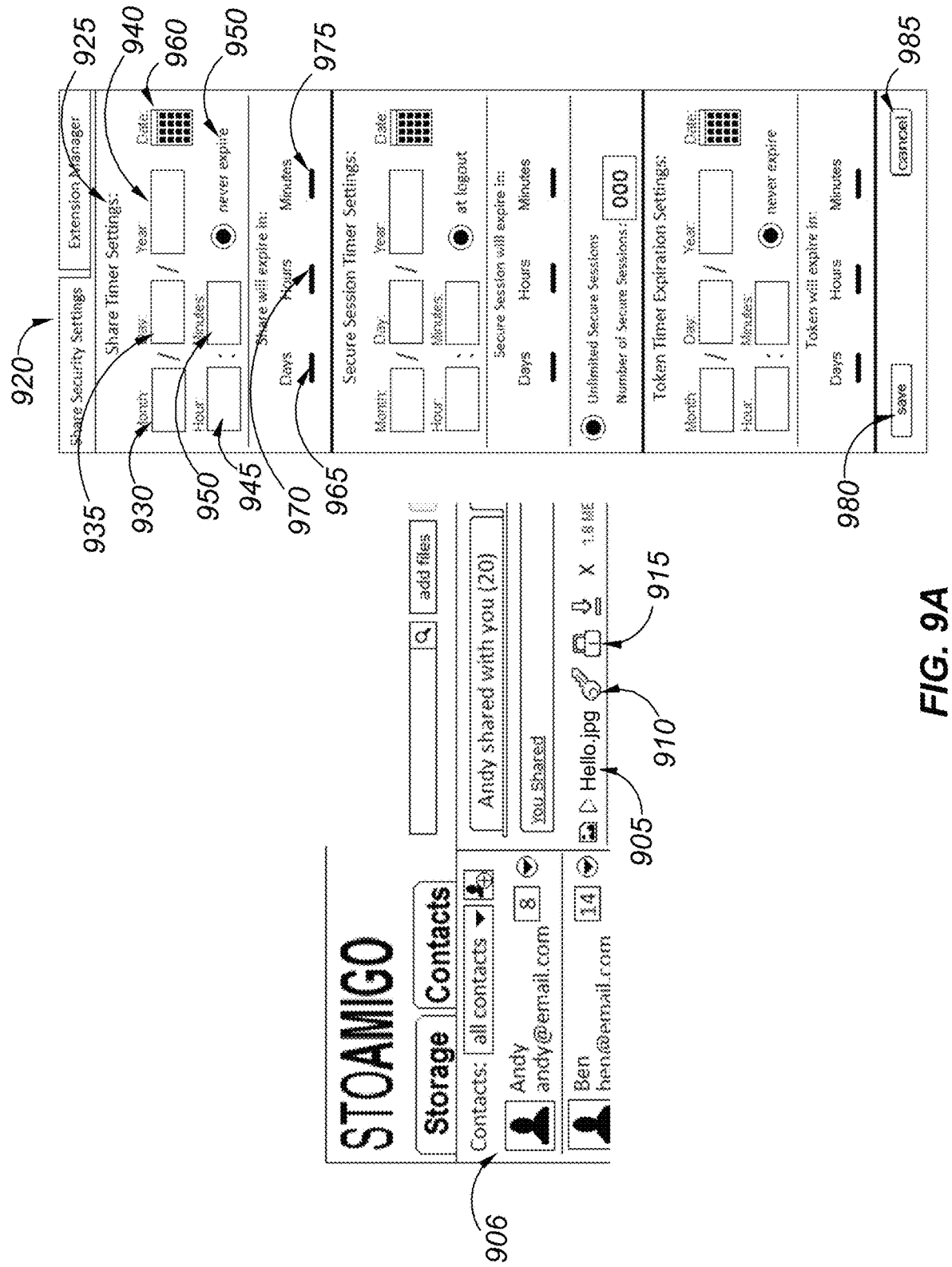
FIG. 9A is a diagram illustrating details and functionality of the share timer.

Referring to FIG. 9A, the owner/administrator has shared digital content 905 (hello.jpg) with a client/recipient 906 (Andy). To the right of the digital content 905 being shared is a key 910 icon and a lock 915 icon. The key 910 icon is utilized to enable/disable the analyzer, allowing the owner/administrator to protect the digital content being shared, or to otherwise leave the content unprotected. The lock 915 icon allows the owner/administrator to access the share security settings 920 menu, providing detailed options to govern access and availability of the shared digital content. The share timer settings 925 allow the owner/administrator to set the exact amount of time that the shared digital content will be made available. This timer will typically be utilized when shared digital content may be available for extended periods to one or more recipients, but wherein the sessions (governed by the session timer discussed below) will be set for shorter periods. By utilizing both the session timer and the share timer, the owner/administrator can control data traffic levels into and out of their respective service delivering the shared digital content to the client/recipient(s).

As can be seen in FIG. 9A, the share timer settings 925 can be configured to provide the exact date and time for a share to expire. The owner/administrator can select the month 930, day 935 and year 940 of the expiration of the share, as well as the hour 945 and minute 950. It is not necessary to populate a date unless the owner/administrator chooses to. The share timer will automatically populate the date fields if the hour 945 and minutes 950 exceed the end of the calendar day. The analyzer provides a clock that records the time and date automatically, and will update the share timer settings accordingly.

To ease the selection process of the expiration date of the share timer, a calendar mode 960 is available so the administrator or digital content owner can select the appropriate date from a calendar (not shown). Once the date has been selected from the calendar mode 960, the date information will show in the appropriate month 930, day 935 and year 940 locations. The share timer will begin automatically when the save 980 button is activated. The days 965, hours 970 and minutes 975 until the share timer expires will be displayed accordingly. If the administrator or digital content owner wishes to abandon all settings and return to the previous menu (not shown) they can do so by selecting cancel 985.

The owner/administrator can choose to disable the share timer by selecting the never expire 950 setting. This setting will disable the previously mentioned share timer settings, and set the share to never expire.

The share security settings menu 920 also provides settings that control the secure session timer utilized during the sharing of digital content. The secure session timer that governs access sessions of shared digital content will now be discussed with reference to FIG. 9B.

For the example in FIG. 9B, we will not repeat the discussion on how to access the share security settings menu 920 as it was previously discussed with reference to FIG. 9A.

Figure 9B:
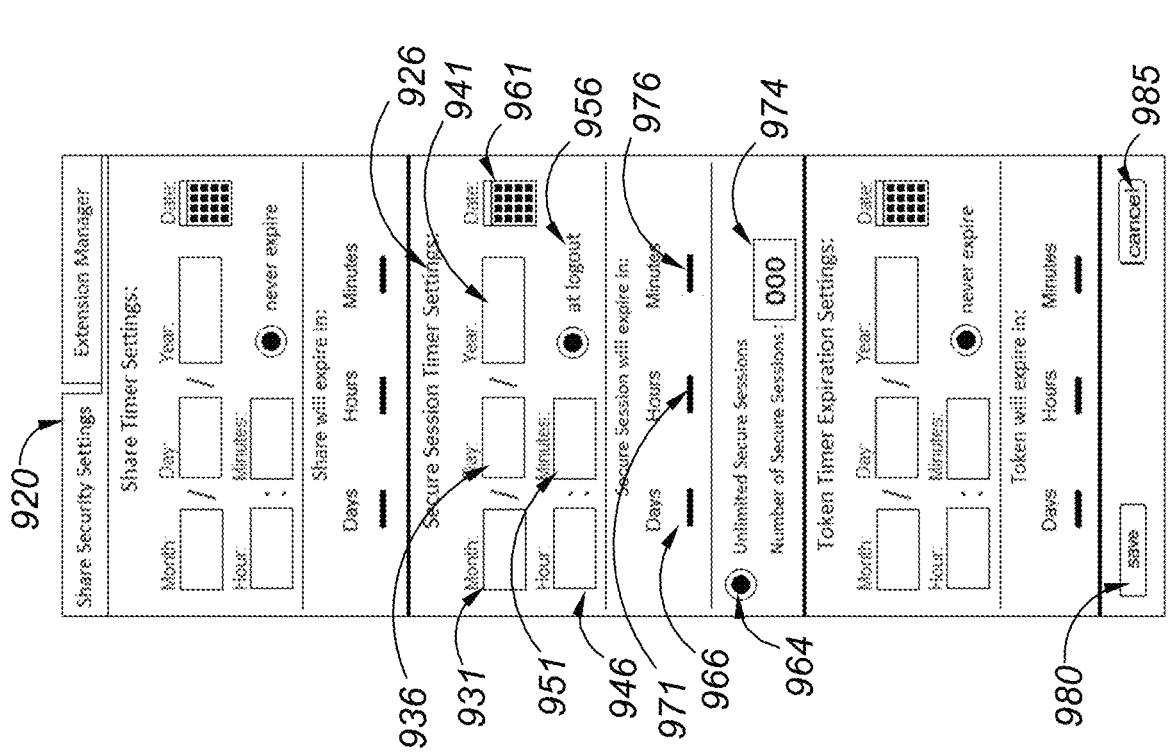
FIG. 9B is a diagram illustrating details and functionality of the secure session timer governing shared digital content.

Referring to FIG. 9B, the secure session timer settings 926 can be configured to provide the exact date and time for a secure session to expire. This provides the maximum amount of versatility when engaging the timer. The owner/administrator can select the month 931, day 936 and year 941 of the expiration of the secure session, as well as the hour 946 and minutes 951. It is not necessary to populate a date unless the owner/administrator chooses to. The secure session timer will automatically populate the date fields if the hour 946 and minutes 951 exceed the end of the calendar day. The analyzer provides a clock that records the time and date automatically, and will update the secure session timer settings accordingly. The secure session timer ensures that digital content accessed during the secure session is re-locked or otherwise re-secured upon completion of the session. By setting a timer, the owner/administrator can preset the termination of a secure session to ensure that the digital content will be re-locked or re-secured. The owner/administrator can choose to allow the secure session to continue until the client/recipient logs out 956, exiting the system. This setting will disable the previously mentioned secure session timer settings.

To ease the selection process of the expiration date of the secure session timer, a calendar mode 961 is available so the administrator or digital content owner can select the appropriate date from a calendar (not shown). Once the date has been selected from the calendar mode 961, the date information will show in the appropriate month 931, day 936 and year 941 locations. The secure session timer will begin automatically when the save 980 button is activated. The days 966, hours 971 and minutes 976 until the secure session timer expires will be displayed accordingly. If the administrator or digital content owner wishes to abandon all settings and return to the previous menu (not shown) they can do so by selecting cancel 985.

The analyzer provides the capability for the owner/administrator to limit the number of secure sessions available to the client/recipient of shared digital content. The number of sessions can be set by entering any number into the space provided 974. The number of sessions can be set from 1 to 999. The unlimited secure sessions 964 option will disable the number of secure sessions 974 entered, so the owner/administrator must ensure the unlimited secure sessions 964 is de-selected before entering a number into the space provided 974. FIG. 9B shows the unlimited secure sessions 964 is selected, so the number of secure sessions 974 will be grayed-out, and show zeros in the space provided.

In addition to the secure session timer to govern shared digital content, the analyzer provides a token timer for the client/recipient of shared digital content that enables the owner/administrator to set an expiration time and date for the token utilized to gain access to the protected digital content. While each token generated by the analyzer can only be used once, the timer enables the owner/administrator to put tighter constraints on the token, enhancing the overall security of the system.

The token utilized by the recipient of shared digital content is managed by a timer within the analyzer to control the length of time a token remains active. Once a token has expired, it cannot be reactivated and a new token will be required. The analyzer tracks and records the token usage to maintain the integrity of the digital content being accessed and/or shared through the system. The token timer utilized to govern access to shared digital content will now be discussed with reference to FIG. 9C.

The token timer for shared digital content can be accessed from the same share security settings 920 menu that the session and share timers are accessed from (as discussed in FIG. 9A and FIG. 9B).

Figure 9C:
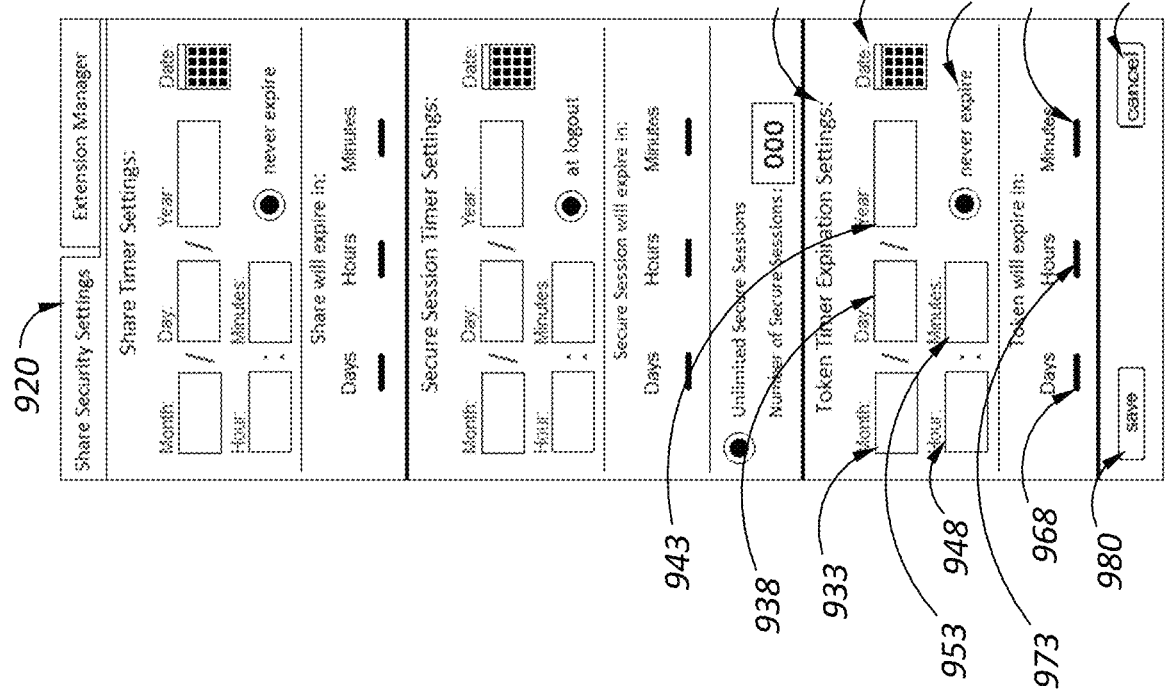
FIG. 9C is a diagram illustrating details and functionality of the token timer governing shared digital content.

As can be seen in FIG. 9C, the token timer settings 928 can be configured to provide the exact date and time for a token to expire. The owner/administrator can select the month 933, day 938 and year 943 of the expiration of the token, as well as the hour 948 and minutes 953. It is not necessary to populate a date unless the owner/administrator chooses to. The token timer will automatically populate the date fields if the hour 948 and minutes 953 exceed the end of the calendar day. The analyzer provides a clock that records the time and date automatically, and will update the token timer settings accordingly.

To ease the selection process of the expiration date of the token timer, a calendar mode 963 is available so the administrator or digital content owner can select the appropriate date from a calendar (not shown). Once the date has been selected from the calendar mode 963, the date information will show in the appropriate month 933, day 938 and year 943 locations. The token timer will begin automatically when the save 980 button is activated. The days 968, hours 973 and minutes 978 until the token timer expires will be displayed accordingly. If the administrator or digital content owner wishes to abandon all settings and return to the previous menu (not shown) they can do so by selecting cancel 985.

The owner/administrator can choose to disable the token timer by selecting the never expire 958 setting. This setting will disable the previously mentioned token timer settings, and set the token to never expire. Again, each token is valid for a single use only within the analyzer. So even if the owner/administrator chooses to disable the token timer (never expire 958), the token will still only work for a single use.

As stated previously, the analyzer provides the capability for the owner/administrator of the system to allow a client/recipient of shared digital content to extend their secure access session. The purpose of this is to allow some flexibility in the access to secure digital content for the client/recipient of a share. The digital content owner/administrator can determine the length of time an extension will last, as well as the number of extensions to be granted for that particular shared digital content. In instances where the secure session may be initiated for a student of a school (as an example) to take a test, it may be a benefit to the institution to allow that student to extend their time frame for completion by a specified period.

Figure 10:
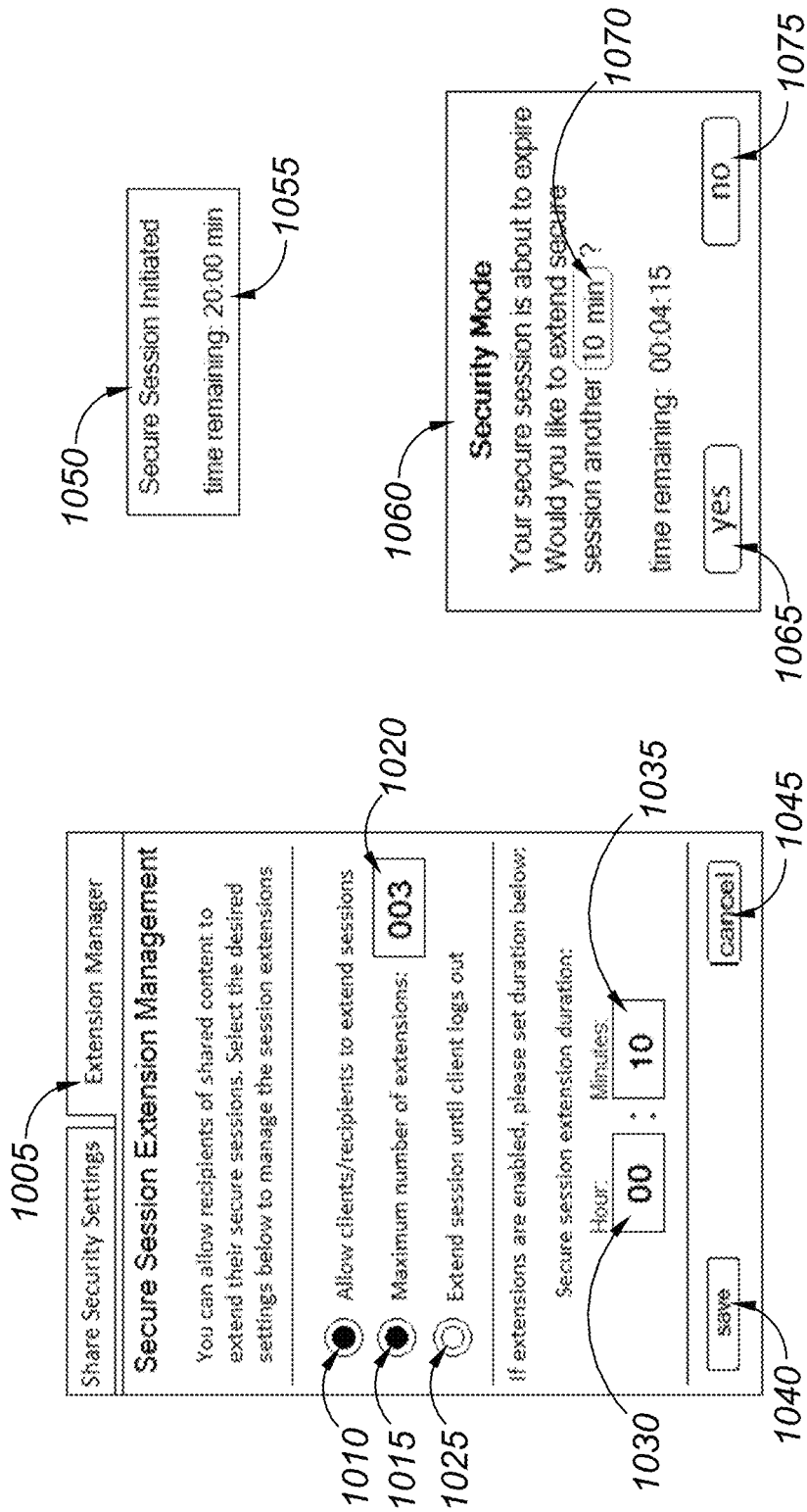
FIG. 10 is a diagram illustrating the details and functionality of the extension timer governing shared digital content.

The extension of a client/recipient secure session will now be discussed with reference to FIG. 10. As can be seen in FIG. 10, reference 1005 is the main menu screen for the secure session extension manager, which can be accessed by clicking the Extension Manager tab 1005. This menu provides options to manage the extensions granted to a client/recipient of shared digital content. In order to grant the client/recipient the option to extend their secure access sessions, the owner/administrator must grant that capability by selecting allow clients/recipients to extend sessions 1010. This option turns on the extension manager, and allows the subsequent options to be set. If this feature is not enabled (e.g. the radio button is not filled in) then the client/recipient of shared digital content will not be able to extend their secure sessions, and the access time granted will default to the settings chosen by the owner/administrator during the secure session timer settings discussion that took place previously with reference to FIG. 9B.

Once the client extension rights have been granted (enable 1010), the owner/administrator can choose to set a maximum number of extensions 1015 that will be granted to the client/recipient. By enabling the maximum number of extensions 1015, the owner/administrator can select an exact number of extensions that will be allowed for the secure session by putting that number in the space provided 1020. If the space 1020 is left blank and the maximum number of extensions 1015 is enabled, the analyzer will automatically default to one extension. Otherwise, the analyzer will comply with the number placed in the space provided 1020. If the owner/administrator chooses, they can allow the client/recipient to extend their secure sessions as many times as desired by selecting extend session until client logs out 1025. If this option is selected, the secure session will be extended until the client/recipient logs out of the secure session. This option will bypass the previously configured session timer settings discussed with reference to FIG. 9B.

The secure session extension manager 1005 is currently configured to (1) allow clients/recipients to extend sessions 1010, to (2) enable the maximum number of extensions 1015, to (3) have the maximum number of extensions 1020 set to 3. Since extensions 1010 are enabled, the owner/administrator can set the duration of the extension in the space provided, by selecting the hours 1030 and/or minutes 1035 for each extension. The secure session extension manager 1005 is currently configured for the default extension time of 10 minutes 1035 per extension. The owner/administrator can set the extension duration 1035 to any incremental number of minutes they choose. If no selection is made, the analyzer will default the extension duration 1035 to 10 minutes as shown in this example.

Once the selections for the secure session extension manager 1005 are completed, the owner/administrator can save 1040 them. The owner/administrator can choose to abandon their settings by selecting cancel 1045. If cancel 1045 is selected, the secure session extension manager 1005 will revert to the previously saved settings.

When a recipient enters a secure session, they will see a message appear on their screen 1050 notifying them that they have entered a secure session, and the duration of that secure session. As can be seen in FIG. 10 reference 1050, the secure session time is 20 minutes 1055. If the owner/administrator has granted the ability for the client/recipient to extend a secure session, (as described above with reference to FIG. 10, reference 1005) a security mode 1060 window will appear near the end of their secure session, notifying the client/recipient that their secure session is drawing to a close. The client/recipient can choose to extend their secure session by selecting yes 1065. The session extension time is controlled by the owner/administrator settings 1030 and 1035, and will be shown in the space provided 1070. If the client/recipient chooses not to extend their secure session they can select no 1075. Selecting no 1075 will cause the secure session to end at the original time preset by the owner/administrator. The time remaining in the secure session will be displayed in the security mode 1060 window.

The TESS system described herein is generally configured to enable digital content (files, folders) to be copied to a temporary external secured storage location in instances where the device hosting the digital content is going to be turned off, disconnected from the analyzer, or otherwise offline.

The TESS system is a software-based system, and can therefore exist in any environment where a file management system is desired and/or required. For example, the TESS system software is stored on a non-transient storage medium or storage device, in one or more embodiments, and comprises instructions that provide the TESS system functionality as disclosed herein, when executed by a processor (or the like).

It is important to note that while, the TESS system being disclosed herein is being utilized as part of the analyzer within the STOAMIGO file sharing system in the following descriptions, the software-centric nature of the TESS system enables it to be utilized in virtually any environment wherein one or more computing devices are enlisted for the purpose of viewing, transferring, sharing, communicating, storing, or otherwise managing digital content.

Please note that the TESS system can be enabled and/or disabled at any time during a file transfer and/or share process, regardless of how long the transfer/share has been active. Disabling the TESS system while a transfer/share is active will deactivate the link connecting the transferred/shared digital content to the temporary external secured storage. This will prevent the temporary external secured storage from completing the transfer/share, and leave the transfer/share control to the primary host device. Only the host device may provide access if the TESS system is disabled.

Figure 11:
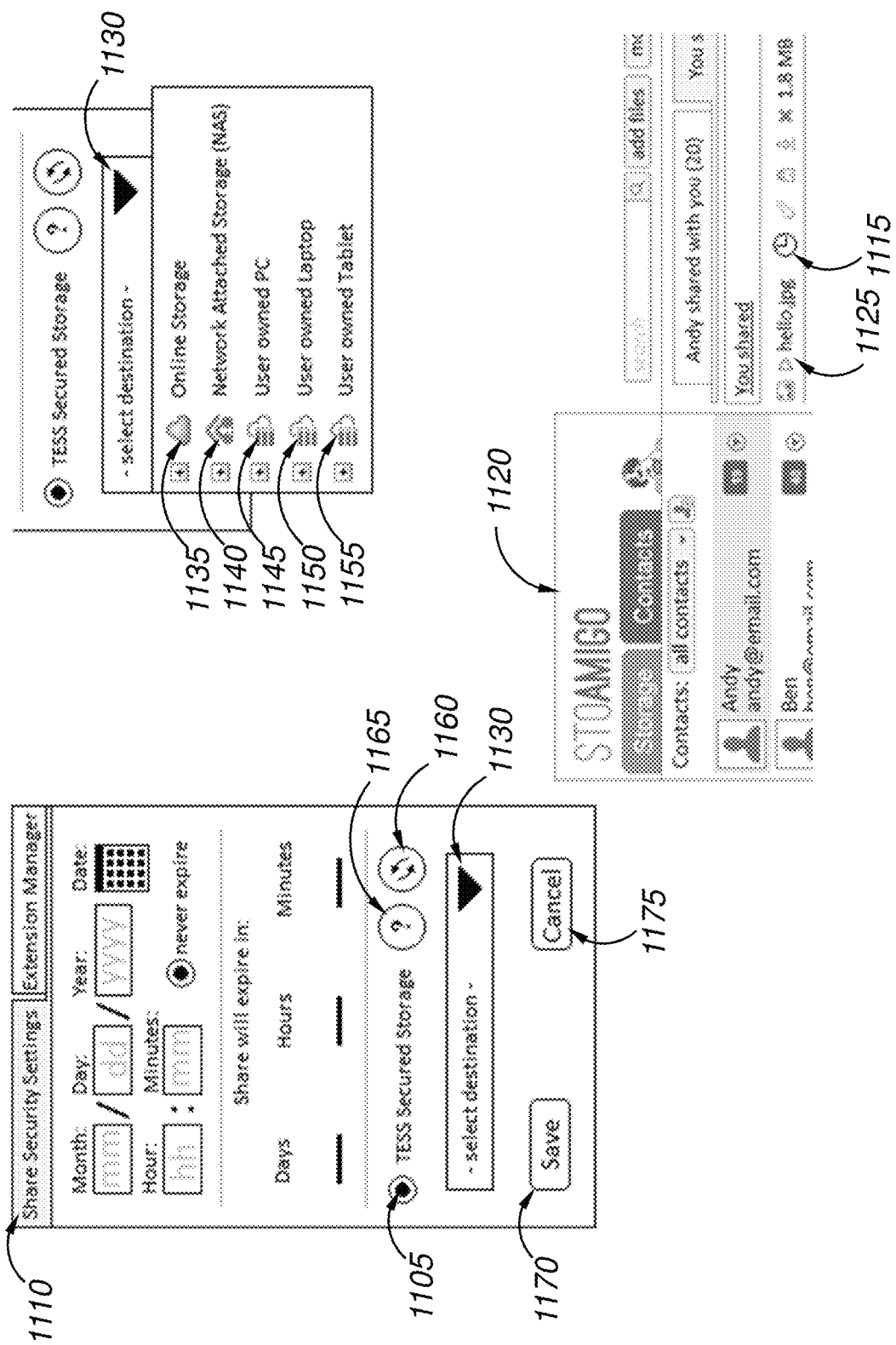
FIG. 11 is a diagram illustrating the functional components of the TESS system.

The TESS system will now be discussed with reference to FIG. 11. Referring to FIG. 11, the TESS system is enabled/disabled by actuating the radio button 1105 located on the share security settings 1110 menu screen. The radio button 1105 will appear dark (as shown) to serve as an indication that the TESS system is enabled. A clock icon 1115 that appears on the user interface screen 1120 will appear black (as shown) next to the file 1125 or digital content that is being transferred and/or shared through the TESS system. This serves as a simple indication to the user as to the status of the TESS system as it relates to the file 1125 or digital content being transferred and/or shared. Actuating the clock icon 1115 will automatically bring up the share security settings 1110 menu, allowing the user to access the TESS system settings.

Now that the TESS system is active (radio button 1105 is activated), the user can select a destination 1130 to externally store the file 1125 or digital content, enabling the recipient of the transfer and/or share to access and/or receive the file 1125 or digital content while the primary device hosting the file 1125 or digital content is turned off, or otherwise disconnected from the system. By actuating the select destination 1130 pull-down menu, the user can choose among the external storage locations that are available for their use. The destinations available can include (but are not limited to) online storage 1135; network attached storage 1140; the user owned PC 1145; the user owned laptop 1150, or the user owned tablet 1155. It is important to note that in the example configuration shown in FIG. 11, the TESS system is illustrating examples of external secured storage devices that can interact with the system, allowing a user to safely store their file 1125 or digital content externally of the host device. These storage repositories and devices are for example only, and may not be available on every deployment of the TESS system. Deployment will be governed by the system administrator/file owner, making storage options dependent upon deployment.

Once the user hosting the file 1125 or digital content to be shared selects a destination from the pull-down menu 1130, they can select save 1170 or cancel 1175. Selecting save 1170 will cause the file 1125 or digital content to be copied directly to the chosen destination (online storage 1135, network attached storage 1140, user owned pc 1145, user owned laptop 1150, or user owned tablet 1155). Selecting cancel 1175 will terminate any changes or selections made during the current configuration/provisioning session.

Once the file 1125 or digital content has been copied to the selected destination (as referenced above) it will remain active for transfer/share until the TESS system 1105 is disabled, or until the share timer settings (discussed with reference to FIG. 9B) expire, whichever occurs sooner. It is not necessary that the host device be turned off or otherwise disconnected from the analyzer for the TESS system to function. Once the TESS system has been enabled, the file 1125 or digital content will be transferred/shared from the destination (online storage 1135, network attached storage 1140, user owned pc 1145, user owned laptop 1150 or user owned tablet 1155) chosen by the user during provisioning of the TESS system.

In cases where the file 1125 or digital content being transferred/shared is updated or changed, the user can update the copy of the file 1125 or digital content to the temporary external secured storage location by selecting the refresh 1160 icon. Once selected, the TESS system will automatically send an updated copy of the file 1125 or digital content to the selected temporary external storage location (online storage 1135, network attached storage 1140, user owned pc 1145, user owned laptop 1150 or user owned tablet 1155) chosen by the user during provisioning of the TESS system. A help menu 1165 is available to assist the user in provisioning the TESS system.

Figure 12:
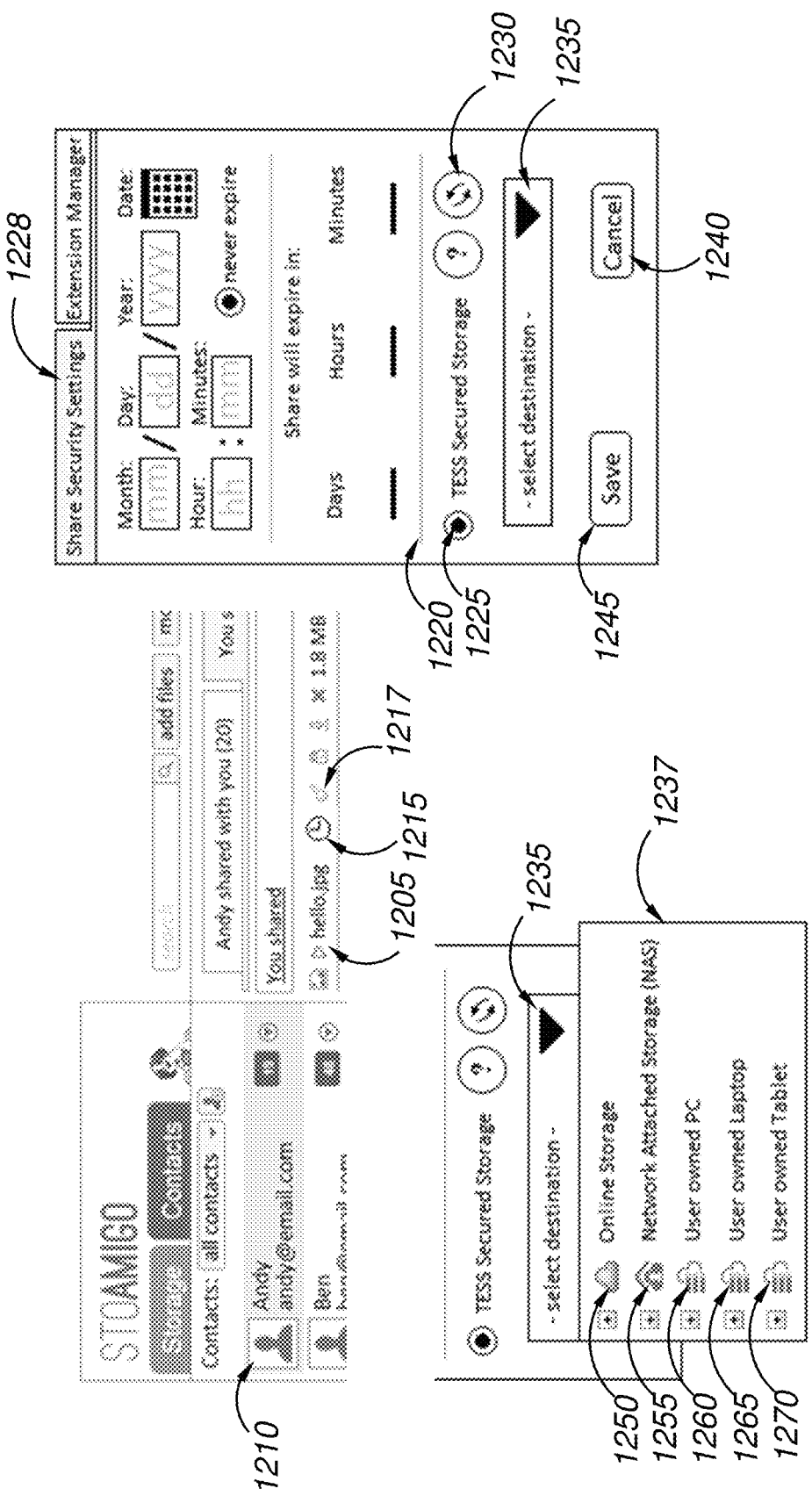
FIG. 12 is a diagram illustrating an example of the functional aspects of TESS system.

A discussion providing a functional example of the TESS system being used within the analyzer will now be discussed with reference to FIG. 12. Please note that while FIG. 12 shows a single example of engaging and utilizing the TESS system, a variety of other configurations and application aspects exist. For the purpose of simplification, FIG. 12 will be limited to utilizing the TESS system after a file or other digital content has been shared with a single recipient.

Referring to FIG. 12, a user has already shared an image file (hello.jpg) 1205 with a contact (Andy) 1210. The user now wishes to add the TESS system functionality to the shared image file hello.jpg 1205. The user selects the clock icon 1215, which opens up the share security settings 1228 menu, providing access to the TESS system 1220 menu settings below. To engage the TESS system, the user will actuate the radio button 1225, ensuring that the button appears black (as shown). Once that button is activated, the TESS system is engaged or otherwise turned on.

Now that the TESS system is activated, the user can select a destination location to host the temporary file by selecting the select destination 1235 menu. The select destination 1235 menu (once activated) will open up a pull-down menu 1237, providing a variety of different external secure storage locations for the user to choose from. The external secured storage locations may include (but are not limited to) online storage 1250; network attached storage 1255; a user owned personal computer 1260; a user owned laptop computer 1265, or a user owned tablet 1270. Any external drive or computing device connected to the analyzer and designated by the user may be utilized to house the file 1205 being shared. The user will only be allowed to select from a list of devices specific to him or her.

For the purpose of this example, we will assume the user has chosen to store the file 1205 (hello.jpg) on a user owned pc 1260. The user will highlight the user owned pc 1260 option, and then select a drive and/or folder (not pictured) within user owned pc 1260 in which to house the file 1205. Once these selections are made, the user will select save 1245, causing the TESS system to send a copy of the file hello.jpg 1205 to the chosen destination (user owned pc 1260). This completes the TESS system sequence of operations.

The user can, at any time of their choosing, change the assignment of the temporary external secured storage by repeating the above process and selecting a different device from the select destination 1235 menu. Once the new destination has been selected, the user will again select save 1245, which will begin the copy process to the new selected storage location. The file (hello.jpg 1205) will be deleted from the prior location if/when a new location for storage is selected.

As previously stated, the TESS system may be disabled by deselecting the radio button 1225 from the share security settings 1228 menu. This action will cause the link to the externally stored file 1205 to no longer be valid, causing the system to make the file 1205 only available for access through the original host device (not pictured).

The chain system tool provides the owner with the capability to create a virtual grouping of digital content that can exist on one or more devices registered within the TESS system, and can contain one or more files, folders or even drives, should the owner choose to do so. Once created, the chain can be shared, transferred, accessed, stored, managed and streamed just like any file or other digital content. The system tools within the TESS system provide functional elements to apply usage restrictions and sharing, transferring and/or streaming capabilities to the chain.

A chain is not restricted to the type or quantity of content it can reference, and will exist within the system until the chain owner deletes or otherwise terminates the chain. As stated previously, a single file (such as a presentation for example) can exist in multiple chains simultaneously, but will not be copied, moved or otherwise transferred unless expressly commanded by the owner. The chain system tool will reference the location of the file only (in this case, a presentation file), and will not move or copy any of the contents or metadata to create the chain.

In order for a file or item of digital content to be referenced within a chain, it must first be on a device that is registered within the TESS system (or the host system utilizing the chain system tool). If a chain contains a file reference to an item of digital content that resides on a device that becomes disconnected from the TESS system, or otherwise becomes un-registered to the TESS system, that chain reference will no longer function, and the subsequent content being referenced by the chain will become unavailable. Should the reference device hosting the content be re-connected to, or otherwise become re-registered to the TESS system, the chain will automatically be updated and the digital content will again become available within the chain. This is done to allow enhanced security for users of the system. Simply turning off a registered device will prevent the chain from completing the task of accessing the referenced digital content within the device that has been turned off. Once the device is turned on, the chain will once again access the referenced digital content. It is important to note that all other digital content references within the chain will still operate and function normally, provided their host devices (housing the referenced digital content) remain connected to the TESS system. The only aspect of the chain that is disrupted will be the connection to the digital content that is on a device that is offline or otherwise unavailable.

The functional components of the chain system tool will now be discussed with reference to FIG. 13. It is important to note that while this example is using the TESS system as the host for the chain system tool, the chain system tool can be utilized in a variety of system host configurations that exist outside of the TESS system. For example, a TESS system may be implemented as a server having one or more communication devices, one or more storage devices and one or more processors. The one or more processors may execute software, programming or machine readable code to provide the functionality described herein. While the TESS system has a variety of functional components, this discussion is directed to the components relevant to the chain function.

Figure 13:
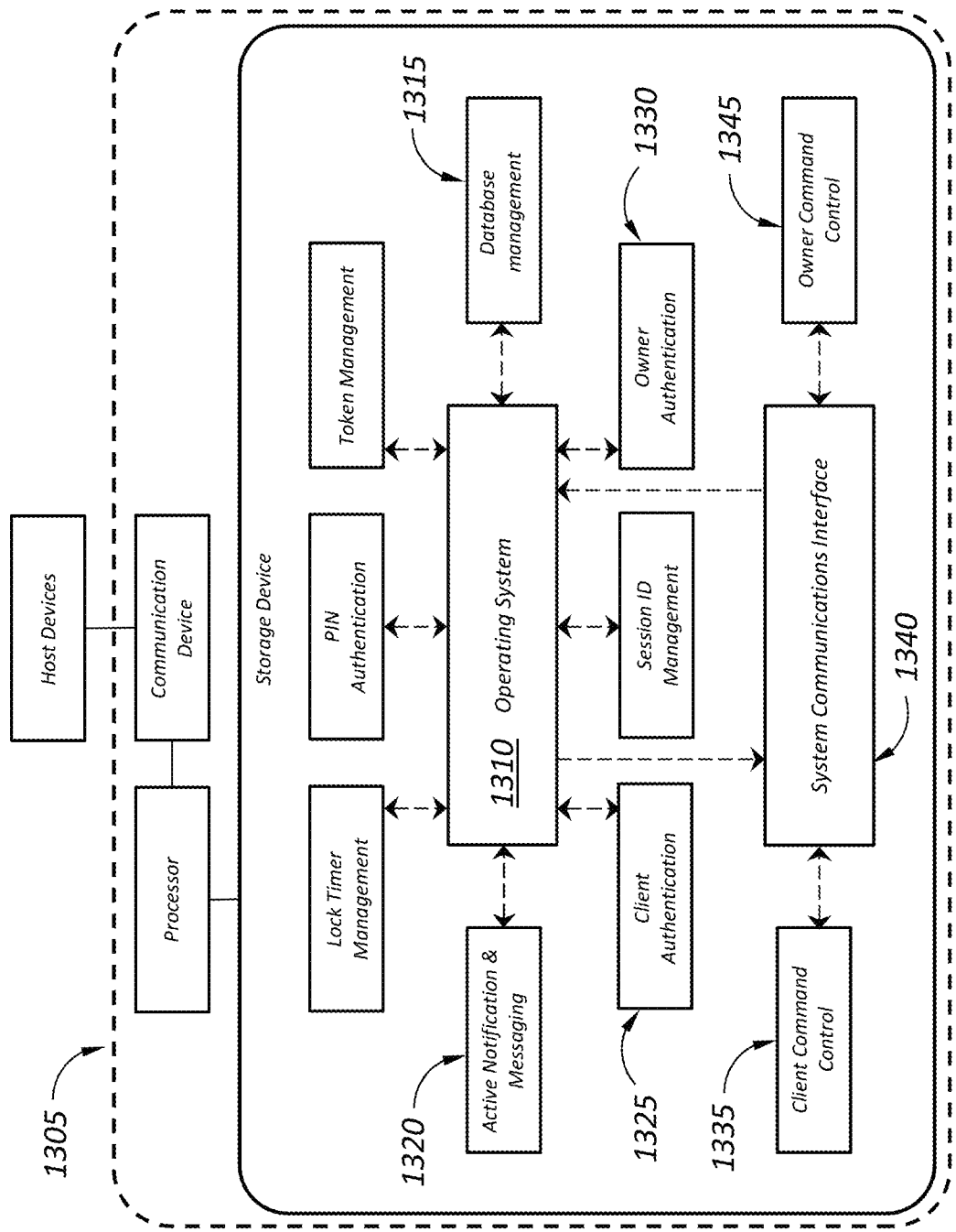
FIG. 13 is a block diagram illustrating the functional components of the chain system tool.

Referring to FIG. 13, the TESS system 1305 provides an operating system 1310 that will host the code programming (e.g., machine readable code) to execute the chain function. The programming will typically be stored on a nontransient storage medium accessible by the operating system 1310. Due to the nature of the chain feature, it is important that the chain work directly with the operating system of the host system (in this case, the TESS system) to ensure maximum integration of the functional aspects of the chain, as well as complete access to the functional modules and management features within the host system.

The chain function utilizes the database management module 1315 to store information pertaining to the chain contents, such as what files, folders or digital content is referenced within the chain, where the physical content resides (what device, file, folder, drive, etc.), and any permission information that will govern the functionality of the chain. Chain information (both current and historic) is managed by the database management module 1315 to enable the TESS system 1305 to accurately and precisely track digital content as it is accessed and managed throughout the system. Database or other storage will typically occur on one or more data storage devices accessible to the TESS system 1305.

The active notification and messaging module 1320 is responsible for generating messages and system level notifications to facilitate the functionality of the chain system tool. The active notification and messaging module 1320 generates and communicates the notifications and messages for both the internal system operations and the external owner/client messages and notifications. The active notification and messaging module 1320 works in conjunction with the operating system 1310 to communicate with the other system modules shown in FIG. 13 to facilitate the necessary messaging activity to carry out normal functionality.

Continuing to reference FIG. 13, the owner authentication module 1330 is used by the chain system tool (hosted within the operating system 1310) to validate and authorize access and management permissions for the owner of the chain(s) being created and managed. The owner authentication module 1330 will either grant or deny owner access to the chain system tool. Once granted, the chain system tool (hosted within the operating system 1310) will allow the authenticated party access to the highest level of control over the chain system tool. This includes, but is not limited to sharing, transferring, streaming, copying, deleting, editing or other managerial aspects associated with management of the chain system tool.

The client authentication module 1325 is used by the chain system tool to authorize and otherwise allow access to a chain that is being shared, streamed, transferred, moved to, or otherwise copied to any recipient of the chain, who is not the direct owner of the chain. The client authentication module 1325 (as explained earlier in this submission) governs access by recipient and non-owner parties that are engaging the TESS system 1305. A recipient can be a registered user of the TESS system 1305, or can be someone who is not actively a registered user, or is otherwise not logged into the TESS system 1305. The client authentication module 1325 is vital in ensuring security for the purpose of sharing, transferring or otherwise allowing a non-owner to access and utilize the contents of a chain.

The chain system tool utilizes the system communications interface module 1340 to control input commands and routing from users engaging the TESS system 1305. The system communications interface module 1340 receives commands from the client command control module 1335 and the owner command control module 1345 that, in turn, receive their input from smart-type devices (not pictured) interfacing the TESS system 1305 to communicate with the chain system tool. When a command is initiated through the system communications interface module 1340, it will originate from either the client command control module 1335 or from the owner command control module 1345. Depending on the point of origin, the operating system 1310 will route the communications responsible for managing the chain to the appropriate associated module for processing and execution of the system commands. Network or other external communication may occur through one or more wired or wireless network interfaces or communication devices.

With continued reference to FIG. 13, we will now discuss a typical command flow for the chain system tool. The purpose of this example is to show the interaction between the modules communicating the chain creation command set within the TESS system 1305. A detailed example of the external components engaging with the TESS system 1305 to create a chain is provided later in this submission. While the following example will illustrate one command flow, it is important to note that other command combinations are provided within the system to facilitate all the required features and functions supporting the chain within the TESS system 1305.

For the purposes of simplifying the following example, we will assume the owner is a registered user of the TESS system 1305, has already gone through the process of logging into the system, and has authenticated their rights to use the system as a registered user. The process explanation will begin with the owner (not pictured) creating a chain for the purpose of sharing digital content with a co-worker.

With reference to FIG. 13, an owner (not pictured) will initiate their session with the TESS system 1305 by entering the command to create a chain through their computing device (not pictured). The command will enter the TESS system 1305 through the system communications interface 1340 module, working in conjunction with the menu commands generated and presented through the owner command control module 1345. The command to create a chain will be passed to the database management module 1315 through the operating system 1310.

At this point, the active notification and messaging module 1320 will send a query to the system communications interface module 1340 through the operating system 1310, requesting details on the chain to be created. Through the owner command control module 1345 and the system communications interface module 1340, the owner creating the chain will select a group of digital content (not pictured) from a variety of their host devices (not pictured). Once the selection of the digital content populating the chain has been completed, the owner will issue the command to save the created chain. The logistical information pertaining to the location of each digital content identified within the chain will be stored in the database management module 1315. The active notification and messaging module 1320 will provide a confirmation of the newly created chain to the owner through the operating system 1310 to the system communications interface module 1340 that is communicating directly with the owners' computing device (not pictured).

Now that the chain has been created, it will be accessible to the owner and can be managed exactly like any file or other digital content held within a computing system or server. The chain can be shared, stored, deleted, edited, transferred and streamed by the owner as they choose.

As previously stated, other functional modules exist within the TESS system that can assist with security, authentication and digital content management that can affect how the newly created chain is used and otherwise managed. These modules were omitted from this discussion to ease understanding of the functional elements that control the chain system tool.

The creation of a chain can occur from any owner-managed device that is registered within the TESS (or relevant) system. There is no limit to the number of chains that can be created, or the number of files and other digital content referenced within a chain. Each chain will be created with its own unique identification nomenclature, even if the chain is created by the same device and contains the same content references.

We will now discuss the details of creating a chain from multiple registered devices for the purpose of showing details of the chain system tool. In the following example, an owner will have multiple devices registered to the TESS system, and will engage in the process of creating a chain utilizing digital content that is hosted on each of the registered devices. Since the previous discussion covered the component interaction within the TESS system for creating a chain, this discussion will focus on the search and addition of digital content (e.g. files) between devices to create the chain. Please note that while the following example (FIG. 14) shows a single piece of digital content being added to the chain from each device, functionally, any quantity of digital content from any of the one or more devices can be added to the chain.

Figure 14:
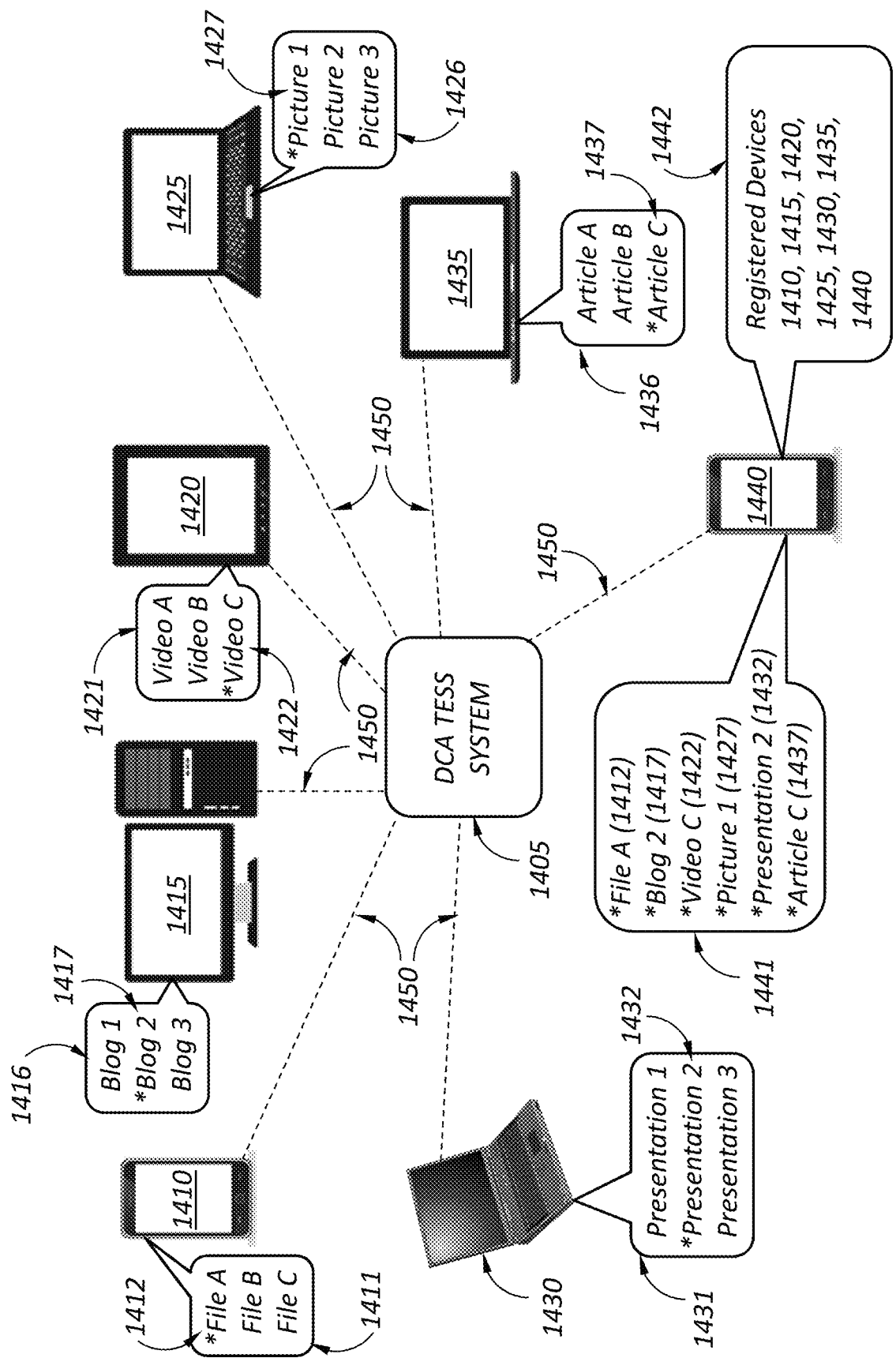
FIG. 14 is a diagram illustrating the creation of a chain.

With reference to FIG. 14, an owners' host device 1440 is registered 1450 to and communicating with the TESS system 1405. The owner (not pictured) has multiple other personal computing devices that are registered 1450 to the TESS system 1405, including a laptop computer 1430, a smartphone 1410, a desktop PC computer 1415, a tablet computer 1420, a second laptop computer 1425 and a notebook computer 1435. Each device is registered 1450 with, and thus communicating with, the TESS system 1405.

The process to create a chain begins with the search for digital content (e.g. files) to make up the contents of the chain being created. The owners' host device 1440 is presented with a list 1442 of the devices that are registered 1450 to the TESS system 1405. It is important to note that the owner can only access content that is registered 1450 to them and/or otherwise owned by them (i.e. owner content).

Upon being presented with the list 1442 of the devices that are owned by the owner and registered 1450 to the TESS system 1405, the owner (from the owner host device 1440) selects to view the digital content of the smartphone 1410. Once the owners' host device 1440 selects the smartphone 1410 from the list of registered devices 1442, a list of the digital content 1411 contained on the smartphone 1410 will be presented to the owners' host device 1440. The owner may then select one or more files to be added to the chain. For example, from that list of digital content 1411, the owner (not pictured) selects File A 1412 to be added to the chain 1441. Once the selection is made, File A 1412 will appear in the chain 1441 that is presented in the user interface of the owners' host device 1440.

Now that the first digital content (File A 1412 from the smartphone 1410) has been added to the chain 1441, the owners' host device 1440 returns to the list of registered devices 1442 to select the next registered 1450 device in which to view the digital contents.

To illustrate, from the owners' host device 1440, the owner may make a selection to view the digital content of the desktop PC 1415. A list 1416 of the digital content of the desktop PC 1415 is presented to the owners' host device 1440 through the user interface (of device 1440). From the digital content list presented 1416, the owner (not pictured) selects Blog 2 1417 to be added to the chain 1441. Once the selection is made, Blog 2 1417 will appear in the chain 1441 that is presented in the user interface of the owners' host device 1440.

Now that a second digital content (Blog 2 1417 from the desktop PC 1415) has been added to the chain 1441, the owners' host device 1440 returns to the list of registered devices 1442 to select the next registered 1450 device in which to view the digital contents.

To illustrate, from the owners' host device 1440, the owner may make a selection to view the digital content of the tablet 1420. A list 1421 of the digital content of the tablet 1420 is presented to the owners' host device 1440 through the user interface (of device 1440). From the digital content list presented 1421, the owner (not pictured) selects Video C 1422 to be added to the chain 1441. Once the selection is made, Video C 1422 will appear in the chain 1441 that is presented in the user interface of the owners' host device 1440.

Now that a third digital content (Video C 1422 from the tablet 1420) has been added to the chain 1441, the owners' host device 1440 returns to the list of registered devices 1442 to select the next registered 1450 device in which to view the digital contents.

To illustrate, from the owners' host device 1440, the owner selects to view the digital content of the laptop computer 1425. A list 1426 of the digital content of the laptop 1425 is presented to the owners' host device 1440 through the user interface (of device 1440). From the digital content list presented 1426, the owner (not pictured) selects Picture 1 1427 to be added to the chain 1441. Once the selection is made, Picture 1 1427 will appear in the chain 1441 that is presented in the user interface of the owners' host device 1440.

Now that a fourth digital content (Picture 1 1427 from the laptop computer 1425) has been added to the chain 1441, the owners' host device 1440 returns to the list of registered devices 1442 to select the next registered 1450 device in which to view the digital contents.

To illustrates, from the owners' host device 1440, the owner selects to view the digital content of the notebook PC 1435. A list 1436 of the digital content of the notebook PC 1435 is presented to the owners' host device 1440 through the user interface (of device 1440). From the digital content list presented 1436, the owner (not pictured) selects Article C 1437 to be added to the chain 1441. Once the selection is made, Article C 1437 will appear in the chain 1441 that is presented in the user interface of the owners' host device 1440.

Now that a fifth digital content (Article C 1437 from the notebook PC 1435) has been added to the chain 1441, the owners' host device 1440 returns to the list of registered devices 1442 to select the next (and, in this example, final) registered 1450 device in which to view the digital contents.

To illustrate, from the owners' host device 1440, the owner selects to view the digital contents of the laptop PC 1430. A list 1431 of the digital content of laptop PC 1430 is presented to the owners' host device 1440 through the user interface (of device 1440). From the digital content list presented 1431, the owner (not pictured) selects Presentation 2 1432 to be added to the chain 1441. Once the selection is made, Presentation 2 1432 will appear in the chain 1441 that is presented in the user interface of the owners' host device 1440.

Now that the owner has added all the digital content they desire to the chain 1441, the owners' host device 1440 can be used to share, store, stream, transfer or otherwise manage the newly created chain. As previously stated, permissions for access to the chain are managed and controlled by other features present in the TESS system 1405, and are not provided in this example. Additionally, digital content can still be added to, or removed from, the chain at any time as the owner sees fit.

Using the explanation above with reference to FIG. 14, any device, including those pictured in FIG. 14, could be used as a host device to create achain 1441, such as that created in the example above (using host device 1440). As previously stated, there is no limit to the number of chains that can be created, or to the device which is used to create or access the chain, provided that each device is (a) owned and/or managed by the user creating the chain, (b) registered 1450 within the TESS system 1405 at the time of the chain creation and (c) powered on during the creation of the chain.

Should a device (such as laptop PC 1430) become disconnected or otherwise unregistered (e.g. powered off) with the TESS system 1405 after the chain 1441 has been created, the digital content added to the chain from that device (in this example Presentation 2 1432) would not be available within the chain 1441 until such a time as the device (in this example laptop PC 1430) was once again powered on or reconnected and registered 1450 with the TESS system 1405.

Should a device (such as laptop PC 1430) become disconnected, powered off, or otherwise unregistered/unavailable to the TESS system 1405 before or during the creation of a chain 1441, the device (laptop PC 1430) would no longer appear in the list of registered devices 1442 and the digital content (1431) would not be available to be added to the chain 1441.

In cases where a device is unavailable for chain creation, or in cases where a chain was originally created utilizing a device and the device subsequently became turned off or otherwise unavailable, none of the other contents of the chain would be affected.

As an example, with reference to FIG. 14, we will assume that the tablet 1420 becomes disconnected from the TESS system 1405 before the chain 1441 is created. In this example, the list of digital content 1422 hosted on the tablet 1420 would not be available because they are not visible to the TESS system 1405. Thus, file Video C 1422 would not appear on the chain 1441, nor would the device tablet 1420 appear in the list of registered devices 1442. In this example, the remaining digital content (File A 1412, Blog 2 1417, Picture 1 1427, Presentation 2 1432 or Article C 1437) in the chain 1441 would not be effected, and would continue to appear on, and be accessible from, the chain 1441.

In cases where an owner deletes digital content from a device (such as file Video C 1422 being deleted from tablet 1420) that was contained in a chain 1441, the deleted digital content (Video C 1422) would no longer be available to the chain 1441.

It is important to note that while no digital content was selected from the host device 1440 during the creation of the chain 1441, digital content from any device being used to create the chain can also be added to the chain being created.

The chain 1441 created in the example with reference to FIG. 14 can be accessed from any owner device that is registered 1450 within the TESS system 1405 to the chain owner and is currently powered on. As an example, (with continued reference to FIG. 14) we assume the chain 1441 is created as shown. Since the owner manages all of the devices (1410, 1415, 1420, 1425, 1430, 1435 and 1440) shown in FIG. 14, and all devices are currently registered 1450 to the TESS system 1405, the owner could access the chain 1441 from any of the pictured devices (1410, 1415, 1420, 1425, 1430, 1435 and 1440) shown in FIG. 14. Further, the chain 1441 could be copied to and/or transferred to/from any of the pictured devices (1410, 1415, 1420, 1425, 1430, 1435 and 1440) shown in FIG. 14. As previously stated, there is no limit to the number of chains created, the number of digital content added to the chain, or the number of digital content from a specific device or location that can be added to a chain.

A chain can also be shared and/or transferred to anyone outside of the TESS system. The TESS system provides file sharing and permission/access tools that enable an owner to share and/or otherwise transfer a chain to a recipient that is outside of, or not registered to, the TESS system. The recipients' access to and utilization of the chain will be governed by the permissions and controls placed on the chain (by the owner of the chain). The chain system tool facilitates a variety of digital content management environments such as the renaming, copying, moving or deleting of digital content that is present within a chain. When a chain is created within the TESS system, the physical address information for the digital content referenced within the chain is collected and stored. This information is used by the chain to quickly and easily find digital content across multiple devices, platforms and operating systems that are registered to the TESS system.

An example of how the chain manages digital content that is altered after the creation of a chain will now be discussed with reference to FIG. 15. This example will show how the chain responds to deleted digital content, renamed digital content and moved digital content. As with the previous examples provided in this submission, it is assumed that the devices shown are registered with the TESS system, and are currently powered on. For the following example, we assume all devices appearing in FIG. 15 are owned by the same user.

Figure 15:
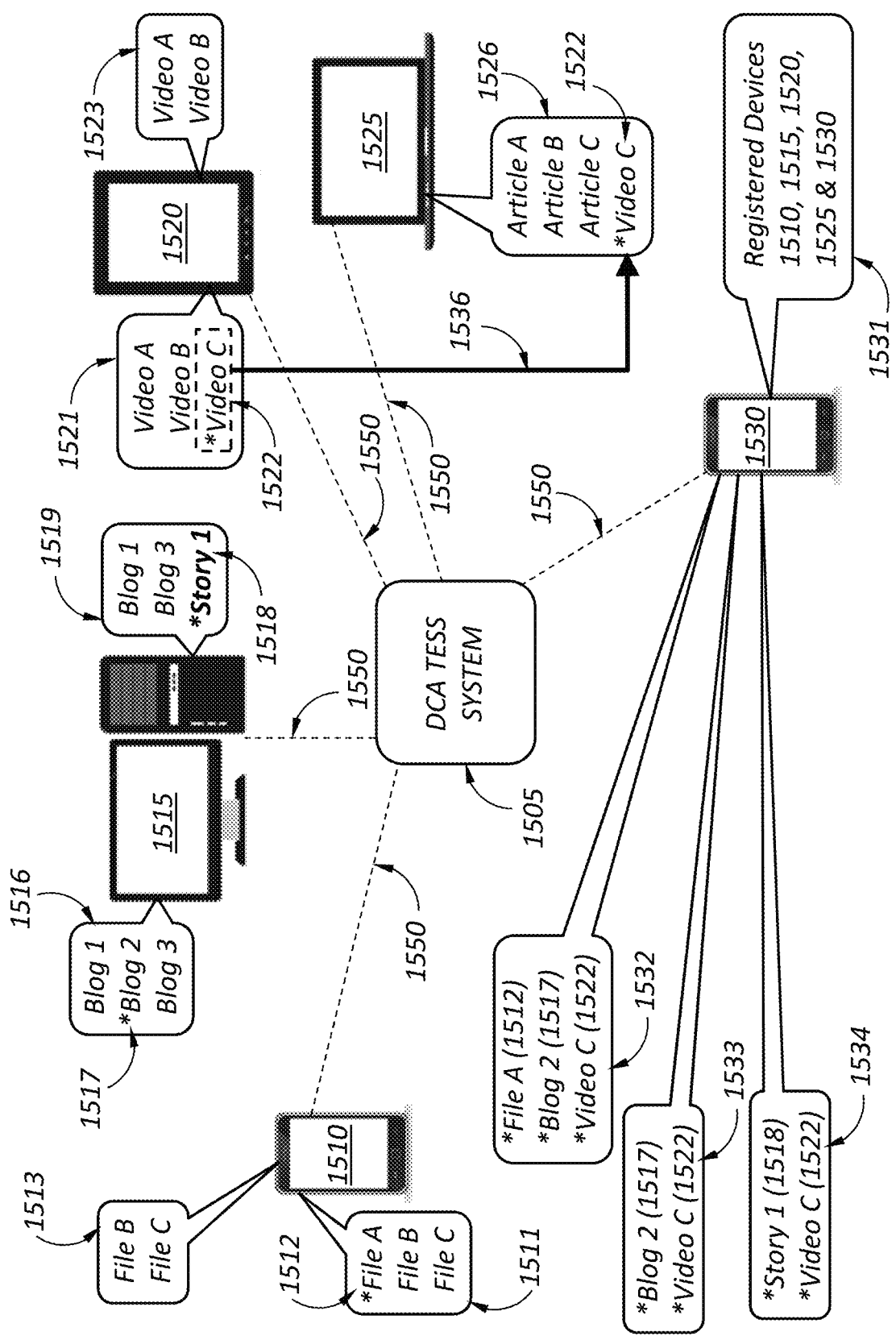
FIG. 15 is a diagram illustrating the chain capability to manage digital content that has been deleted, moved or renamed.

As can be seen in FIG. 15, an owner (not pictured) has registered 1550 a number of their personal computing devices to the TESS system 1505. These devices include a smartphone 1530, a second smartphone 1510, a desktop PC 1515, a tablet 1520 and a notebook PC 1525. The owner has previously created a chain 1532 that consists of File A 1512 from smartphone 1510, Blog 2 1517 from desktop PC 1515, and Video C 1522 from tablet 1520. The owner (not pictured) has chosen to delete File A 1512 that appears in file list 1511 from smartphone 1510. The delete command (not shown) is communicated to the chain 1532 through the TESS system 1505 from the device (smartphone 1510) deleting File A 1512, to the device (smartphone 1530) accessing the chain 1532. Once File A 1512 has been deleted (as shown in the updated file list 1513 of smartphone 1510), the chain 1532 will automatically update to remove the reference of File A 1512 from the chain 1532. This will leave the remaining digital content (Blog 2 1517 and Video C 1522) as shown in the updated chain 1533, and the functionality of, or access to any of the remaining digital content will not be affected. Since File A 1512 was deleted from smartphone 1510 and automatically removed from chain 1532, File A 1512 may not be restored to the updated chain 1533, even if it is undeleted. Once digital content is removed from a chain (via deletion), it may not be restored without undeleting (restoring) the digital content (File A 1512) on the device itself (smartphone 1510) and then subsequently editing the chain (now represented as 1533) to add it back into the chain.

A chain will also update and reflect changes made to digital content included in the chain such as the renaming of digital content referenced in a chain. As can be seen in FIG. 15, a desktop PC 1515 contains a list of digital content 1516 wherein a file was named Blog 2 1517. It was then renamed to Story 1 1518, as reflected in digital content list 1519 (i.e. the updated digital content list 1516). During the renaming process (again, assuming the devices are all registered 1550 to the TESS system 1505), the chain 1533 will be alerted to the rename from the desktop PC 1515 through the TESS system 1505. This alert will result in the chain changing the filename Blog 2 1517 and replacing it with Story 1 1518 as shown in the updated chain 1534.

A chain will function in the above manner with reference to any other device and/or digital content registered 1550 to the TESS system 1505. Since the TESS functionality (as previously stated in this submission) makes the storage repository of each device accessible through the TESS system 1505, any updates to any digital content referenced within a chain will be managed within the system.

A chain will also update itself in instances where the digital content referenced within a chain is moved. Digital content is typically managed within devices on a storage repository, such as a hard drive, flash drive or memory card. Users may move digital content referenced within a chain to different folders, drives or devices registered 1550 to the TESS system 1505, without needing to update the chain.

As an example, with reference to FIG. 15, the owner (not pictured) has created a chain 1534 that contains the digital content Video C 1522. As can be seen in FIG. 15, Video C 1522 was previously hosted on the tablet 1520 as shown in the directory listing 1521. The device owner (not pictured) has moved 1536 Video C 1522 from the tablet 1520 to the notebook PC 1525. The updated directory listing 1523 of the tablet 1520 shows Video C 1522 no longer appearing and, instead, it now appears on the notebook PC 1525 directory listing 1526. While the name Video C 1522 has not been changed, the device owner could have chosen to both rename and move the digital content Video C 1522. This would have resulted in the new file name given to Video C 1522 appearing in chain 1534. The actual function of the move does not affect how the chain is presented to the owner, so the fact that the digital content (Video C 1522) was moved 1536 between devices is transparent with reference to how the chain is presented to the digital content owner.

The chain, working in conjunction with the TESS system 1505, has the capability of updating the physical location of digital content as owners move it between folders, drives and their personal (owned) registered devices throughout the system.

As stated previously in this submission, the creation of a chain by an owner requires that the owner be registered to the TESS system (or any other system hosting the chain system tool) and that the devices hosting the content being added to the chain be owned and/or otherwise managed by the owner creating the chain. It is important to note that an owner may not access or otherwise add digital content to a chain that is not in their direct control, or have not been granted permission through the TESS system to access and add such content to a chain.

Ownership of the digital content is required to add the subject content to a chain. Ownership can be achieved by introducing the digital content to the TESS system, by way of registering a new device. The TESS system will assume that an owner that is registering a new device is the owner/manager of the referenced device. Thus, any content on the newly registered device can be added to a chain by the owner registering the referenced device.

Another avenue to achieve ownership of the digital content is through the TESS system transfer feature. If a first user chooses to transfer digital content to a second user, the transfer of the subject content will presume no limitations or restrictions imposed by the first user upon the second user (recipient) of the subject content being transferred. Therefore, the second user (recipient) will be given ownership access to the newly transferred content, and can therefore add it to a chain using the chain system tool.

The TESS system also provides a manager tool that can be utilized by any user registered to the system to pass digital content from a first user, to a second user, or group of users. The manager tool allows a first user (or digital content owner) to set access restrictions and criteria on either a second user (or group of users) of the digital content being accessed, or upon the digital content itself. As with other components within the TESS system, the manager tool software modules function within the framework of the TESS system architecture to allow complete integration of the manager tool function within the TESS system environment. It is important to note that while this discussion provides for the manager tool functioning within the TESS system architecture, the software-centric nature of the manager tool allows it to be easily implemented into other systems and other networking elements to provide the management function to govern the usage of digital content within the given system.

The following discussion will explain the primary components utilized in the manager tool within the TESS system architecture. While the manager tool can control sessions and transactions between one or more users and/or groups of users simultaneously, all component discussions will reference a first user as an owner or host of content, and a second user as a client or recipient of digital content that is accessed through the manager tool. This will keep the discussion simple, and maintain the focus on the components being discussed. It is important to note that while the key components of the manager tool are represented together in FIG. 16, they do not need to be collocated and can exist across networks in a variety of geographic locations across multiple devices. The key components of the manager tool within the TESS system will now be discussed with reference to FIG. 16.

Figure 16:
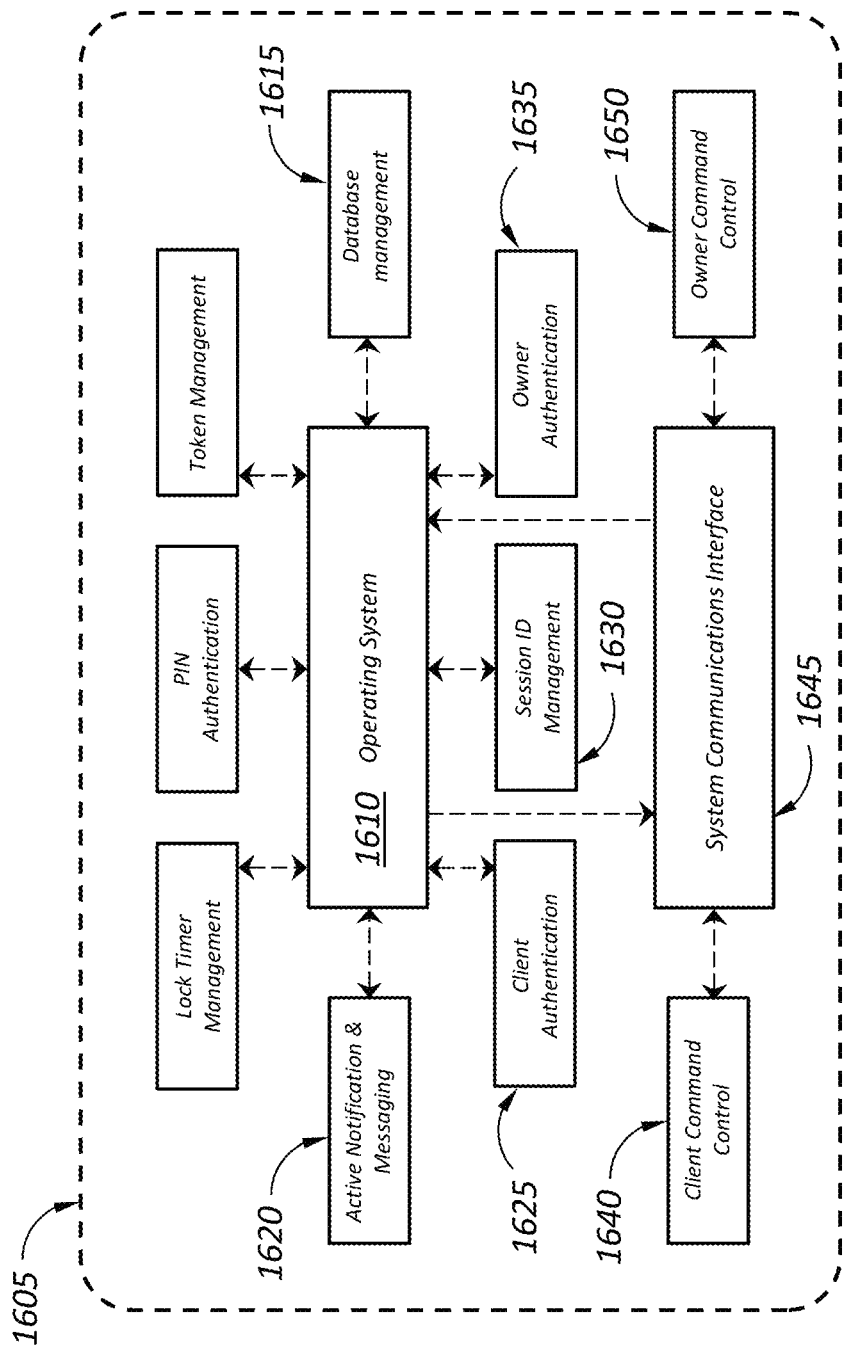
FIG. 16 is a block diagram illustrating the functional components of the manager tool.

FIG. 16 illustrates an exemplary TESS system 1605. The key components utilized by the manager tool within the TESS system 1605 are the operating system 1610, the database management module 1615, the active notification and messaging module 1620, the client authentication module 1625, the session ID management module 1630, the owner authentication module 1635, the client command control module 1640, the system communications interface module 1645 and the owner command control module 1650.

As provided earlier in this submission, the operating system 1610 provides a wide variety of functionality as it relates to the TESS system 1605. This discussion will focus on the specific duties of the operating system 1610 as it relates to the functional engagement of the manager tool. The operating system 1610 governs the interaction of the manager tool with each of the referenced functional modules of the manager tool, within the TESS system 1605. The operating system 1610 is specifically responsible for routing and processing command information between the modules associated with the management function as referenced above. While each module has a specific functional aspect that will be described below, the operating system 1610 will work both independently with each module, and collectively with all modules to ensure complete integration and functional efficiency within the TESS system 1605. A functional description of the operating system 1610 as it interacts with the manager tool will be discussed later in this submission.

The database management module 1615 is utilized to store information collected by the manager tool to administrate the digital content that is being passed between users of the TESS system 1605. The database management module 1615 will store management information such as the access rights provided from a first user to a second user, or group of users, or to store information as to the location of a given piece of digital content including, but not limited to, the device hosting the content, the specific folder and drive, as well as the metadata identifying the digital content. The database management module 1615 stores all relevant information pertaining to the management of both the digital content and the user access information governing ownership of the subject digital content. A functional description of how the database management module 1615 and all other system modules will operate with the manager tool is provided later in this submission.

The active notification and messaging module 1620 provides messages from the manager tool pertaining to the disposition of digital content being passed between users, as well as messages pertaining to system level actions, informational messages and updates on specific functions. When a user accesses digital content through the manager tool, the active notification and messaging module 1620 will provide confirmation messages about the content accessed, as well as messages wherein access to content has otherwise been denied or restricted. The active notification and messaging module 1620 is responsible for all system level message generation as it relates to the manager tool.

The client authentication 1625 and owner authentication 1635 modules provide the authorization processing for users entering the manager tool for the purpose of engaging in the access of digital content being controlled by the manager tool. The client authentication module 1625 processes authorization information for a second user, or recipient, of digital content being passed from an owner through the manager tool, while the owner authentication module 1635 processes authorization information for a first user, or owner, of the digital content being passed to the recipient. The authentication modules (client 1625 and owner 1635) vary due to the nature of the user in which they will engage. Digital content owners or first users (engaging the owner authentication module 1635) are registered within the TESS system 1605, and can gain access to the functional aspects of the manager tool, while the second users or recipients accessing digital content that is passed by the manager tool will not be allowed access to the functional aspects of the manager tool, and their access will be governed by the access rights assigned by the first user or content owner entering through the owner authentication module 1635. In some cases, a first user can be both an owner who is registered within the TESS system 1605, while also being a second user or recipient (client) of digital content being passed between users by the manager tool. The manager tool will always treat a recipient of digital content being passed within the system as a second user or a client, while the owner of the digital content being passed will always be regarded as the first user or host.

Each instance of accessing and/or passing digital content utilizing the manager tool constitutes a session. Within each session, there can exist one or more transactions. As an example, a session occurs when a first user engages the manager tool to access digital content that they own. This session is given an identifier by the session ID management module 1630. During this session, a first user may open a piece of digital content (such as a song) and play or stream it. This constitutes a transaction. Each transaction within a session is also actively monitored and tagged by the session ID management module 1630. The information pertaining to the sessions created, and the transactions that occur within these sessions may be retrieved at any time by the first user (owner/host) of the digital content that was accessed during the session. All aspects of interaction within the manager tool are identified and logged by the session ID management module 1630. A functional interaction of the session ID management module 1630 working with the manager tool within the TESS system 1605 is provided later in this submission.

The owner command control 1650 and client command control 1640 modules manage the user commands entered into the manager tool through the associated user devices. The client command control module 1640 is responsible for providing the second user (recipient/client) with the command set available to them for engaging in digital content that is provided through the manager tool. The owner command control module 1650 is responsible for providing the first user (owner/host of the digital content that is passed with the manager tool) with the command set available for managing digital content within the TESS system 1605.

Continuing to refer to FIG. 16, the system communications interface module 1645 is responsible for parsing the command set that is entered from the client command control 1640 and owner command control 1650 modules, and passing that information through the operating system 1610 to the associated modules responsible for executing the commands within the system. Since the manager tool relies almost solely on the operating system 1610 for the functional manager tool commands, the system communications interface module 1645 works directly with the operating system 1610 to expedite interpretation and processing of the commands entered. The system communications interface module 1645 is also responsible for delivering system and functional messages and notifications to the client command control 1640 and owner command control 1650 modules. The system communications interface module 1645 manages all communication between the manager tool hosted within the TESS system 1605, and the user(s) accessing the manager tool.

The manager tool provides the capability of controlling access to, and the passing of digital content within the TESS (or other host) system. The functional aspects of the manager tool will now be discussed with continued reference to FIG. 16. The functional example will consist of a single first user (host/owner) and a single second user (client/recipient) wherein the host is providing access to a piece of digital content for the client. This example assumes that both the first and second user have already verified their identity to the TESS system 1605, and are engaging the manager tool for the purpose of interacting with the subject digital content.

With reference to FIG. 16, the first user (not pictured) has a need to give access to digital content (in this case, a Word document) to a second user or client (not pictured). The first user will access the manager tool through the owner command control module 1650. From the owner command control module 1650, the first user will execute the command to find the digital content (Word document) that he wishes to allow the second user to access. The system communications interface module 1645 will interpret the file search command and pass that information to the operating system 1610. The operating system 1610 will notify the session ID management module 1630 to start a session. The session function will be discussed in detail later in this submission. The operating system 1610 will query the database management module 1615 to acquire the location of the digital content (Word document) to be accessed. Once the database management module 1615 identifies the storage location, device and network the digital content (Word document) resides upon, that information will be returned to the operating system 1610. The operating system 1610 will then engage the active notification and messaging module 1620 and provide the digital content (Word document) location to it accordingly. The active notification and messaging module 1620 will convert the machine language message received by the operating system 1610 into a user-friendly (readable) message that can be interpreted by the first user (not pictured). This message is then sent back to the operating system 1610 with instructions to port the message to the system communications interface module 1645, and subsequently back to the first user through the owner command control module 1650. The first user (not pictured) has now located the digital content (Word document) to be accessed by the second user (client, not shown) and can set the parameters for access accordingly.

The first user (not pictured) will engage the owner command control module 1650 and set the access permissions or parameters for accessing the digital content (Word document) (these parameters will govern the client/second user access) as "read only". The read only setting indicates that the digital content (Word document) that will be accessed by the second user/client (not pictured) will not be editable, downloadable or otherwise accessible in any form other than viewing of the digital content (Word document). A "read-write" access parameter, which would allow editing of digital content, is also contemplated.

Once the access parameter (read only) has been set by the first user, the command is transferred from the system communications interface module 1645 to the operating system 1610. The operating system 1610 tells the database management module 1615 that when the second user accesses the digital content (Word document), the access rights are provisioned solely as "read only". The database management module 1615 confirms this setting to the operating system 1610, which sends this confirmation/acknowledgement to the active notification and messaging module 1620. The active notification and messaging module 1620 converts the coded message to user-friendly (readable) information, and provides this back to the operating system 1610. The operating system 1610 will take the message from the active notification and messaging module 1620 and send it to the system communications interface module 1645, where it is then presented to the owner command control module 1650, providing a positive acknowledgement that the digital content (Word document) to be accessed by the client/second user (not pictured) will be set to read only.

At this point, the owner (not pictured) is prepared to provide access to the digital content (Word document) to the client/second user. From the owner command control module 1650, the first user sends a command to notify the second user/client of the access that has been granted to the digital content (Word document). It is important to note, that in relation to the TESS system 1605, this notification being submitted to the client/second user can be sent in a variety of different ways. For the purpose of this discussion, we will assume that the client/second user has been notified with an email sent to their account used to register with the TESS system 1605.

The second user/client receives an email (not pictured), that notifies them that access to a digital content (Word document) file has been granted to them by the first user. The second user/client will then access the manager tool through the client command control module 1640. As previously stated, since the client/second user has already authenticated their access rights to the TESS system 1605, this discussion will bypass that process. The entire process for access and authentication is discussed in detail earlier in this submission.

As the client/second user accesses the client command control module 1640, they will see that access has been granted to a digital content (Word document) by the first user. The client/second user can select that digital content (Word document), which will send an access request through the systems communications interface module 1645 to the operating system 1610. The operating system 1610 will notify the session ID management module 1630, which will log the access by the second user/client as a transaction within the current session. The session and transaction functions will be detailed later in this submission. The operating system 1610 will notify the database management module 1615 that the second user/client is requesting access to the digital content (Word document), as provisioned by the first user. The database management module 1615 will verify the digital content (Word document) location and associated access permission information, and return that information to the operating system 1610. The operating system 1610 will then provide that information to the active notification and messaging module 1620. At the same time, the operating system 1610 will also send a request to the storage device hosting the digital content (Word document) (not pictured), requesting access to the digital content (Word document) in a "read only" format, as instructed by the database management module 1615. The active notification and messaging module 1620 will convert the code information to user friendly (readable) language, and send that information to the operating system 1610. The operating system 1610 will send the acknowledgement from the active notification and messaging module 1620 to the system communications interface module 1645, which will subsequently provide the acknowledgement to the client command module 1640. The client/second user has now been notified that a read only access to the digital content (Word document) is being provided. At the same time the second user/client is receiving the acknowledgement, the storage repository hosting the digital content (Word document) (not pictured) will grant access to the second user/client in a read only fashion.

The second user/client will continue to enjoy access as provided by the first user until such a time as provisioned by the first user. The access timing and associated security provisions surrounding the access to the referenced digital content (Word document) were provided earlier in this submission.

Utilizing the manager tool, the first user can, at any time of their choosing, terminate the access rights of the second user/client to the subject digital content (Word document). The functional aspects of terminating the access rights to digital content will follow the process and response chain of module interaction as detailed above. In all instances of digital content interaction, the process will begin with the owner command control module 1650 sending commands to the operating system 1610 through the system communications interface module 1645. From this point, the operating system 1610 will always seek to query the database management module 1615 first, to acquire the location of the digital content, and the associated access rights settings as provisioned by the first user. Once this information has been verified, the database management module 1615 will return this information via the operating system 1610 to the active notification and messaging module 1620. The active notification and messaging module 1620 will receive the information in coded language form, and put it into a user-friendly (readable) format that can then be presented to either the owner (through the operating system 1610, the system communications interface module 1645, and subsequently to the owner command control module 1650) or to the second user/client (through the operating system 1610, the system communications interface module 1645, and subsequently to the client command control module 1640). All command and control processing within the manager tool will utilize the above referenced modules in the order stated.

Using the above command configuration, the manager tool can control access to any content managed within the TESS system 1605. Individual second users/clients can be given access to the same digital content through the manager tool, but with varying access rights. These access rights will be configured by the owner through the owner command control module 1650, and processed through the TESS system 1605 to be collected and stored in the database management module 1615 using the command configurations and module interactions as provided above. The database management module 1615 will store the access rights on a by digital content and by user basis, to ensure that regardless of the configuration, the appropriate second user/client will be given access rights as provisioned on that particular second user/client, for that particular digital content being accessed.

Additional commands available through the manager tool to govern the rights of the digital content being accessed through the manager tool include read only, download, play/stream (in the case of audio/video/media content), upload, and the control functions provided through the TESS system, including routing the digital content to a temporary external secured storage location wherein a timer (as discussed earlier in this submission) may be engaged to govern accessibility of the referenced digital content. As previously stated, these activities can be controlled by the manager tool on either a by user basis, a by digital content (file) basis, or a combination of both. As an example, a first user may be providing access to digital content for a group of second users/clients. The first user can provision all of the second user/clients with the exact same access rights to the digital content, or can individually control how each second user interacts with the digital content.

As previously stated in this submission, every interaction of either a first user (host/content owner) or a second user/client results in the creation of a session, and the potential for transactions to occur within the session. A first user that logs into the manager tool will, by default, create a session through the session ID management module. All functional interactions that takes place between the first user and their digital content that is managed by the manager tool will be captured and logged by the session ID management module as a transaction. Transactions can include, but are not limited to, the first user setting access permission on a piece of digital content, the first user then giving access to a second user/client to that piece of digital content, and the second user/client accessing and executing commands against that piece of digital content. The session ID management module is responsible for tracking all interaction from all first and second users (or groups of first and second users) with the digital content managed within the manager tool. The session ID management module is responsible for creating, tracking, and logging all sessions created within the manager tool.

Figure 17:
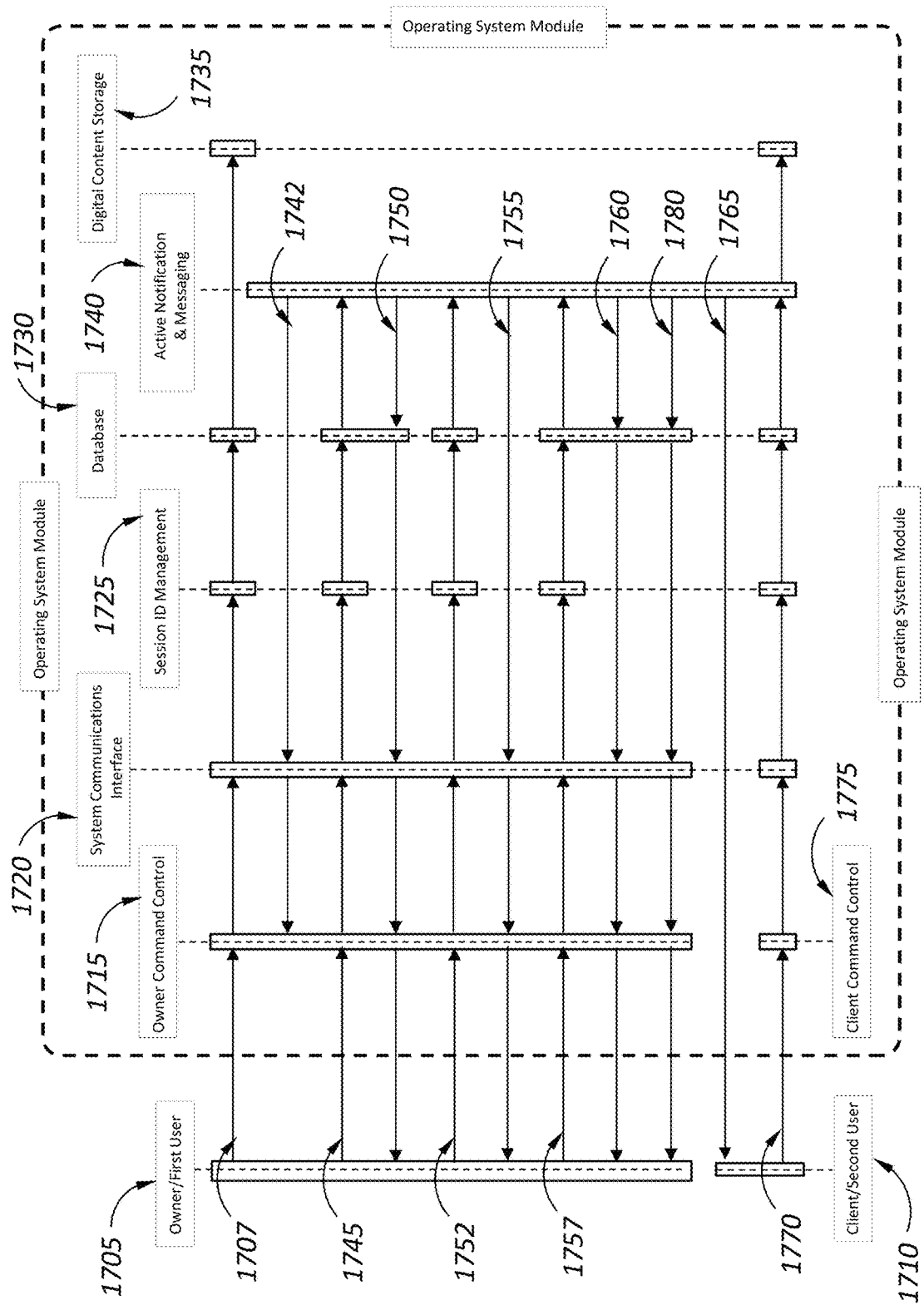
FIG. 17 is a functional flow diagram illustrating the manager tool enabling digital content to be passed from a first user to a second user.

Each interaction with digital content within the TESS system (utilizing the manager tool function) will result in the creation of a session. The session will track and log all interactions from all users engaging with the digital content stored within, or managed through, the TESS system and the manager tool functionality. A typical session within the manager tool will now be discussed with reference to FIG. 17. Please note that this interaction will relate to a single first user (digital content owner) and a second user (client/recipient) who will be given limited access to the first users' digital content. The following discussion assumes that both the first and second user have gained access to the TESS system and authenticated their identity within the TESS system. Please also note that the operating system in the following FIG. 17 is represented as a dotted line around the modules and components of the TESS system. FIG. 17 assumes that the operating system manages all routing and communications between modules within the TESS system and the manager tool. Please refer to FIG. 17.

With reference to FIG. 17, a first user 1705 will access 1707 the manager tool to gain access to digital content (in this case, a file). The first user 1705 will be provisioning the file to allow access by the second user 1710. The first user query 1707, requesting a specific file will travel through the owner command control module 1715 and to the system communications interface module. 1720. The system communications interface module 1720 will convert the user query 1707 into digital language for interpretation within the TESS system. The system communications interface module 1720 will notify the session ID management module 1725 that a new session is to be initiated. The session ID management module 1725 will create a session and notify the database module 1730 that a new session has been created, and that a query 1707 for digital content has begun. The database module 1730 will record the start of the new session, and provide the location information for the digital content (in this example a file), and route the user query 1707 directly to the digital content storage 1735.

Once the digital content has been located within the digital content storage 1735, the active notification and messaging module 1740 returns a message 1742 to the system communications interface module 1720, identifying for the first user/owner 1705 the location of the file being sought. The system communications interface module 1720 will convert this coded message 1742 into a readable language for presentation to the first user 1705 at the owner command control module 1715.

The first user 1705 now executes a command 1745 to set the file that will be accessible to the second user 1710 as "read only". This command 1745 is processed by the owner command control module 1715 and submitted to the system communications interface module 1720. The system communications interface module 1720 converts the command 1745 into a coded language for execution by the manager tool. After leaving the system communications interface module 1720, the command 1745 enters the session ID management module 1725. The session ID management module 1725 will record the transaction of setting the file to "read only", as well as recording the file name, location, date and time. The command 1745 then passes from the session ID management module 1725 to the database module 1730 where the file access settings (read only) are logged. Once the access settings have been logged in the database module 1730, the database module 1730 acknowledges the access settings have been logged (read only) and engages the active notification and messaging module 1740. The active notification and messaging module 1740 sends a response to the database module 1730, indicating that it is sending an acknowledgement 1750 to the first user 1705 that the access settings on the file have been set to read only. The database module 1730 records this acknowledgement 1750 as a transaction within the given session, and then passes the acknowledgement 1750 to the system communications interface module 1720. The system communications interface module 1720 converts the acknowledgement 1750 from a code format to a readable format and sends it to the owner command control module 1715 where the first user 1705 can verify that the command to set the file access permission to read only has been completed.

It is important to note that while the command protocol sent through the manager tool engages with multiple modules for the purpose of performing multiple specific tasks, these actions take milliseconds to perform.

With continued reference to FIG. 17, the first user 1705 has successfully configured the file stored in the digital content storage 1735 for read only access. The first user 1705 now enters a command 1752 into the TESS system, requesting the address location (within the TESS system) of the second user 1710 so that the access to the file can be granted. Without the address location of the second user 1710 (within the TESS system), the access to the digital content (file) held within the digital content storage 1735 could not be granted. The command 1752 is processed by the owner command control module 1715 and sent to the system communications interface module 1720. The system communications interface module 1720 will convert the command 1752 to machine language (code) for the purpose of communicating with the associated system modules. The coded command 1752 now leaves the system communications interface module 1720 and engages the session ID management module 1725. The session ID management module 1725 logs the transaction of the first user 1705 command 1752 to locate the second user 1710 identification and sends the query on to the database module 1730. The database module 1730 will locate the second user 1710 identification information and inform the active notification and messaging module 1740 that the information has been located.

The active notification and messaging module 1740 will return the acknowledgement 1755 to the system communications interface module 1720 that the second user 1710 identification information has been successfully located.

Please note that since the subject file stored in the digital content storage 1735 was not accessed or engaged during the process of locating the second user 1710 identification information, the database module 1730 was not notified of the acknowledgement 1755 of the active notification and messaging module 1740, as it was previously with reference to 1750. The acknowledgement 1750 dealt specifically with an access permission setting being configured on the file stored in the digital content storage 1735, and therefore logged in the database module 1730 accordingly.

Once the acknowledgement 1755 reaches the system communications interface module 1720, it is converted into a readable format and passed to the owner command control module 1715 for receipt by the first user 1705.

Now that the first user 1705 has the contact info to alert the second user 1710 of the file access being granted, the first user 1705 sends a command 1757 instructing the manager to allow access to the second user 1710. The command 1757 enters the owner command control module 1715 and is passed to the system communications interface module 1720, where it is converted to a coded language that can be interpreted by the system modules. The command 1757 then passes to the session ID management module 1725 where the transaction allowing the second user 1710 access to the file (stored in the digital content storage 1735) is logged as a transaction. The time, date, filename and other specific aspects of the file being accessed is logged within the transaction. This includes the physical device and location of the file held within the digital content storage 1735, as well as any time limit information that may have been placed on the file using the DCA functionality described earlier in this submission. The session ID management module 1725 sends the command 1757 with the transaction information to the database module 1730 to be logged and recorded. One the database module 1730 has recorded the transaction information, the command 1757 is passed to the active notification and messaging module 1740.

The active notification and messaging module 1740 sends a response to the database module 1730, indicating that it is sending an acknowledgement 1760 to the first user 1705 that the command 1757 granting access (for the second user 1710) has been processed. The database module 1730 records this acknowledgement 1760 as a transaction within the given session, and then passes the acknowledgement 1760 to the system communications interface module 1720. The system communications interface module 1720 converts the acknowledgement 1760 from a code format to a readable format and sends it to the owner command control module 1715 where the first user 1705 can verify that the command 1757 to allow access to the file for the second user 1710 has been processed. Now that the file has been configured for access and the access has been granted by the first user (1705), the second user 1710 will be notified.

With continued reference to FIG. 17, the active notification and messaging module 1740 sends a message 1765 to the second user 1710, notifying them of the access granted by the first user 1705. Since the manager tool can send system messages either through email, text messaging or other external methodologies, FIG. 17 assumes that an external (via internet) methodology was implemented, and therefore the message 1765 being sent to the second user 1710 is delivered without regard to the functional system modules.

Once the second user 1710 receives the message 1765 granting access to the file, the second user 1710 will send a request for access 1770. The access request 1770 will enter the client command control module 1775 and is passed to the system communications interface module 1720, where it is converted to a coded language that can be interpreted by the system modules. The access request 1770 then passes to the session ID management module 1725 where the transaction of the second user 1710 requesting access 1770 to the file (stored in the digital content storage 1735) is logged as a transaction. The time, date, filename and other specific aspects of the file being accessed is logged within the transaction. This includes the physical device and location of the file held within the digital content storage 1735, as well as any time limit information that may have been placed on the file using the DCA functionality described earlier in this submission. The session ID management module 1725 sends the access request 1770 with the transaction information to the database module 1730 to be logged and recorded. The database module 1730 verifies the access rights of the second user 1710 to the file stored within the digital content storage 1735, as well as any restrictions (in this case, read only) that have been placed on the file being accessed. The database module then sends a positive acknowledgement of the access request 1770 to the active notification and messaging module 1740 that the second user 1710 has requested 1770 and been granted read only access to the file stored in the digital content storage 1735. The second user 1710 now has read only access to the file stored in the digital content storage 1735.

The active notification and messaging module sends a response 1780 to the database module 1730, indicating that the second user 1710 has accessed the file stored in the digital content storage 1735. The database module 1730 records this acknowledgement response 1780 (that the second user 1710 has accessed the file), and stores the transaction within the given session. The database module 1735 then passes the response 1780 to the system communications interface module 1720. The system communications interface module 1720 converts the response 1780 from a code format to a readable format and sends it to the owner command control module 1715 where the first user 1705 can verify that the second user has requested (and received) access to the file contained in the digital content storage 1735.

The session created by the transaction described above will be terminated when the first user 1705 logs out of the manager tool, or otherwise disconnects from the TESS system. It is important to note that any further interaction by the second user 1710 with the file accessed during the session will be logged within the subject session even though it has been closed. This allows the first user 1705 to track any interaction the second user 1710 has with the subject file accessed during the session. Historically, this provides a significant level of granularity to tracking the use of, and engagement with, digital content managed within the TESS system.

All interaction with digital content that occurs during the session (from the time the first user/content owner logs in, until they log out of the TESS system) will be managed under a single session. The TESS system defines a session as the interaction with digital content managed through the TESS system (via the manager tool function) while a first user/content owner is active within the TESS system. The functional aspects for a first user/owner providing access to a chain or other digital content hosted or managed through the TESS system (via the manager tool) would occur as described in the example given with reference to FIG. 17.

While the example illustrated above described a single first user and a single second user, the manager tool can facilitate digital content sessions and transactions occurring simultaneously with a virtually unlimited number of first users (content owners) and second users (content recipients) or groups of second users. In instances where the content owner (first user) is a group, the administrator of that group will configure the digital content for access to second users or groups of users.

The functional elements and module interaction described in the example with reference to FIG. 17 also applies to the other access permissions and rights that a first user/owner can apply to digital content that they own or manage within the TESS system. These permissions include read only, wherein a second user or group of users is allowed to access digital content in a view mode only, and may not otherwise edit, copy, download, move, delete or execute other commands against the digital content; private access, wherein a second user or group of users is required to authenticate their access rights to the digital content through the DCA (Digital Certification Analyzer) function described previously in this submission; timed access, wherein a second user or group of users is given access to digital content that has been provided within a given timeframe or a time limit on access; and download, wherein a second user or group of users is given access to digital content that they can download and take control of. The download access does not give write permission to the second user or group of users, so it is impossible for them to edit, delete, move or otherwise corrupt the original digital content that has been accessed and downloaded. The second user or groups of users can of course, modify the downloaded digital content as they choose.

Other system restrictions may apply to the access of digital content when granted by a first user (owner/host) to a second user or group of users. These restrictions include single access, wherein a second user or group of users is provided access to digital content on a one-time basis. The access will terminate when one of the following conditions occurs; a timer expires, the second user or group of users logs out of the TESS system or otherwise closes the accessed digital content, or if the access has been terminated by the first user (owner/host) of the digital content.

In addition to the manager tool functions discussed previously, the manager tool provides the capability (within the TESS system) to engage in the management of digital content between parties (one or more first users and one or more second users, or groups of users) without the aid of a web based server. The manager tool provides the capability within the TESS system to allow digital content to pass and/or be engaged directly between user devices, eliminating the need to centrally host the digital content on a web based server in order to provide access.

The manager tool (within the TESS system) provides a direct connection between user devices after each user has authenticated their access rights to the computing devices being utilized to engage in the access of digital content through the manager tool. While the manager tool will allow a user to host their digital content on a web based server, it is not a requirement to enable the full utilization of the digital content access controls discussed previously in this submission. By enabling digital content to be engaged with, and/or passed between parties without requiring that content to pass to a web based server, it enhances the overall privacy and security aspects for a file host. A typical scenario wherein digital content is passed between a first user and a second user without the aid of a web based server is now discussed with reference to FIG. 18. As with previous discussions, the following discussion (with reference to FIG. 18) will assume that both the first user and the second user have authenticated rights to access the TESS system, and subsequently the manager tool.

Figure 18:
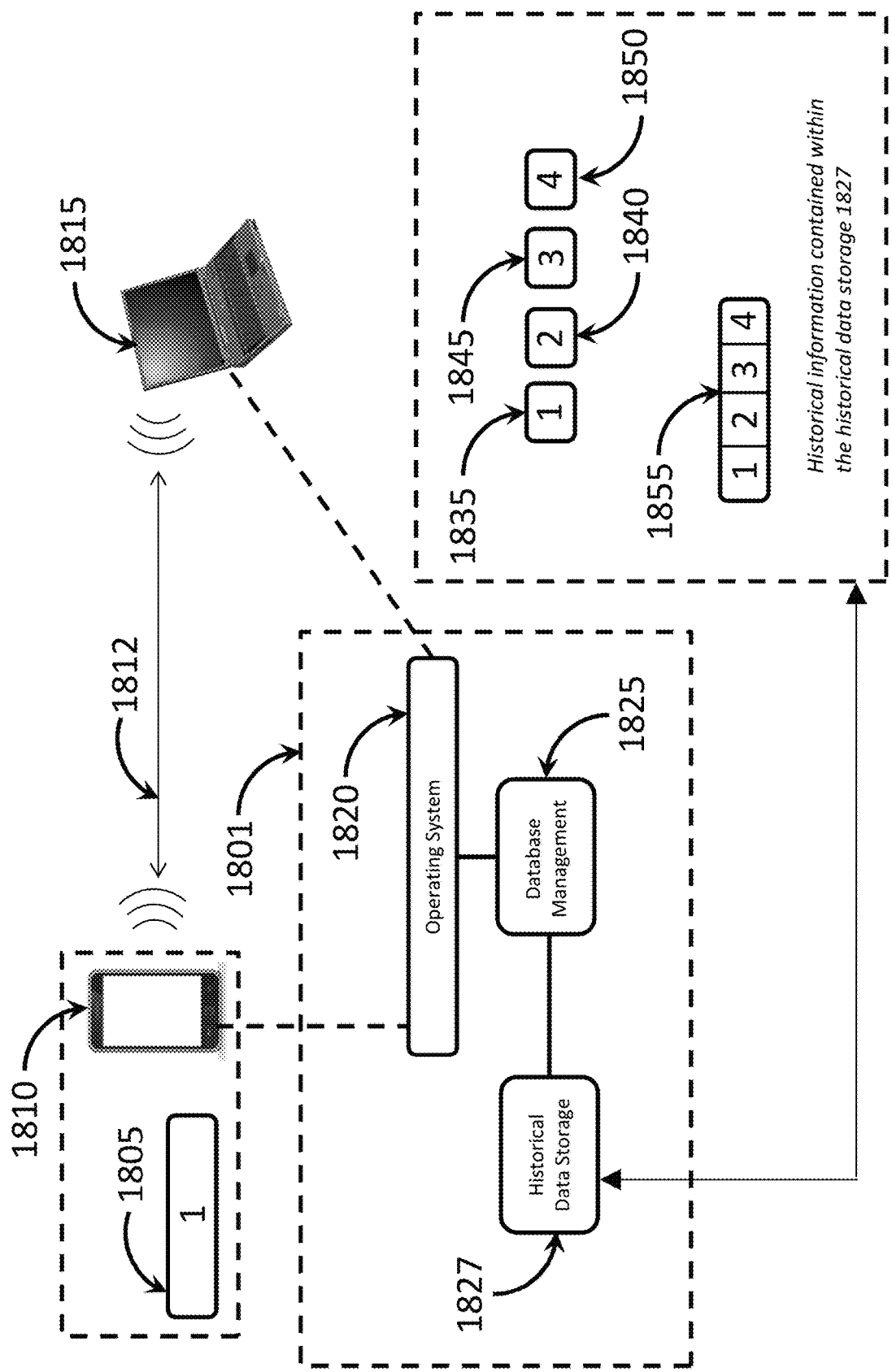
FIG. 18 is a diagram illustrating the passing of digital content between two parties, without the utilization of a web based server.

FIG. 18 shows a first user device 1810 that contains digital content. In this exemplary case, the digital content is a file 1805 that will be accessed by a second user 1815. The process of allowing the second user device 1815 access to the file 1805 begins by the first user device 1810 initiating a command through the operating system 1820 within the TESS system 1801, wherein the first user device 1810 is instructing the operating system 1820 that the second user device 1815 is to be granted access to the file 1805 hosted on the first user device 1810. The operating system 1820 communicates with the database management module 1825 to obtain information related to the file 1805 being accessed. The database management module 1825 requests historical information about the file 1805 from the historical data storage module 1827. This information may include but is not limited to the previous second user information 1835 that has been associated with the file 1805, the access rights and permissions 1840, any multi-factor or digital certification analyzer (DCA) protection 1845 applied to the file 1805 and any access expiration information 1850 that may be applied to the file 1805 being accessed. The compiled set of new historical information 1855 is then sent to the database management module 1825 to be stored. Once the access command is executed, the new historical information 1855 will also be stored within the historical data storage module 1827. The redundancy of storage ensures that the historical information remains both valid and complete, and eliminates the possibility of an inconsistency between data housed in the database management module 1825 and the historical data storage module 1827, since these two modules are not necessarily collocated within the same physical server or geographic location.

Now that the new historical information 1855 about the file 1805 being accessed has been stored, the database management module 1825 notifies the operating system 1820 that the access to the file 1805 can proceed. The operating system 1820 sends a message to the second user device 1815 that access has been granted to the file 1805. Once the second user device 1815 has successfully acknowledged the message by accessing the file 1805, the operating system 1820 will send a confirmation to the first user device 1810 that the file 1805 has been successfully accessed. The access from the second user device 1815 to the first user device 1810 hosting the file 1805 is direct 1812, and can be achieved through commonly used wireless technologies such as wireless telephone networks, Wi-Fi, Bluetooth and the internet. When access to the file 1805 is completed by the second user device 1815, the second user device 1815 will send a message to the operating system 1820 that the access has terminated. It is important to note that access restrictions such as multi-factor authentication, digital certification analyzer, access timers and other factors can impact the time the access to the file 1805 is granted.

Backup of digital content within the TESS system may be performed through a series of system modules providing detailed information about the digital content being stored. The user of the TESS system has the option of performing a backup where the contents of their backup are stored on a device they own and control, such as a personal cloud device, or in a secured storage location within the TESS system, or both. It is important to note that while the components of the backup system (within the TESS system) are pictured together within the referenced figures, they can exist independently through a local or global network. The following discussion on the backup function assumes the user has accessed and authenticated their access rights to the TESS system, and will be performing the backup function within the TESS system. The enhanced backup and restoral function will now be discussed with reference to FIG. 19.

Figure 19:
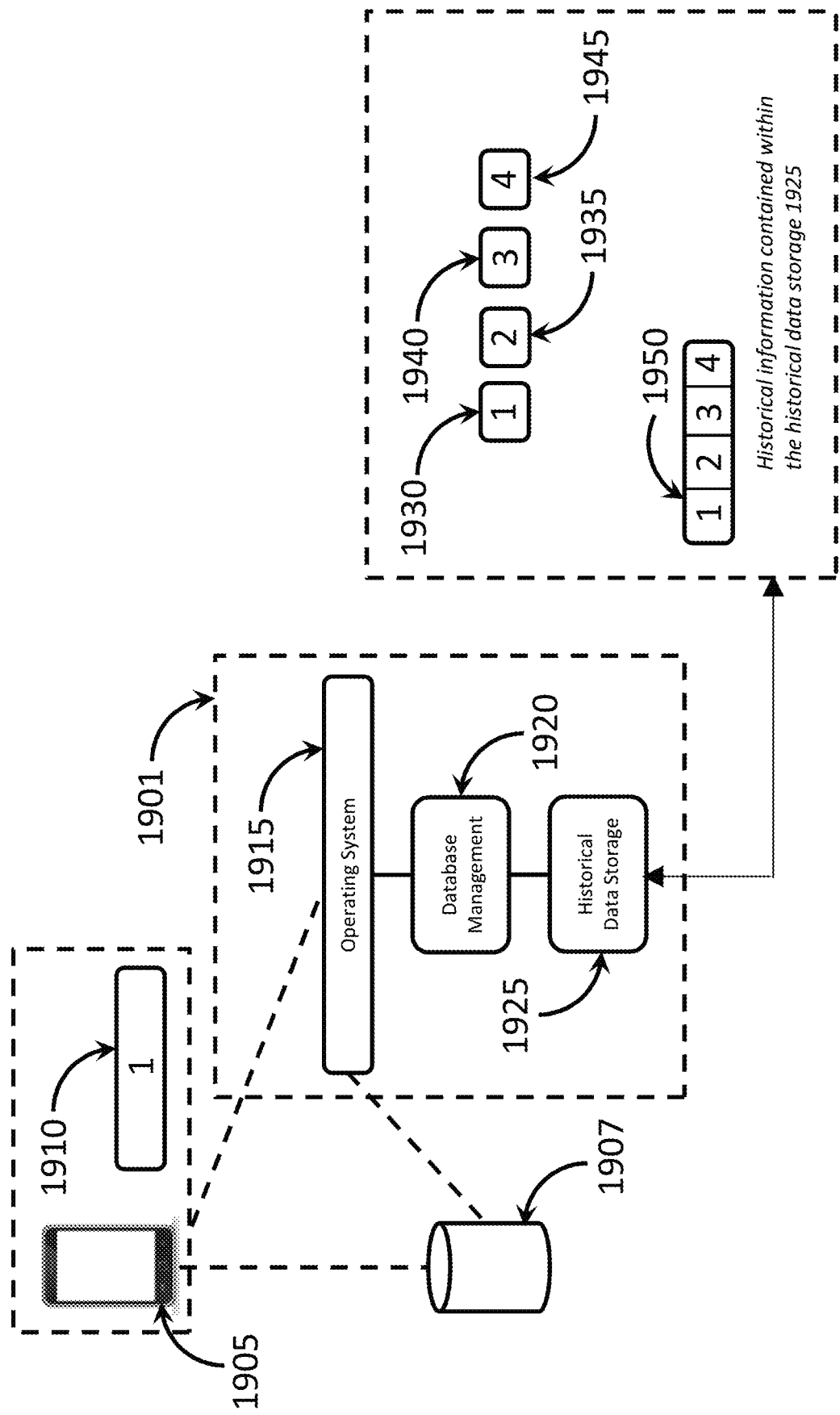
FIG. 19 is a diagram illustrating the enhanced backup system tool.

FIG. 19 shows a typical client side device 1905 containing a piece of digital content (in this case, a file) 1910 that the user wishes to back up to a private storage device 1907 such as a personal cloud device. The client device 1905 initiates a backup command, notifying the operating system 1915 of the TESS system 1901 of the pending backup. The operating system 1915 notifies the database management module 1920 that a backup is to be performed. The database management module 1920 may retrieve historical information about the file 1910 from the historical data storage module 1925. This information includes (but is not limited to) previous second user information 1930, the currently assigned access rights and permissions 1935, any multi-factor/2-factor or digital certification analyzer protection 1940, and any access expiration restrictions 1945 that may be placed on the subject digital content (file). The historical data storage module 1925 communicates the compiled historical data and file backup information 1950 associated with the file 1910 back to the database management module 1920. The original file 1910 is now stored in the backup location private storage device 1907 chosen by the client device 1905. The compiled historical data and file backup information 1950, including all of the additional system information added (previous second user information 1930, access rights and permissions 1935, multi-factor protection 1940, access expiration restrictions 1945 and any other specified content information) is collected through the operating system 1915 by the database management module 1920. The operating system 1915 informs the client device 1905 that the backup process is complete and that the file 1910 is now backed up on the user selected private storage device 1907.

Since the backup example above (with reference to FIG. 19) was performed within the TESS system, the file 1910 that was backed up will exist on both the chosen backup location private storage device 1907 as well as within the historical data storage 1925, with database records from this backup stored within the database management module 1920. The enhanced backup and restoral function provides for backup capabilities that will enable the system, drive(s) or file(s) to be backed up within the TESS system, or external of the TESS system. If the client device 1905 chose to back up a file 1910 privately (or external to the TESS system), then the only backup copy of the file 1910 that would exist is the copy sent to the private storage device 1907. The compiled historical data and file backup information 1950 would contain all the information pertaining to the file 1910, but not the actual file itself. The information that would be saved (as stated previously) is the previous second user information 1930, the currently assigned access rights and permissions 1935, any multi-factor/2-factor or digital certification analyzer protection 1940, and any access expiration restrictions 1945 that may be placed on the subject digital content (e.g., a file). The information above covers all aspects of the original file engagement and interaction, up to the time the backup was performed. The compiled historical data and file backup information 1950 may be stored within the historical data storage module 1925 for the entire life of the file 1910. Each time the subject file 1910 is accessed, modified, copied, engaged or is given second user access to, the compiled historical data and file backup information 1950 will be updated to include the subject access and commands executed against the file 1910. Each time a file enters the TESS system 1901; it is immediately identified and cataloged within the historical data storage module 1925. Every view, every second user(s) access given, every command execution, every action taken to the file 1910 is noted by the database management module 1920 and recorded into the historical data storage module 1925.

As previously stated, every command executed against a piece of digital content that is introduced into the TESS system is recorded. This enables the enhanced backup and restoral function to collect, store and recall detailed information of all aspects of each file (or digital content) that is managed within the TESS system.

As previously stated, the enhanced backup and restoral function identifies and archives information about the digital content that is not otherwise a component of the digital content itself. The example information provided in the discussion above (with reference to FIG. 19) is compiled along with the complete environmental information surrounding the digital content to be backed up using the enhanced backup and restoral function. The virtual image created with the enhanced backup information is stored within the TESS system for use during future digital content interactions as well as future system or digital content restorals. When a restoral to a digital content or entire storage repository within the TESS system is required, the virtual image of the environment where the digital content resides is restored to the digital content or to the storage repository, as if the catastrophic event precipitating the restoral never occurred. All file and/or drive information is restored to its previous state, right up to the time the enhanced backup had occurred.

The TESS system allows any registered user to perform the enhanced backup function manually, or through a scheduling system. The backup components can be selected individually, by group, or by drive or system. This ensures that all required content is protected and can be restored to its original state at the time the enhance backup occurred. The enhanced backup and restoral function can be set to overwrite historical backup information, or to collect the backup information sequentially, ensuring all content will always be available for restoral.

It is important to note that when a backup or restoral occurs, all information pertaining to the digital content and the environment are collected, saved and ultimately restored. While the previous examples dealt with a limited amount of information to avoid confusion, the amount of information collected by the enhanced backup and restoral function is significant. This information may include (but is not limited to) data pertaining to the digital content access and/or transfer, the access rights and permissions assigned by the digital content owner, the location of the digital content when the access and/or transfer occurred, and the directory structure in which the digital content resides in the host system, and other data encompassing the environmental aspects of the digital content. In addition to the standard criteria backed up with digital content, the enhanced backup and restoral function will also provide geographic information (within the TESS system) to include the directory structure, all of the manager tool assigned controls placed on the digital content and other data comprising the environmental and control aspects placed upon the digital content being backed up.

Since the TESS system incorporates digital content that is stored in multiple locations across a wide variety of physical devices in a diverse geographic environment, the enhanced backup and restoral function enables users of the TESS system to enjoy a full restoral of not only the digital content itself, but also the entire environment (including managerial controls) for which the digital content resides within. This allows for digital content that has been passed to, copied and/or transferred to recipients within or outside of the TESS system to be restored with the exact parameters of these digital content access rights, copies and transfers.

The TESS system provides a method wherein a Temporary External Assignable Memory (TEAM) environment can be created to enable one or more participants to engage in the transfer, sharing, and collaboration of digital content within a digital environment. The TEAM function gives any digital content owner within the TESS system the capability to create a TEAM environment on any device that is registered to the TESS system and contains free memory (storage) space to host the TEAM content.

As with all other aspects of the TESS system, it is important to note that the TEAM function can exist within other architectures and systems, or can be provided as a stand-alone technology application. For the purpose of this submission, all discussion pertaining to the TEAM function will be with reference to the TESS system and the associated system tools.

The TEAM function operates within the TESS system as a component of the overall system. For the purpose of making the discussion points specific to the TEAM function, the following examples and references will assume that the subject engaging the TEAM function has logged into the TESS system, has authenticated their rights of access to the TESS system, and has external devices such as laptop computers, smartphones, tablets, and other client-devices connected to/registered to the TESS system. Please refer to FIG. 20 for the following discussion on the TEAM function components and associated interaction.

Figure 20:
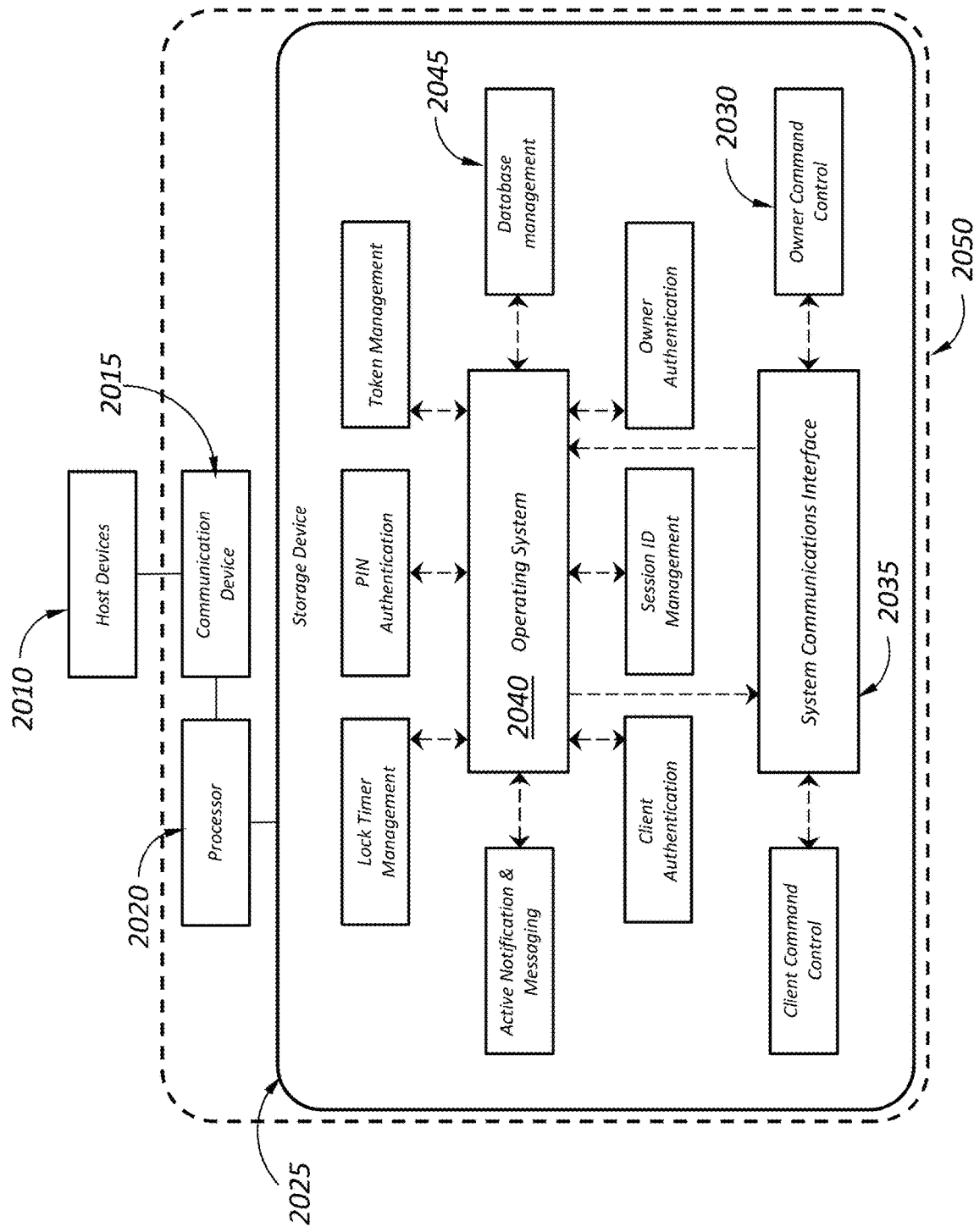
FIG. 20 is a block diagram illustrating the functional components of the TEAM system.

FIG. 20 shows an exemplary TESS system 2050 hosting the TEAM function. One or more host devices 2010 will serve the purpose of both hosting the TEAM location, as well as providing a method for the owner (creating the TEAM through the TESS system 2050) to communicate with the TESS system TEAM function. The host devices can be any personal computing device, including (but not limited to) a smartphone, tablet computer, desktop computer, laptop computer, or other computing device that has access to a memory (storage) repository, including (but not limited to) external drives, temporary drives, and cloud-type storage drives and services. The host devices 2010 communicate directly through a communication device 2015 and a processor 2020 with the storage device architecture 2025 of the TESS system 2050. A communication device 2015, processor 2020 or both may be part of a TESS system 2050 in one or more embodiments. A TESS system 2050 may be implemented via one or more servers, network appliances or other computing devices.

The owner command control module 2030 is responsible for taking commands and communication input from the processor 2020 for distribution throughout the TESS system storage device architecture 2025. Once a command is received by the owner command control module 2030 it is sent through the system communications interface module 2035 to the operating system 2040 of the TESS system 2050 for routing to the appropriate module(s). With reference to the TEAM function, the command being received by the operating system 2040 would be read and then communicated directly to the database management module 2045. The command provided with reference to the TEAM function will contain information pertaining to the architecture of the TEAM being created. This information may include (but is not limited to) the physical location of the TEAM within the host devices 2010, the TEAM composition, the TEAM size, the number of participants in the TEAM and the associated permissions and access rights of the TEAM. The database management module 2045 will store all the relevant TEAM information as stated above. In addition to storing the information, the database management module 2045 will provide acknowledgement(s) to the operating system 2040 as to the status of the TEAM functional elements as recorded. Each time a change is made to the TEAM configuration, the database management module 2045 will record these changes and provide a positive acknowledgement to the operating system 2040 that the TEAM information has been successfully recorded. The acknowledgement information shared by the database management module 2045 will also be shared to the system communications interface module 2035 and the owner command control module 2030 to provide a positive acknowledgement to the processor 2020, communication device 2015 and to the host devices 2010 hosting the TEAM. As stated previously in this submission, the above functional explanation is typical for the TEAM module function relating to its usage within the TESS system. It is understood that other configurations and other operational elements may exist within the TEAM function when the system hosting the TEAM function is changed. Further, the functional elements of the TEAM function may be different when operating as a single entity outside of the TESS system 2050.

Figure 21:
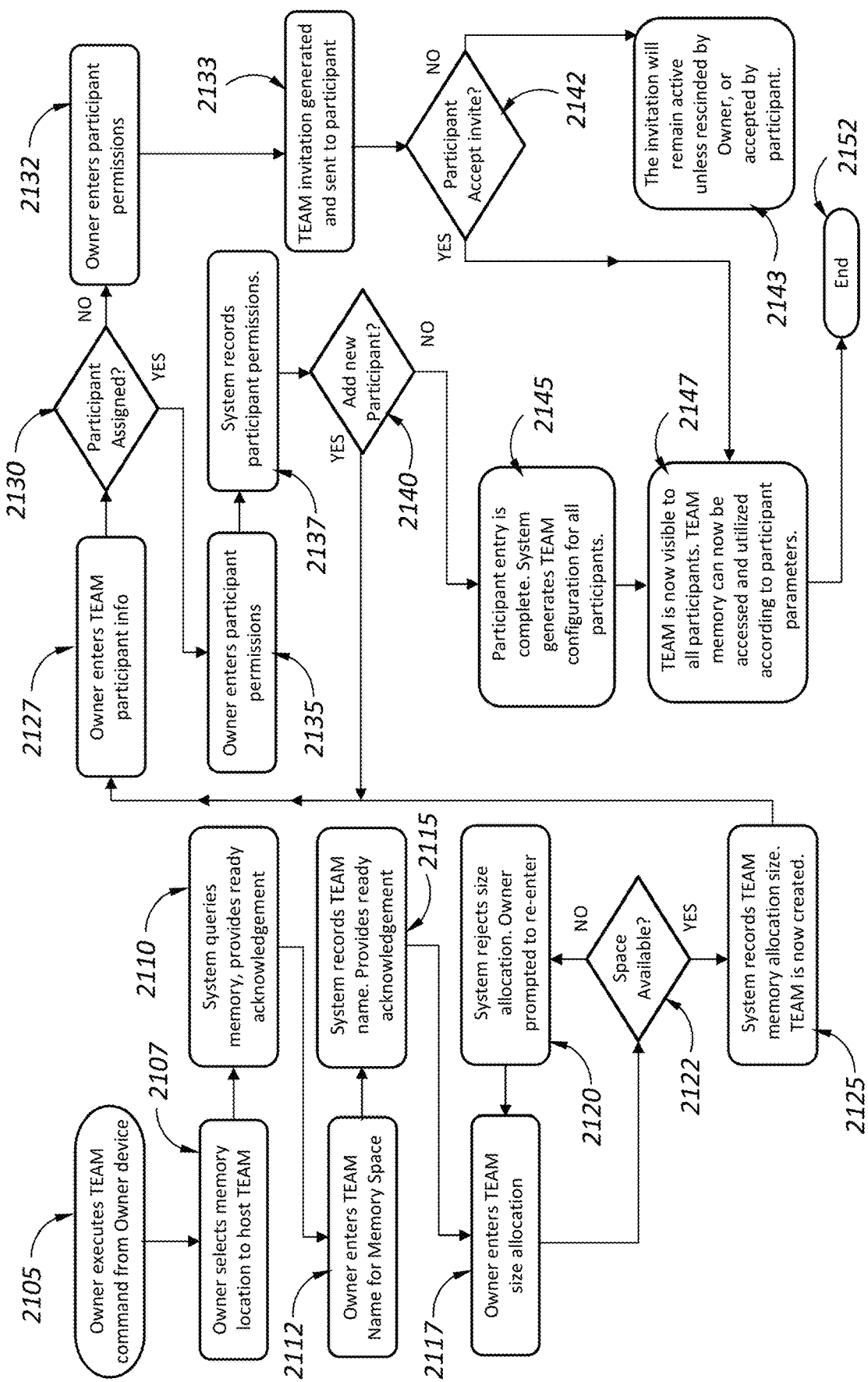
FIG. 21 is a flow diagram illustrating the creation of a TEAM.

The creation of a TEAM within the TESS system will now be discussed with reference to FIG. 21. Referring to FIG. 21, the process begins 2105 with the owner (creating the TEAM) entering a TEAM creation or memory allocation command/request from one of their host devices. As stated previously, the host device can be (but is not limited to) a personal computer, smartphone, tablet computer or any other computing device that is both connected to the TESS system and has memory space available on the device such as a hard drive, flash drive or other memory repository. Once the owner executes the TEAM command 2105 from their host device, the system will present the owner with a list (not shown in FIG. 21) of available host devices that are both registered with and connected to the TESS system. This list of owner-controlled host devices may contain the same types of personal computing devices provided previously in this example. From the available devices, the owner will select a memory location 2107 to host the TEAM. Once the owner has selected the memory location 2107, the system will query 2110 the selected device to ensure the device has the physical memory to support hosting a TEAM. This verification specifically looks for a storage device on the selected device, such as a hard drive, flash drive, solid state drive or other memory resource. Once the system query is complete 2110, the system will return an acknowledgement to the owner as an indication the TEAM creation process may proceed. The owner will then create and enter a name 2112 for the TEAM they are creating. The purpose of the name is for the TEAM to be identified on the TESS system network, allowing both the host and participants to see and access the TEAM.

The TEAM name will appear in a directory listing, much in the same way a network or external drive will appear in the directory listing of a personal computer. Continuing to refer to FIG. 21, once the TEAM name 2112 has been entered into the system, the system will record the TEAM name 2115 and provide an acknowledgement to the owner as an indication the TEAM creation process may proceed. The owner may now enter the TEAM allocation size 2117. The memory size will be limited to either the size of the physical memory repository, or to the size of available memory on the physical memory repository, whichever is smaller. The owner may enter the size (not shown) in megabytes or other size allocation designations. Once entered, the system will query the host device where the TEAM will reside and determine if the device has adequate memory to accommodate the size allocation. If the memory space is unavailable 2122—NO, the system will reject the size allocation 2120 and prompt the owner to enter an alternative memory allocation size. If the memory space is available 2122—YES, the system will store the TEAM allocation size 2125 and return an acknowledgement to the owner that the TEAM has been created 2125. Storage space equivalent in size to the memory space may be allocated or reserved on the host device, such as by transmitting a memory allocation message, including the memory space size, to the host device.

Upon completion of the TEAM creation process 2125, the owner may add participants to the TEAM. The owner can enter TEAM participant info 2127 in the form of the contact information associated with the host system. In this example, using the TESS system as the host system, the TEAM participant info 2127 entered can be an email address, a smart device number, or other associated identifier that allows the host device to communicate with a participant device.

At this point in the process, the owner must determine if the participant will be assigned to the TEAM, or if the participant will be invited to join the TEAM. As an example, in situations wherein a business is creating a TEAM to work together on a project, the participants of this TEAM would be assigned by the owner/TEAM leader. Conversely, if the owner was creating the TEAM for the purpose of sharing wedding photos, the participants would be invited to the TEAM, allowing them the opportunity to decline if they choose to do so.

With continued reference to FIG. 21, once the owner enters the TEAM participant info 2127, the system will determine 2130 if the participant is assigned to the TEAM, or invited to the TEAM. If the participant is assigned to the TEAM 2130—YES, then the owner will be prompted by the system to enter the participant permissions 2135 to govern their actions within the TEAM. For example, participant permissions 2135 may grant or deny the ability to edit, delete or otherwise modify data within a TEAM. Once these permissions are set 2135, the system will record the permissions 2137 for the participant and prompt the owner to add a new participant 2140. If the owner has other participants to add 2140—YES, the owner will enter the next participant info 2127 and the process will continue as described above. If the owner has completed adding participants 2140—NO to the TEAM, the system will generate the TEAM configuration 2145, assigning all permissions for all participants added to the TEAM. Once complete, the TEAM will be visible 2147 to each of the participants and the owner creating the TEAM. The TEAM may now be used by all TEAM participants.

In instances where the participant is invited to the TEAM and not otherwise assigned 2130—NO, the owner will pre-set the participant permissions 2132 for the participant being invited to participate. The owner then sends 2133 the TEAM invitation to the participant, allowing them the opportunity to join the TEAM if they choose to do so. The invitation (not shown) can be generated and sent by the owner in a number of different manners. These include, but are not limited to email, SMS, text message, sending a link, or other method wherein information may be passed between one or more user devices. It is important to note that the recipient of an invitation is not required to be a registered user of the TESS system. The invitation may contain the opportunity for the participant to register to the TESS system, or may simply provide the user credentials or other information required to participate in the TEAM event.

When the participant accepts the invitation 2142—YES, the access permissions for that participant will be activated upon their acceptance 2142—YES of the invitation. Once the invitation has been accepted 2142—YES, the TEAM will become visible 2147 to the participant invited to join the TEAM through the process. This will complete 2152 the process for this participant. Should the participant not accept the invite 2142—NO, the invite will remain inactive until such a time wherein it is either withdrawn by the owner 2143 or it is accepted 2142—YES by the participant.

Figure 22:
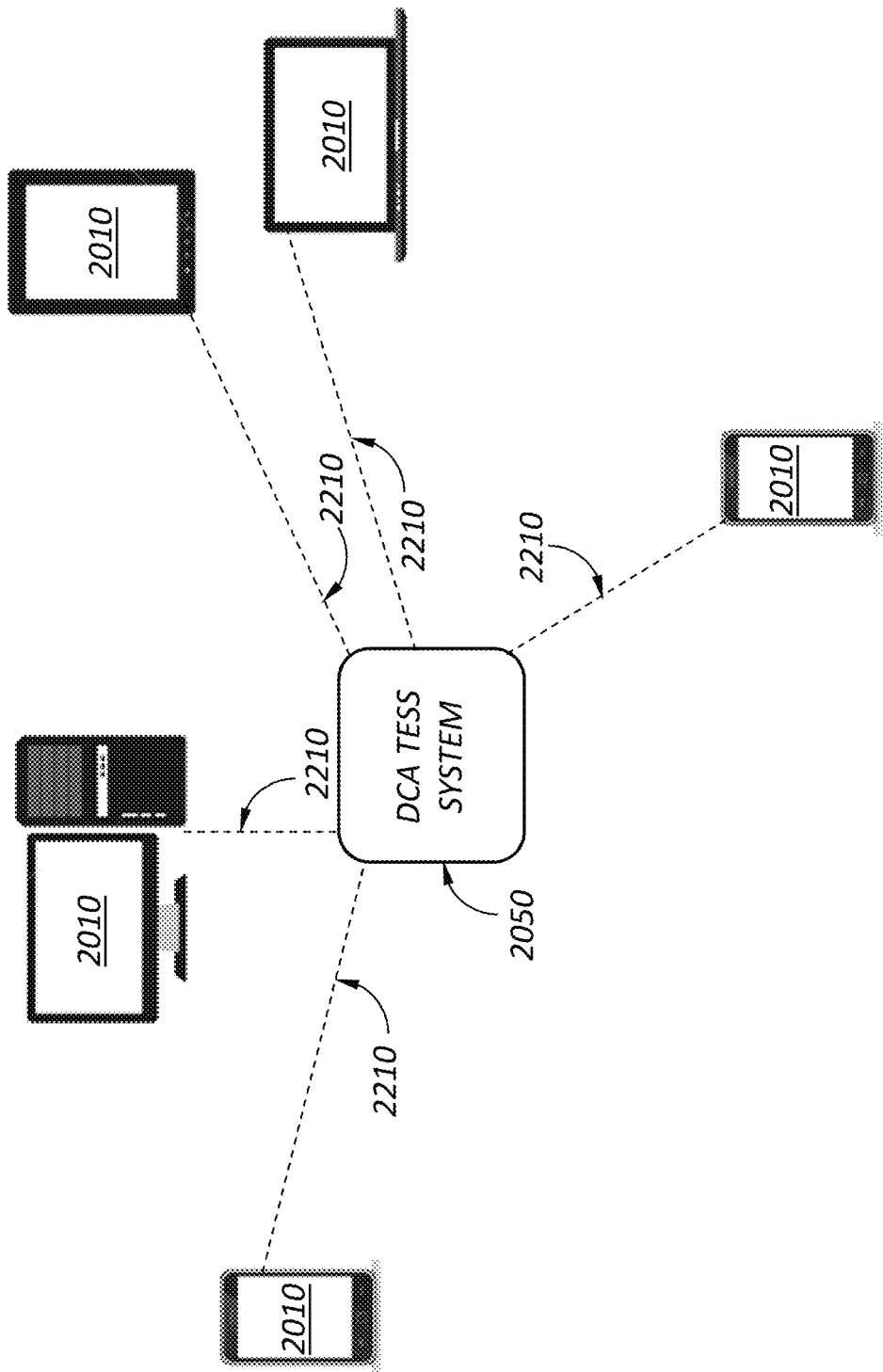
FIG. 22 is a diagram illustrating a host devices and a server providing a TEAM.

FIG. 22 illustrates an exemplary TESS system 2050 having a plurality of host devices 2010 connected thereto via wired or wireless communication links 2210. Each host device comprises one or more storage devices where storage space may be allocated and used for TEAM, as disclosed above.

What is claimed is:

1. A digital certification system for digital content comprising:
   one or more communication devices, wherein, in operation, the one or more communication devices receive first identification information and second identification information from one or more client devices;
   one or more processors, wherein, in operation, the one or more processors:
      verify the first identification information and establish a first secure session;
      request the second identification information from the one or more client devices via the first secure session; and
      verify the second identification information and establish a second secure session;
      wherein a subset of the digital content is accessible to the one or more client devices only after verification of the first identification information and the second identification information;
   a first timer, wherein at least one of the first secure session and the second secure session is terminated based on the first timer; and
   a second timer, wherein access to at least a portion of the subset of the digital content is prevented based on the second timer.

2. The digital certification system of claim 1, wherein the first timer measures inactivity and at least one of the first secure session and the second secure session is terminated based on a predefined period of inactivity.

3. The digital certification system of claim 1, wherein the first timer measures an elapsed time since at least one of the first secure session and the second secure session was established and the at least one of the first secure session and the second secure session is terminated after a predefined period of time.

4. The digital certification system of claim 1, wherein the second timer measures an elapsed time since the at least a portion of the subset of the digital content was made accessible and access to the at least a portion of the subset of digital content is not possible after a predefined period of time.

5. The digital certification system of claim 1, wherein the second timer is preset to a calendar date and the at least a portion of the subset of the digital content is not accessible after the calendar date.

6. The digital certification system of claim 1, wherein the second identification information is received after the first secure session is established.

7. The digital certification system of claim 1, wherein the first identification information comprises authentication information and the second identification information comprises a token transmitted to the communication device.

8. The digital certification system of claim 7, further comprising a third timer, wherein the third timer is activated when the token is transmitted to the communication device and verification of the token is not permitted after a predefined period of time measured by the third timer.

9. A digital certification system for digital content comprising:
   one or more communication devices, wherein, in operation, the one or more communication devices receive first identification information and second identification information from one or more client devices;
   a first timer;
   a second timer; and
   one or more processors, wherein, in operation, the one or more processors:
      verify the first identification information and establish a first secure session;
      request the second identification information from the one or more client devices via the first secure session; and
      verify the second identification information and establish a second secure session;
      wherein a subset of the digital content is accessible to the one or more client devices only after verification of the first identification information and the second identification information and during the second secure session;

wherein at least one of the first secure session and the second secure session is terminated based on the first timer; and wherein access to at least a portion of the subset of the digital content is prevented based on at least one of the first timer and the second timer.

10. The digital certification system of claim 9, wherein the verification of the second identification, establishment of the second secure session, or both occurs only during a predefined period of time measured by the second timer.

11. The digital certification system of claim 9, wherein the second timer measures an elapsed time since the at least a portion of the subset of the digital content was made accessible and the at least a portion of the subset of the digital content is not accessible after a predefined period of time.

12. The digital certification system of claim 9, wherein the first timer measures inactivity and at least one of the first secure session and the second secure session is terminated based on a predefined period of inactivity.

13. The digital certification system of claim 9, wherein the first timer measures an elapsed time since at least one of the first secure session and the second secure session was established and the at least one of the first secure session and the second secure session is terminated after a predefined period of time.

14. The digital certification system of claim 9, wherein the second secure session can only be established during the first secure session.

15. A method for accessing digital content with a digital certification system comprising:

receiving first identification information and second identification information from one or more client devices via one or more communication devices;

verifying the first identification information and establishing a first secure session;

requesting the second identification information from the one or more client devices via the first secure session;

verifying the second identification information and establishing a second secure session wherein a subset of the digital content is accessible to the one or more client devices only after verification of the first identification information and the second identification information;

terminating at least one of the first secure session and the second secure session based on a first timer; and terminating access to at least a portion of the subset of the digital content based on a second timer.

16. The method of claim 15, wherein the first timer measures inactivity and at least one of the first secure session and the second secure session is terminated based on a predefined period of inactivity.

17. The method of claim 15, wherein the second timer measures an elapsed time since at least a portion of the subset of the digital content was made accessible and the at least a portion of the subset of the digital content is not accessible after a predefined period of time.

18. The method of claim 15, wherein the first timer measures an elapsed time since at least one of the first secure session and the second secure session was established and the at least one of the first secure session and the second secure session is terminated after a predefined period of time.

19. The method of claim 15, wherein second timer is a preset calendar date and at least a portion of the subset of the digital content is not accessible after the preset calendar date.

20. The method of claim 15, wherein the second identification information is received after the first secure session is established.

* * * * *